US012480722B2

(12) United States Patent
Kasai et al.

(10) Patent No.: US 12,480,722 B2
(45) Date of Patent: Nov. 25, 2025

(54) HEAT EXCHANGER

(71) Applicant: DAIKIN INDUSTRIES, LTD., Osaka (JP)

(72) Inventors: Masaya Kasai, Osaka (JP); Takema Nakazawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 608 days.

(21) Appl. No.: 17/493,310

(22) Filed: Oct. 4, 2021

(65) Prior Publication Data

US 2022/0026165 A1   Jan. 27, 2022

Related U.S. Application Data

(63) Continuation of application No. PCT/JP2020/013347, filed on Mar. 25, 2020.

(30) Foreign Application Priority Data

| Apr. 5, 2019 | (JP) | 2019-072730 |
| Apr. 5, 2019 | (JP) | 2019-072734 |
| Sep. 11, 2019 | (JP) | 2019-165379 |

(51) Int. Cl.
*F28F 3/04* (2006.01)
*F28D 9/00* (2006.01)
(Continued)

(52) U.S. Cl.
CPC ............ *F28F 3/086* (2013.01); *F28F 3/10* (2013.01); *F28F 2225/04* (2013.01); *F28F 2240/00* (2013.01)

(58) Field of Classification Search
CPC .. F28F 2275/14; F28F 21/0015; F28F 9/0062; F28F 9/0068; F28F 9/02;
(Continued)

(56) References Cited

U.S. PATENT DOCUMENTS

| 5,775,410 A * | 7/1998 | Ramm-Schmidt .... F28D 9/0037 165/110 |
| 2008/0156471 A1 * | 7/2008 | Han ....................... F28F 13/06 165/166 |

(Continued)

FOREIGN PATENT DOCUMENTS

| JP | 2003-314983 A | 11/2003 |
| JP | 2007-100997 A | 4/2007 |

(Continued)

OTHER PUBLICATIONS

International Search Report of corresponding PCT Application No. PCT/JP2020/013347 dated Jun. 23, 2020.
(Continued)

*Primary Examiner* — Frantz F Jules
*Assistant Examiner* — Jason N Thompson
(74) *Attorney, Agent, or Firm* — GLOBAL IP COUNSELORS, LLP

(57) ABSTRACT

A heat exchanger includes flat sheet shaped partition members, and spacing members alternately stacked with the partition members to keep a space between an adjacent pair of the partition members. Each of the partition members is sandwiched between a first passage and a second passage alternately formed. Each of the spacing members has a frame portion formed along a periphery of the partition members. Each frame portion includes a ridge formed on one surface of the frame portion, and an elongated recess formed on an other surface of the frame portion. The ridge of one of an adjacent pair of the spacing members fits into the elongated recess of the other spacing member. Each of the partition members is sandwiched between the ridge of one of a pair of the spacing members adjacent to the partition member and the elongated recess of the other spacing member.

17 Claims, 40 Drawing Sheets

(51) Int. Cl.
*F28D 9/02* (2006.01)
*F28F 3/08* (2006.01)
*F28F 3/10* (2006.01)

(58) Field of Classification Search
CPC .... F28F 3/005; F28F 3/02; F28F 3/027; F28F 3/04; F28F 3/048; F28F 3/06; F28F 3/08; F28F 3/10; F28F 2225/08; F28F 2240/00; F24F 3/147; F24F 2003/1435
See application file for complete search history.

(56) References Cited

U.S. PATENT DOCUMENTS

| | | | | |
|---|---|---|---|---|
| 2008/0283217 | A1* | 11/2008 | Gagnon | F24F 12/006 165/166 |
| 2009/0032232 | A1* | 2/2009 | Murayama | F28D 9/0037 29/890.03 |
| 2009/0314480 | A1* | 12/2009 | Grinbergs | H01M 8/04007 429/410 |
| 2010/0293994 | A1* | 11/2010 | Murayama | C08F 8/42 424/618 |
| 2014/0262144 | A1* | 9/2014 | Erb | F28F 9/001 156/60 |
| 2015/0053381 | A1 | 2/2015 | Takada et al. | |
| 2015/0276256 | A1* | 10/2015 | Erb | F28D 9/0068 29/890.03 |
| 2016/0123609 | A1* | 5/2016 | Hamada | F28F 3/048 96/11 |
| 2017/0227300 | A1 | 8/2017 | Takada et al. | |
| 2019/0154350 | A1* | 5/2019 | Dulberg | F28D 1/0461 |

FOREIGN PATENT DOCUMENTS

| | | |
|---|---|---|
| JP | 2007-285691 A | 11/2007 |
| JP | 2008-122042 A | 5/2008 |
| JP | 2013-257106 A | 12/2013 |
| WO | 2005/078371 A2 | 8/2005 |
| WO | 2013/157056 A1 | 10/2013 |
| WO | 2018/132014 A1 | 7/2018 |

OTHER PUBLICATIONS

European Search Report of corresponding EP Application No. 20 78 3633.9 dated Oct. 10, 2022.
International Preliminary Report of corresponding PCT Application No. PCT/JP2020/013347 dated Oct. 21, 2021.

\* cited by examiner

HEAT EXCHANGER

CROSS-REFERENCE TO RELATED APPLICATIONS

This is a continuation of International Application No. PCT/JP2020/013347 filed on Mar. 25, 2020, which claims priority to Japanese Patent Application Nos. 2019-072730 and 2019-072734, filed on Apr. 5, 2019 and 2019-165379, filed on Sep. 11, 2019. The entire disclosures of these applications are incorporated by reference herein.

BACKGROUND

Field of Invention

The present disclosure relates to a heat exchanger.

Background Information

Japanese Unexamined Patent Publication No. 2007-100997 discloses a heat exchange element used in a ventilator. The heat exchange element is a heat exchanger that exchanges heat between supply air and exhaust air. This heat exchanger includes a plurality of resin frames and a plurality of heat transfer plates that are alternately stacked. This heat exchanger has air flow paths for the supply air and air flow paths for the exhaust air that are alternately formed in the stacking direction of the resin frames and the heat transfer plates. The heat transfer plate serves as a partition between an adjacent pair of air flow paths. This heat exchanger causes the air flowing through the air flow path for the supply air and the air flowing through the air flow path for the exhaust air to exchange sensible heat and latent heat (moisture) through the heat transfer plate.

SUMMARY

A first aspect of the present disclosure is directed to a heat exchanger including a plurality of flat sheet shaped partition members, and a plurality of spacing members alternately stacked with the partition members to keep a space between an adjacent pair of the partition members. Each of the partition members is sandwiched between a first passage and a second passage alternately formed. Each of the spacing members has a frame portion formed along a periphery of the partition members. Each frame portion includes a ridge formed on one surface of the frame portion facing a stacking direction of the partition members and extending in an extending direction of the frame portion, and an elongated recess formed on an other surface of the frame portion and extending in the extending direction of the frame portion. The ridge of one of an adjacent pair of the spacing members fits into the elongated recess of the other spacing member. Each of the partition members is sandwiched between the ridge of one of a pair of the spacing members adjacent to the partition member and the elongated recess of the other spacing member.

DETAILED DESCRIPTION OF EMBODIMENT(S)

First Embodiment

A first embodiment will be described below. A heat exchanger (10) of the present embodiment is a so-called total heat exchanger. This heat exchanger (10) is provided for a ventilator, and causes outdoor air (supply air) supplied into a room and room air (exhaust air) exhausted out of the room to exchange sensible heat and latent heat (moisture).

General Configuration of Outdoor Heat Exchanger

Figure 1:
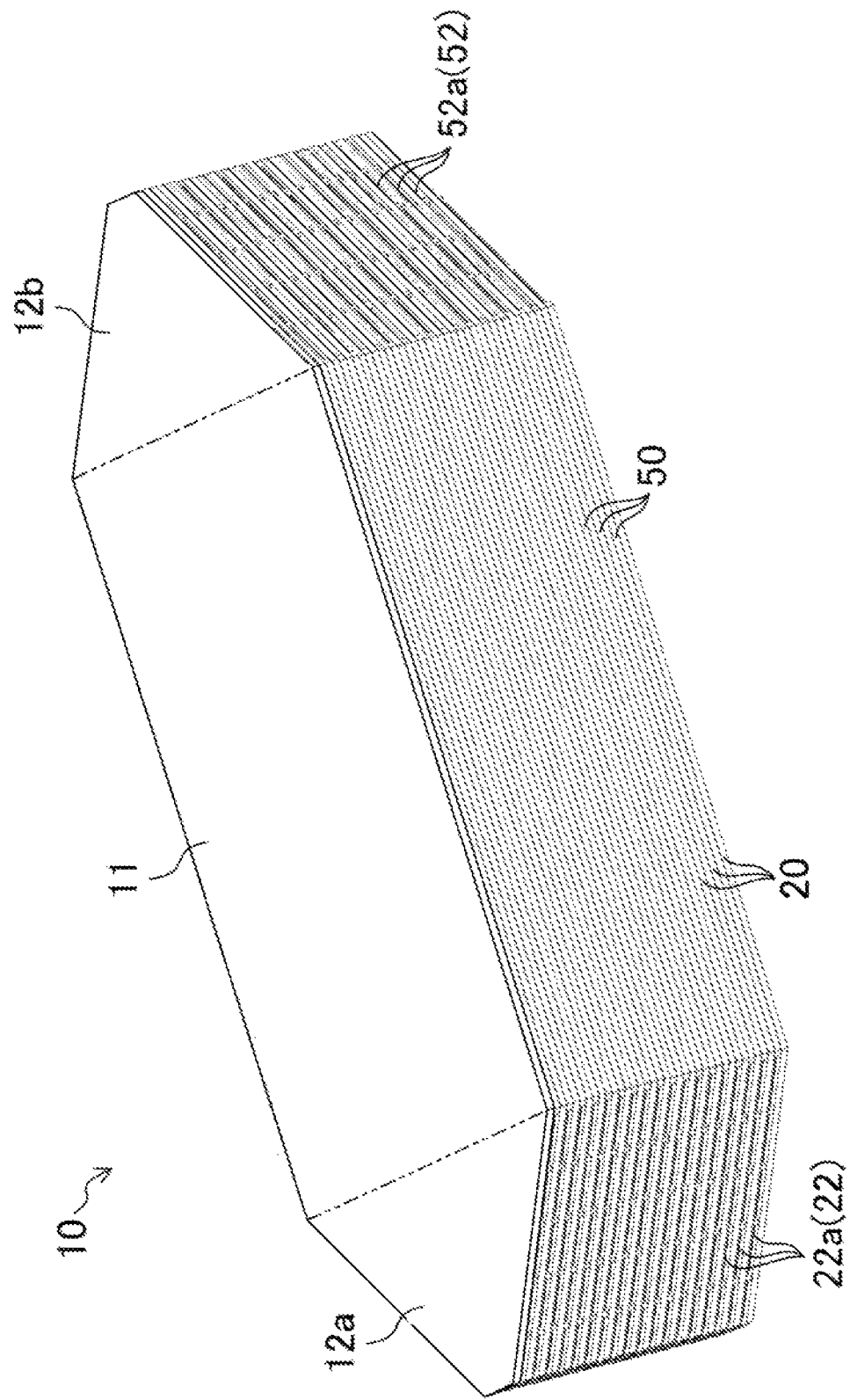
FIG. 1 is a perspective view of a heat exchanger according to a first embodiment.

As illustrated in FIG. 1, the heat exchanger (10) is formed in a prism shape having polygonal end faces. Each end face of the heat exchanger (10) of the present embodiment has a horizontally oriented octagonal shape. As also illustrated in FIG. 2, the heat exchanger (10) includes a main heat exchange section (11) and two auxiliary heat exchange sections (12a, 12b).

Figure 2:
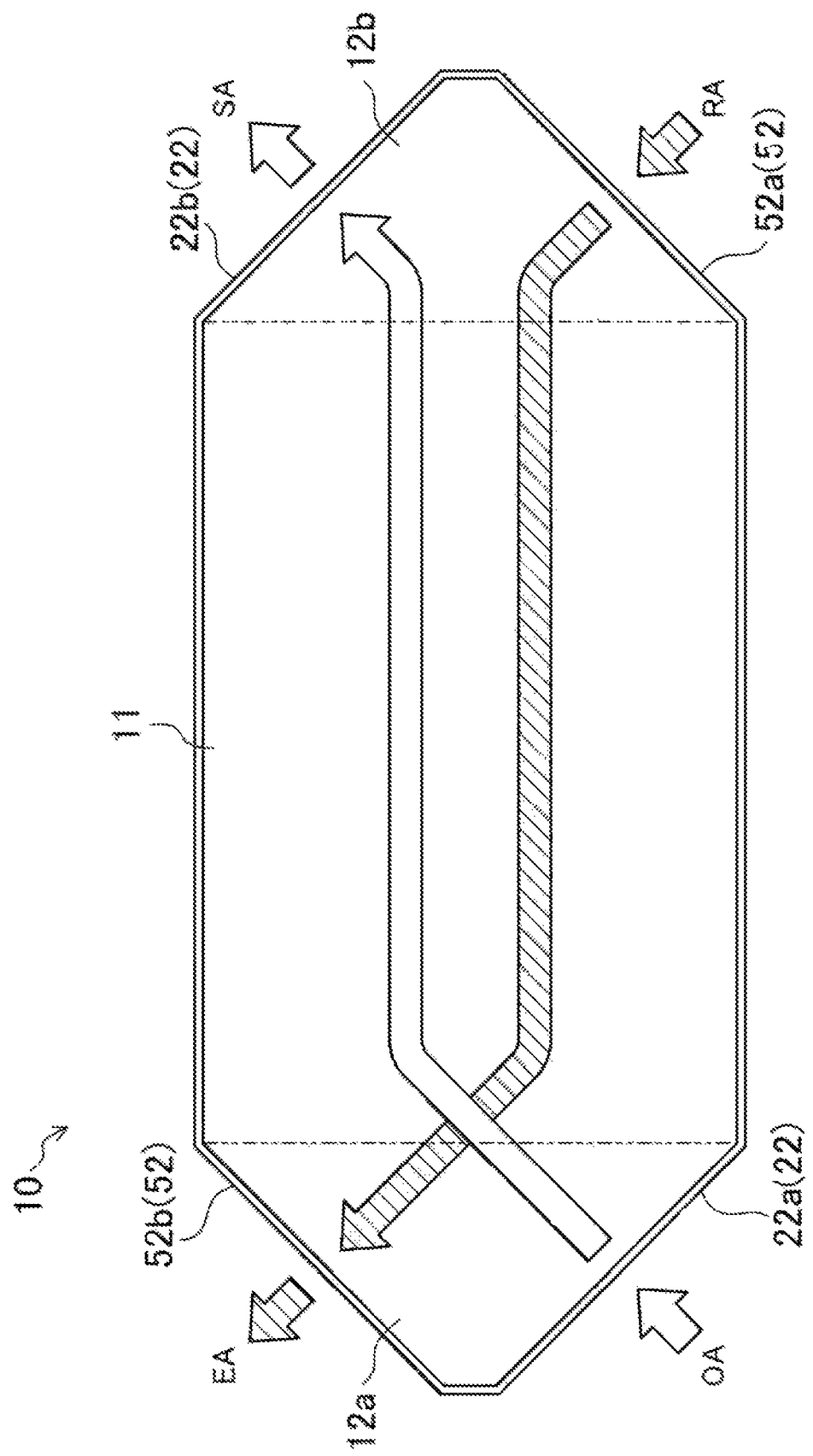
FIG. 2 is a plan view of the heat exchanger according to the first embodiment.

The main heat exchange section (11) is located at the middle of the heat exchanger (10) in the right-to-left direction in FIG. 2. When the heat exchanger (10) is viewed in plan as shown in FIG. 2, the main heat exchange section (11) is a horizontally oriented rectangular portion. The auxiliary heat exchange sections (12a, 12b) are portions of the heat exchanger (10) located on the sides of the main heat exchange section (11) in the right-to-left direction in FIG. 2. In the heat exchanger (10), the auxiliary heat exchange sections (12a, 12b) are arranged on the respective sides of the main heat exchange section (11) in the right-to-left direction in FIG. 2. In the plan view of the heat exchanger (10) shown in FIG. 2, each of the auxiliary heat exchange section (12a, 12b) is a trapezoidal portion.

The heat exchanger (10) includes a plurality of first elements (20) and a plurality of second elements (50). The first elements (20) and the second elements (50) are alternately stacked in the heat exchanger (10). Each of the first elements (20) forms a first passage (21). The first passage (21) allows supply air to flow therethrough. Each of the second elements (50) forms a second passage (51). The second passage (51) allows exhaust air to flow therethrough. In the heat exchanger (10), the first passages (21) and the second passages (51) are alternately formed in the stacking direction of the first elements (20) and the second elements (50).

The heat exchanger (10) has a first inflow port (22a), a first outflow port (22b), a second inflow port (52a), and a second outflow port (52b) which are formed in side surfaces thereof (surfaces parallel to the stacking direction of the first elements (20) and the second elements (50)). The first inflow port (22a) and the first outflow port (22b) are formed in the first element (20) and communicate with the first passage (21). The second inflow port (52a) and the second outflow port (52b) are formed in the second element (50) and communicate with the second passage (51).

Figure 3:
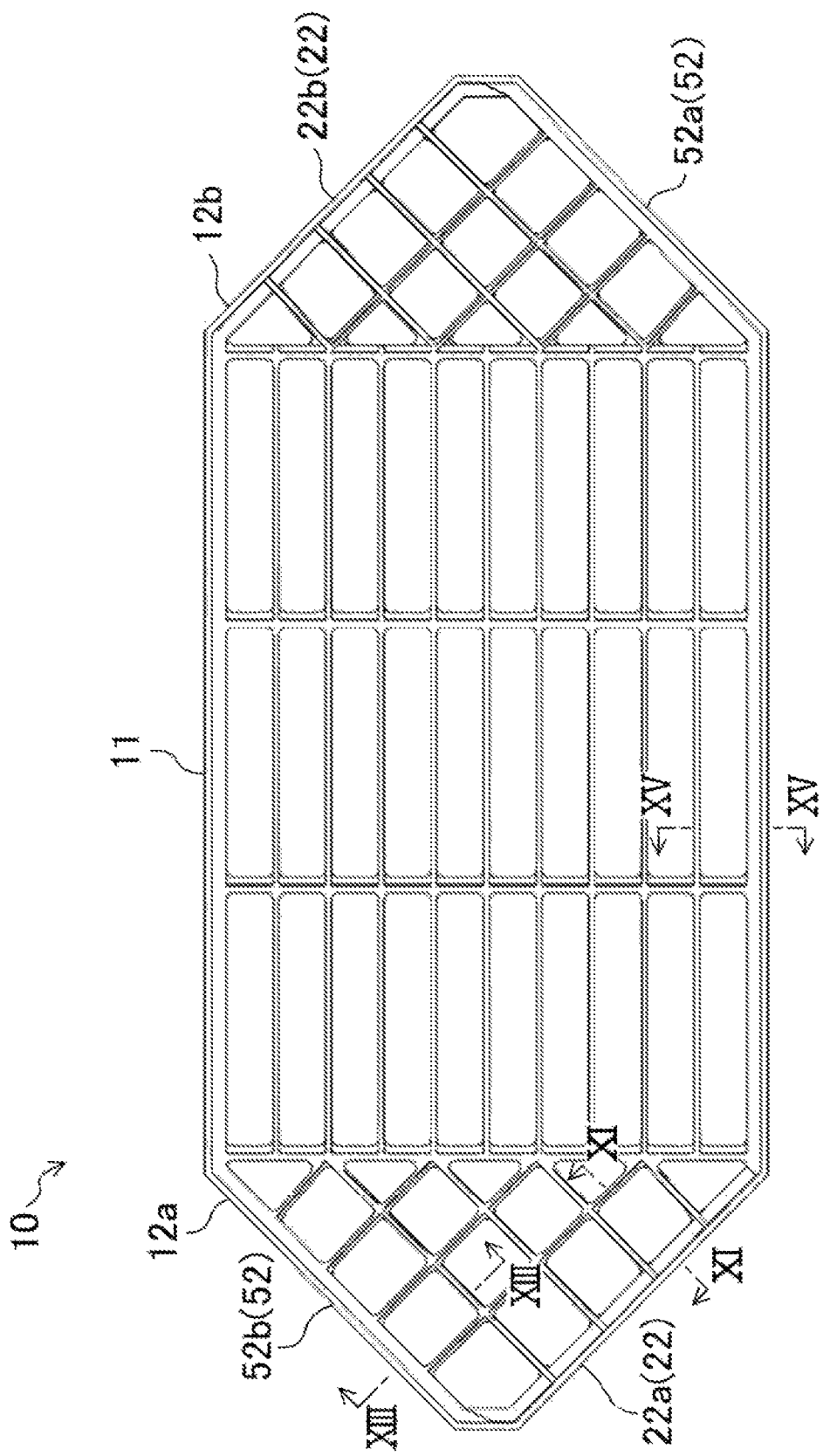
FIG. 3 is a plan view of the heat exchanger according to the first embodiment, partially extracted.
Figure 4:
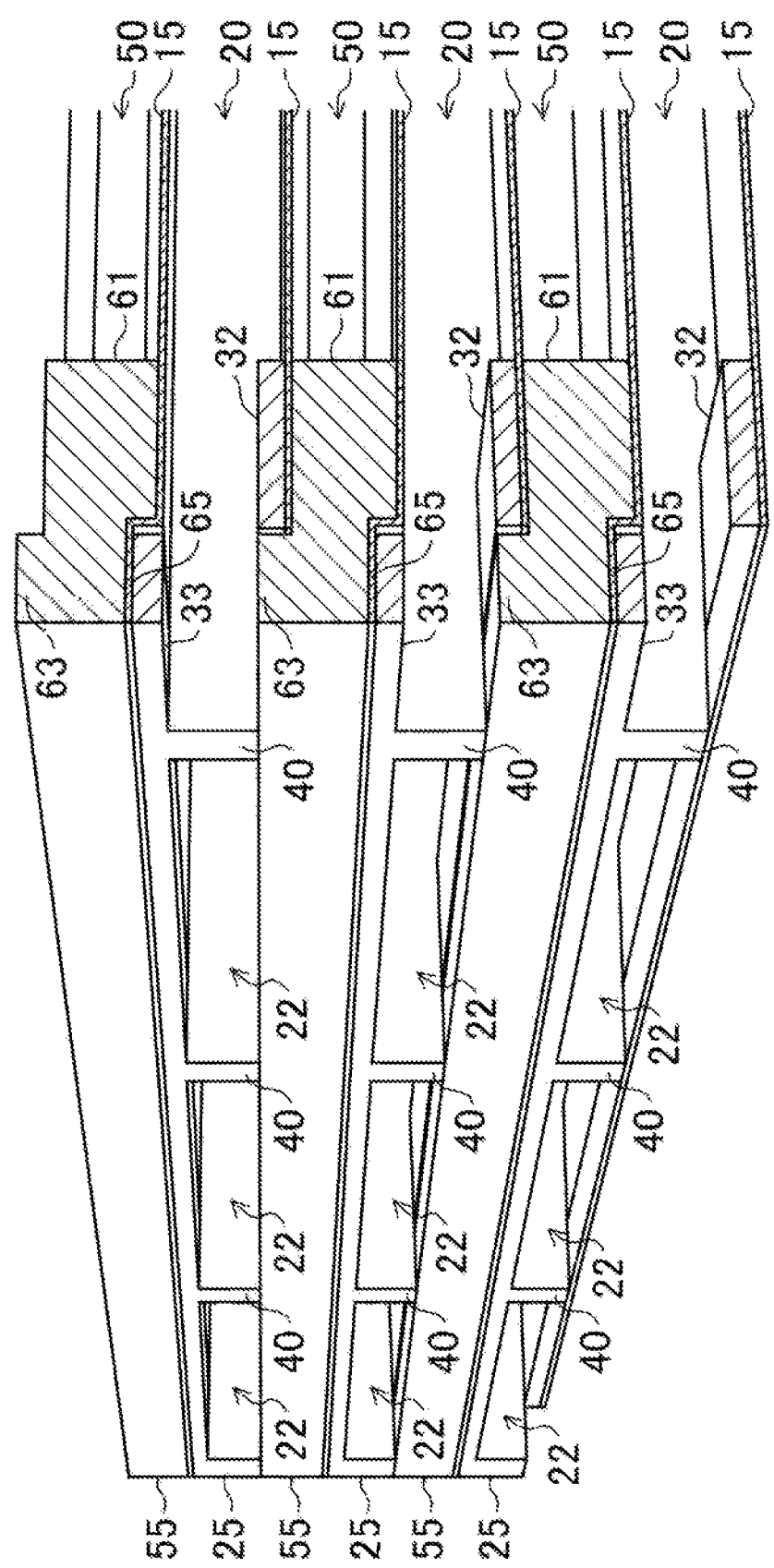
FIG. 4 is a perspective view of a cross section taken along line XI-XI in FIG. 3 and its periphery.

As also illustrated in FIGS. 2 and 3, the first inflow port (22a), the first outflow port (22b), the second inflow port (52a), and the second outflow port (52b) are formed on different side surfaces of the heat exchanger (10). In one of the auxiliary heat exchange sections (12a) of the heat exchanger (10), the first inflow port (22a) is open in one side surface, and the second outflow port (52b) is open in a different side surface. In the other auxiliary heat exchange section (12b) of the heat exchanger (10), the first outflow port (22b) is open in one side surface, and the second inflow port (52a) is open in a different side surface.

The side surfaces of the heat exchanger (10) are formed by the outer peripheral surface of a stack of the first elements (20) and the second elements (50). The side surfaces of the heat exchanger (10) are substantially flat surfaces.

Flow of Air and Heat Exchange Action

As illustrated in FIG. 2, into the heat exchanger (10), outdoor air OA flows through the first inflow port (22a), and room air RA flows through the second inflow port (52a). The outdoor air OA that has entered the first inflow port (22a) goes through the first passage (21) as the supply air, passes through the one auxiliary heat exchange section (12a), the main heat exchange section (11), and the other auxiliary heat exchange section (12b) in this order, and is supplied into the room through the first outflow port (22b). The room air RA that has entered the second inflow port (52a) goes through the second passage (51) as the exhaust air, passes through the other auxiliary heat exchange section (12b), the main heat exchange section (11), and the one auxiliary heat exchange section (12a) in this order, and is discharged to the outside of the room through the second outflow port (52b).

In each of the auxiliary heat exchange sections (12a, 12b) of the heat exchanger (10), the supply air in the first passage (21) and the exhaust air in the second passage (51) flow in directions intersecting with each other. In the main heat exchange section (11) of the heat exchanger (10), the supply air in the first passage (21) and the exhaust air in the second passage (51) flow in opposite directions.

The heat exchanger (10) causes the supply air flowing through the first passage (21) and the exhaust air flowing through the second passage (51) to exchange sensible heat and latent heat (moisture). Of the supply air and the exhaust air in the heat exchanger (10), one with the higher temperature transfers heat to the other with the lower temperature. Further, of the supply air and the exhaust air in the heat exchanger (10), one with the higher humidity transfers moisture to the other with the lower humidity.

First Element, Second Element

As illustrated in FIGS. 4, 12, 14 and 16, the first element (20) includes a first frame (25) and a partition sheet (15), and the second element (50) includes a second frame (55) and a partition sheet (15).

As will be described in detail later, each of the first frame (25) and the second frame (55) is a flat, injection-molded resin member. In the following description, the upper surfaces of the first frame (25) and the second frame (55) in FIGS. 4, 12, 14, and 16 will be referred to as "front surfaces," and the lower surfaces of the first frame (25) and the second frame (55) in FIGS. 4, 12, 14, and 16 will be referred to as "back surfaces."

The partition sheet (15) is a sheet-like or sheet shaped member having high moisture permeability and low air permeability. The partition sheet (15) is a partition member between the first passage (21) and the second passage (51). The partition sheet (15) is made of a polymer material (e.g., polyurethane) containing a hydrophilic group and a hydrophobic group. The partition sheet (15) has a thickness of, e.g., about 1 μm to 30 μm.

The partition sheet (15) may be made of paper or nonwoven fabric. Examples of the material of the paper or nonwoven fabric used as the partition sheet (15) include fibrous resin, fibrous metal, glass fiber, and pulp.

The first element (20) includes the partition sheet (15) bonded to a back surface of the first frame (25) with an adhesive. The partition sheet (15) covers substantially the entire back surface of the first frame (25). The second element (50) includes the partition sheet (15) bonded to a back surface of the second frame (55) with an adhesive. The partition sheet (15) covers substantially the entire back surface of the second frame (55).

First Frame

Figure 5:
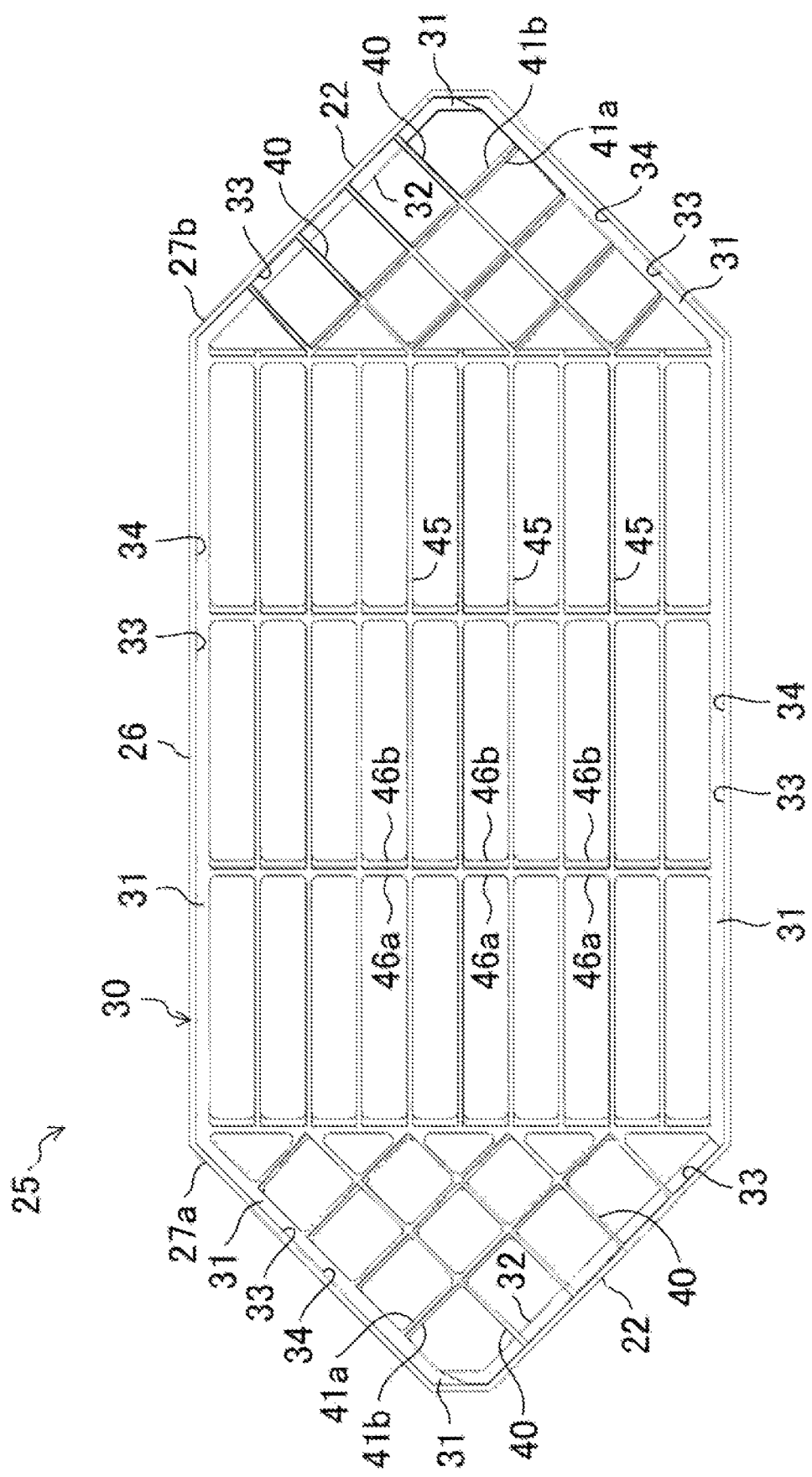
FIG. 5 is a plan view of a first frame according to the first embodiment.

As illustrated in FIG. 5, the first frame (25) is formed in a horizontally oriented octagonal shape in plan view. The first frame (25) has substantially the same outer shape as the end faces of the heat exchanger (10) in plan view. The first frame (25) is a first spacing member that keeps a space between an adjacent pair of the partition sheets (15).

The first frame (25) has a single middle area (26) and two end areas (27a, 27b). The middle area (26) is a horizontally oriented rectangular area, and is located at the middle in the right-to-left direction in FIG. 5. The first frame (25) has the end areas (27a, 27b) formed on both sides of the middle area (26). The end areas (27a, 27b) are trapezoidal areas located on the sides of the middle area (26) in the right-to-left direction in FIG. 5.

Frame Portion

The first frame (25) includes a frame portion (30). The frame portion (30) is a portion extending along the outer periphery of the first frame (25) over the entire perimeter of the first frame (25). In other words, the frame portion (30) is formed in a horizontally oriented octagonal frame shape. The frame portion (30) surrounds the periphery of the first passage (21) formed by the first frame (25). The frame portion (30) extends along the periphery of the partition sheet (15).

The frame portion (30) of the first frame (25) has two first communication openings (22). Each first communication opening (22) allows the first passage (21) surrounded by the frame portion (30) to communicate with the outside of the frame portion (30). In the frame portion (30) shown in FIG. 5, one of the first communication openings (22) is formed over substantially the entire length of the downward oblique side of the left end area (27a), and constitutes the first inflow port (22a). Also in the frame portion (30) shown in FIG. 5, the other first communication opening (22) is formed over substantially the entire length of the upward oblique side of the right end area (27b), and constitutes the first outflow port (22b).

Figure 6:
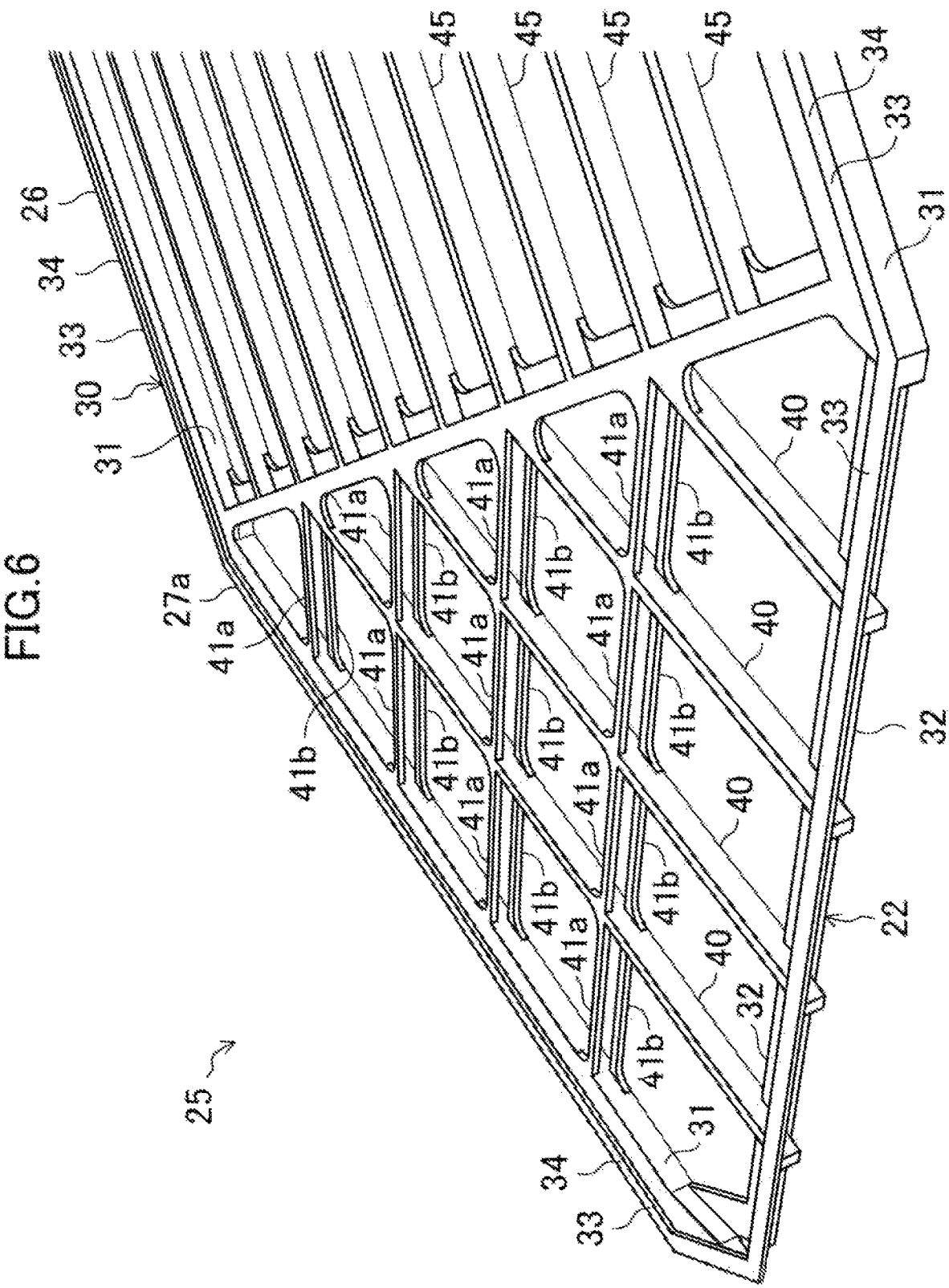
FIG. 6 is a perspective view of part of the first frame according to the first embodiment as viewed from the front side.
Figure 7:
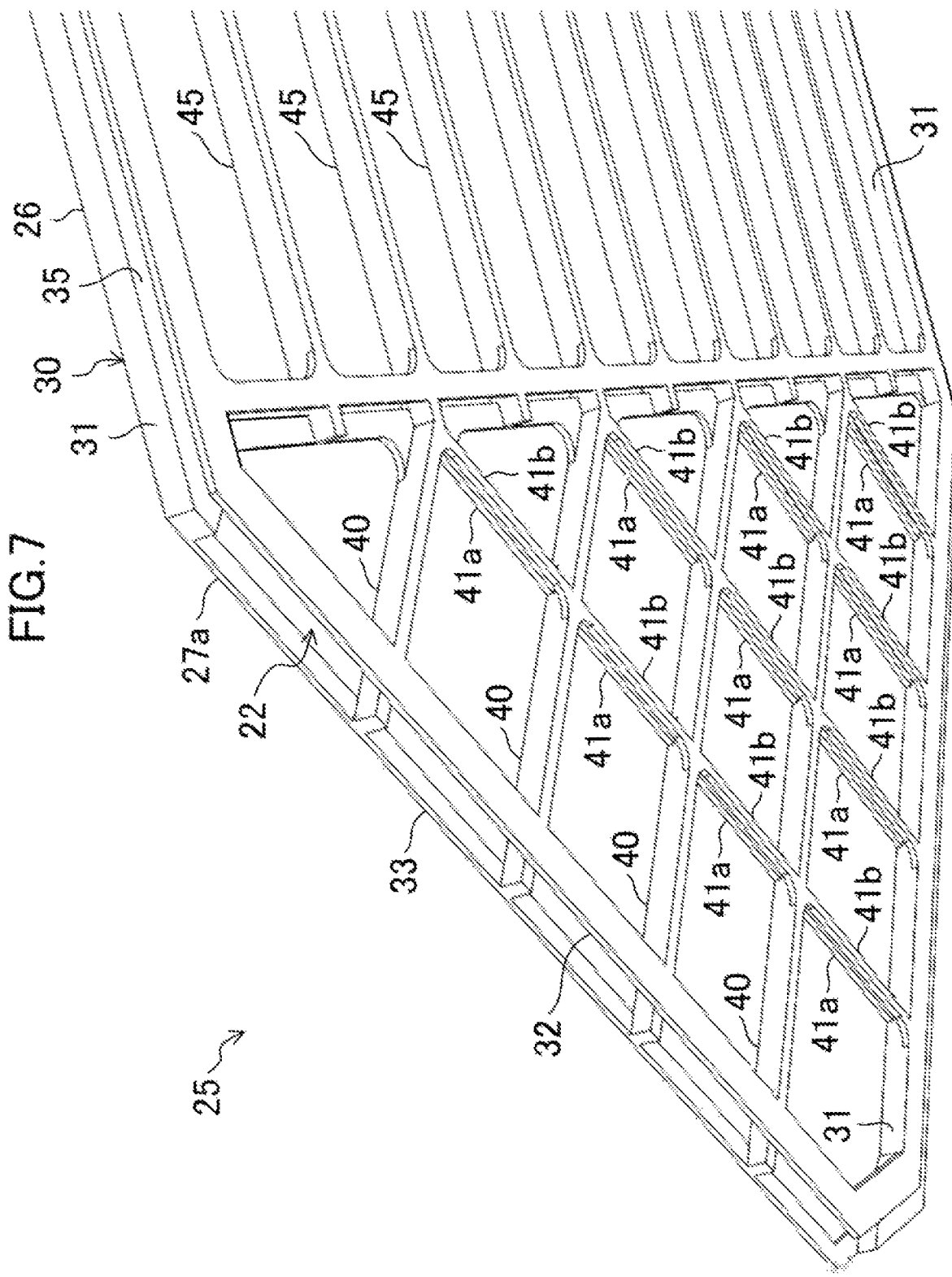
FIG. 7 is a perspective view of part of the first frame according to the first embodiment as viewed from the back side.

As illustrated in FIGS. 5 to 7, the frame portion (30) of the first frame (25) includes a blocking portion (31), an outer rib (33), and an auxiliary rib (32). A portion of the outer rib (33) constitutes a ridge (34). An elongated recess (35) is formed in the blocking portion (31).

The blocking portion (31) extends along six sides of the frame portion (30) where no first communication openings (22) are formed. As illustrated in FIGS. 13 to 16, the blocking portion (31) has a cross-sectional shape of a rectangle one corner of which is cut off. The blocking portion (31) separates the first passage (21) surrounded by the frame portion (30) from the outside of the frame portion (30). The thickness of the blocking portion (31) is substantially equal to the thickness of the first passage (21).

As illustrated in FIG. 5, the outer rib (33) is a portion extending along the outer periphery of the frame portion (30) over the entire perimeter of the frame portion (30). The outer rib (33) is formed along all the eight sides of the frame portion (30). The outer rib (33) is arranged on the front surface of the blocking portion (31) and integral with the blocking portion (31).

As illustrated in FIGS. 13 to 16, a portion of the outer rib (33) adjacent to the blocking portion (31) serves as the ridge (34). The ridge (34) extends along the outermost peripheral edge of the blocking portion (31) and protrudes from the front surface of the blocking portion (31). The outer peripheral surface of the ridge (34) forms a plane together with the outer peripheral surface of the blocking portion (31).

As illustrated in FIGS. 13 to 16, the elongated recess (35) is a recessed groove that opens on the back surface of the blocking portion (31). The elongated recess (35) is formed along the outermost peripheral edge of the blocking portion (31) over the entire length of the blocking portion (31). The elongated recess (35) also opens on the outer peripheral surface of the blocking portion (31). The cross-sectional shape of the elongated recess (35) corresponds to the cross-sectional shape of a ridge (64), which will be described later, of the second frame (55). The outer rib (63) of the second frame (55) fits into the elongated recess (35) of the first frame (25). Thus, the ridge (64), which is a portion of the outer rib (63) of the second frame (55), fits into the elongated recess (35) of the first frame (25).

Figure 11:
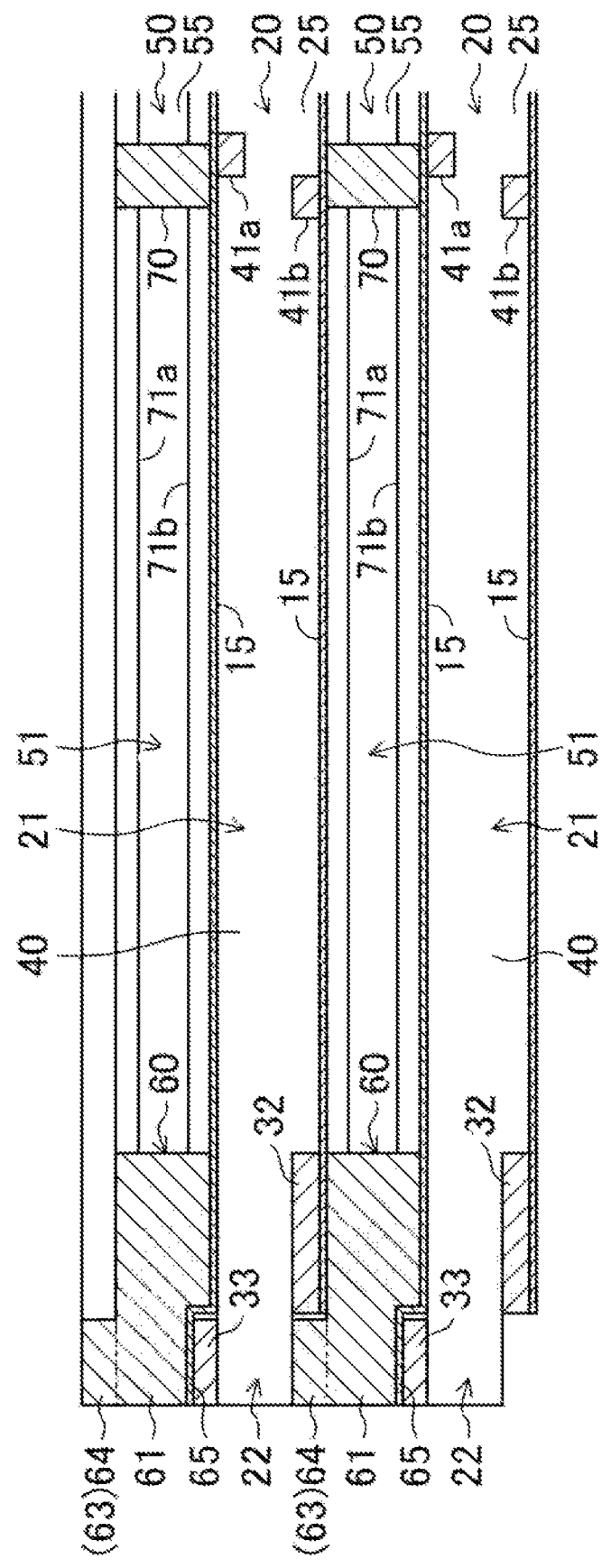
FIG. 11 is a cross-sectional view of part of the heat exchanger taken along line XI-XI in FIG. 3.
Figure 12:
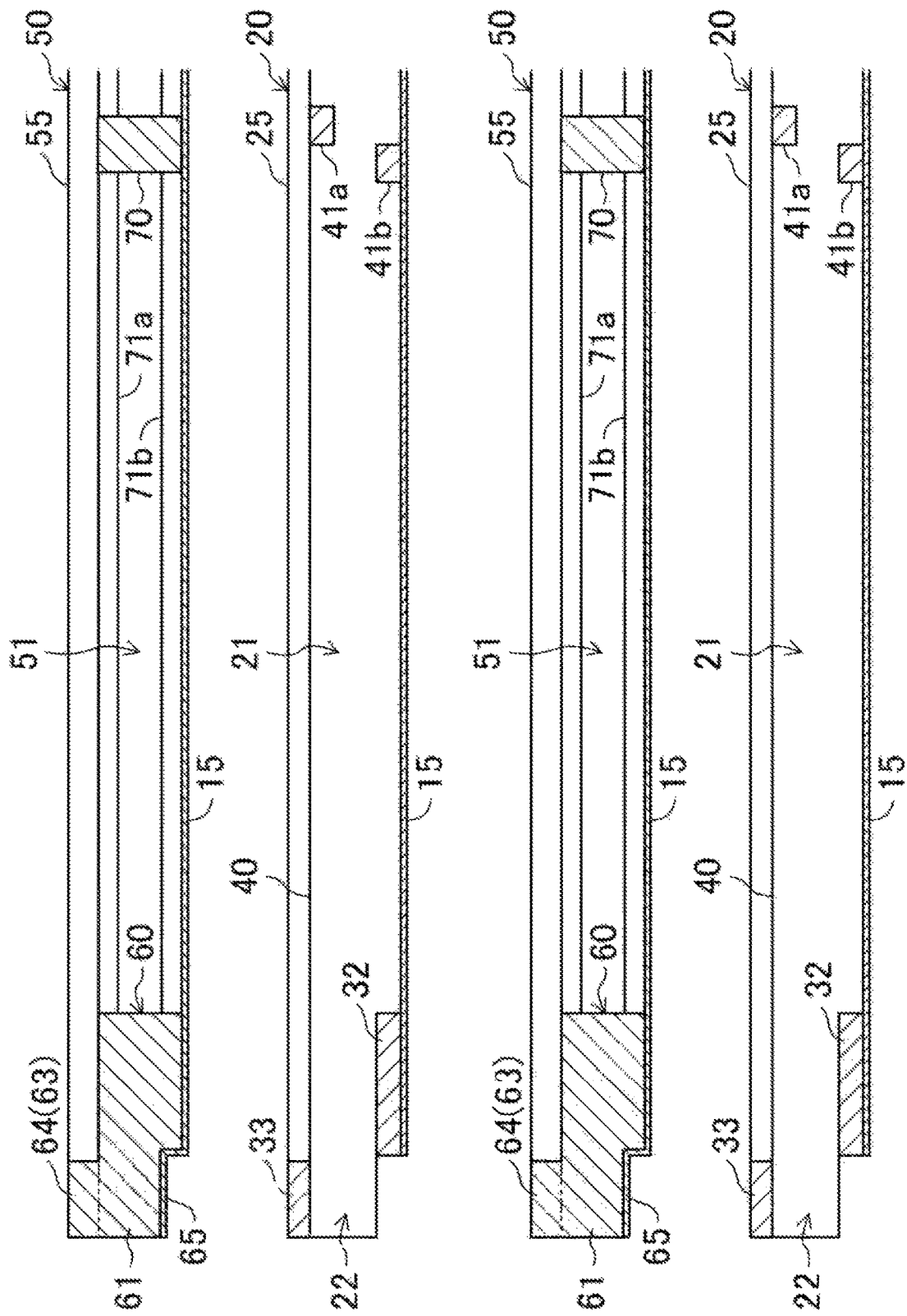
FIG. 12 is a cross-sectional view of portion first and second elements according to the first embodiment arranged one above the other, corresponding to FIG. 11.

As illustrated in FIGS. 5 to 7, the auxiliary rib (32) extends along each of the first communication openings (22). The auxiliary rib (32) is arranged on the back surface of the frame portion (30). As illustrated in FIGS. 11 and 12, the auxiliary rib (32) has a flat rectangular cross section. The front surface of the auxiliary rib (32) is flush with a tip end face (the upper surface in FIG. 11) of the ridge (64) of the adjacent second frame (55). The back surface of the auxiliary rib (32) is flush with the back surface of the blocking portion (31).

First Inner Rib, First Holding Rib

As illustrated in FIGS. 5 to 7, the first frame (25) includes first inner ribs (40) and first holding ribs (41a, 41b). The first inner ribs (40) and the first holding ribs (41a, 41b) are provided in each end area (27a, 27b) of the first frame (25).

Each of the first inner ribs (40) is formed in a straight bar shape, and extends in a direction intersecting with the first communication opening (22). In the present embodiment, the first inner ribs (40) extend from the side of the frame portion (30) where the first communication opening (22) is formed in a direction substantially orthogonal to the side.

The height of the first inner ribs (40) is substantially equal to the thickness of the first passage (21) (see FIG. 11).

In each of the end areas (27a, 27b) of the first frame (25) of the present embodiment, four first inner ribs (40) are arranged in parallel to each other at substantially regular intervals. In each end area (27a, 27b), the auxiliary rib (32) connects the four first inner ribs (40) to each other. The first inner ribs (40) are integral with the auxiliary rib (32). The back surfaces of the first inner ribs (40) are flush with the back surface of the auxiliary rib (32).

Each of the first holding ribs (41a, 41b) is formed in a straight bar shape, and extends in a direction substantially orthogonal to the first inner ribs (40). Each of the first holding ribs (41a, 41b) extends from one of an adjacent pair of the first inner ribs (40) to the other. In other words, each of the first holding ribs (41a, 41b) extends across the first passage (21) between an adjacent pair of the first inner ribs (40).

As illustrated in FIGS. 6 and 7, between an adjacent pair of the first inner ribs (40), the first holding ribs (41a) are arranged on the front side of the first frame (25), and the first holding ribs (41b) are arranged on the back side of the first frame (25). The front surfaces of the first holding ribs (41a) on the front side of the first frame (25) are flush with the front surfaces of the first inner ribs (40) and the front surface of the blocking portion (31). The back surfaces of the first holding ribs (41b) on the back side of the first frame (25) are flush with the back surfaces of the first inner ribs (40) and the back surface of the blocking portion (31).

As illustrated in FIG. 11, the first holding ribs (41a, 41b) are provided along second inner ribs (70), which will be described later, of the second frame (55). In plan view, each of the first holding ribs (41a, 41b) overlaps with an associated one of the second inner ribs (70) of the adjacent second frame (55) over the entire length thereof. The first holding ribs (41a) on the front side of the first frame (25) and the first holding ribs (41b) on the back side thereof are arranged not to overlap with each other in plan view.

Each of the first holding ribs (41a, 41b) is less than half as thick as the first inner ribs (40). The first holding ribs (41a) on the front side of the first frame (25) and the first holding ribs (41b) on the back side thereof are separated from each other in the thickness direction of the first inner ribs (40).

Intra-First Passage Rib, First Support Rib

As illustrated in FIGS. 5 to 7, the first frame (25) includes intra-first passage ribs (45) and first support ribs (46a, 46b). The intra-first passage ribs (45) and the first support ribs (46a, 46b) are provided in the middle area (26) of the first frame (25).

Each of the intra-first passage ribs (45) is formed in a straight bar shape, and extends in a direction parallel to the long side of the middle area (26). In other words, the intra-first passage ribs (45) extend from one end area (27a) toward the other end area (27b). The height of the intra-first passage ribs (45) is substantially equal to the thickness of the first passage (21) (see FIG. 15). In the middle area (26) of the first frame (25) of the present embodiment, nine intra-first passage ribs (45) are arranged in parallel to each other at substantially regular intervals.

Figure 15:
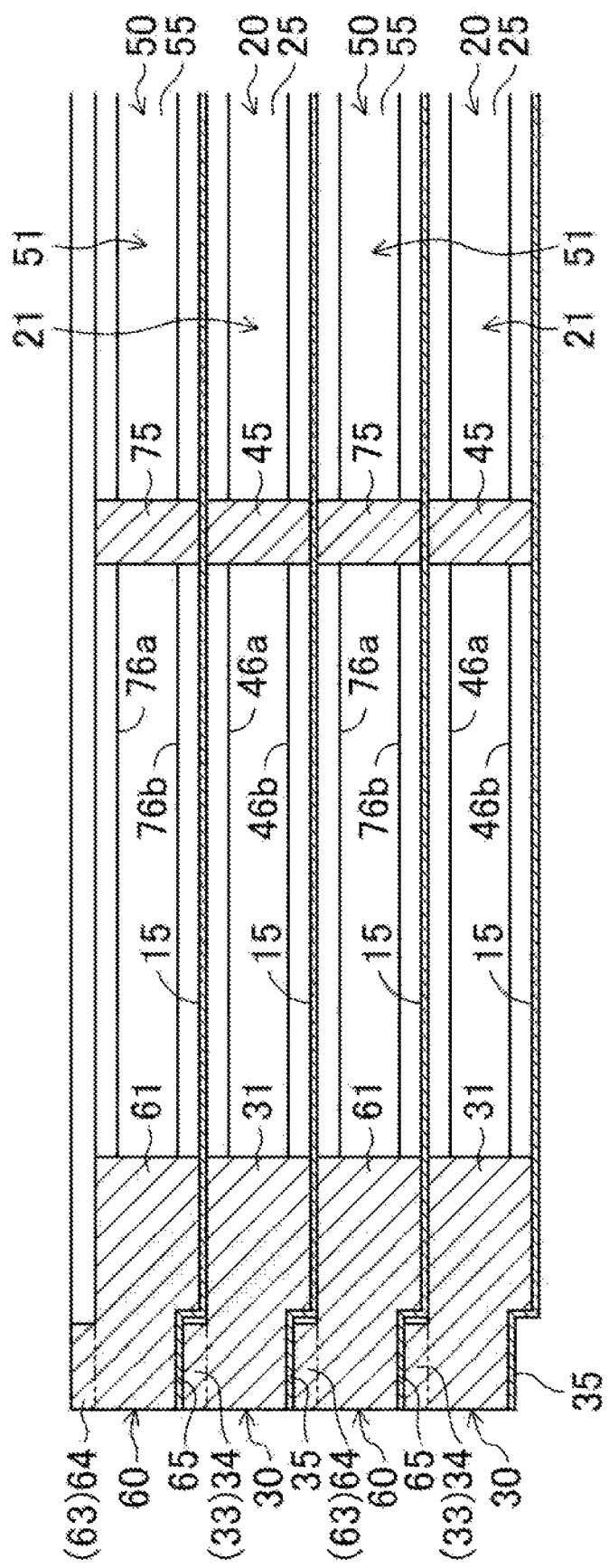
FIG. 15 is a cross-sectional view of part of the heat exchanger taken along line XV-XV in FIG. 3.
Figure 16:
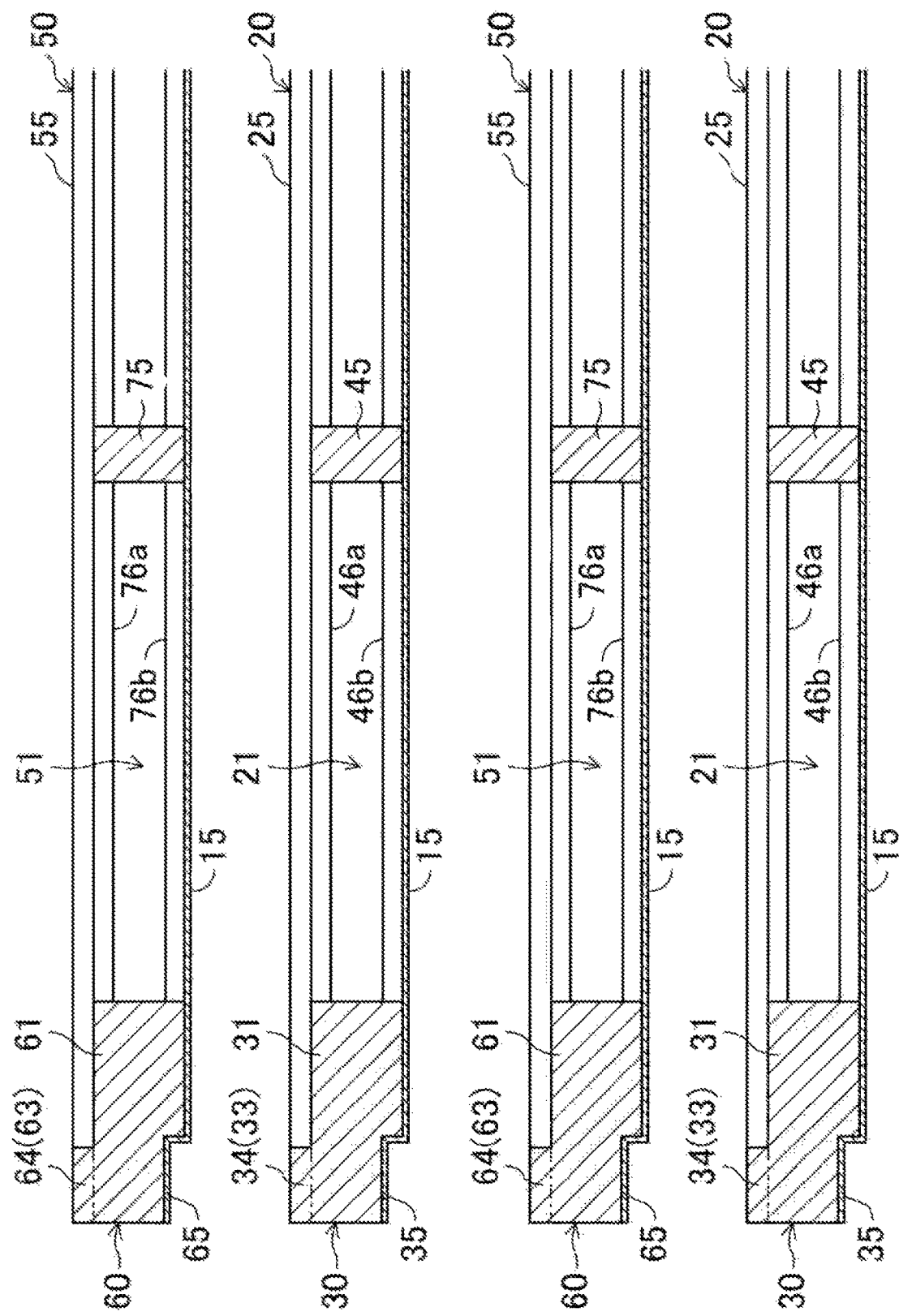
FIG. 16 is a cross-sectional view of portion of the first and second elements according to the first embodiment arranged one above the other, corresponding to FIG. 15.

As illustrated in FIGS. 5 and 15, each of the first support ribs (46a, 46b) is formed in a straight bar shape, and extends in a direction substantially orthogonal to the intra-first passage ribs (45). Each of the first support ribs (46a, 46b) is formed to extend from one of an adjacent pair of the intra-first passage ribs (45) to the other. In other words, each of the first support ribs (46a, 46b) extends across the first passage (21) between an adjacent pair of the intra-first passage ribs (45).

As illustrated in FIG. 15, between an adjacent pair of the intra-first passage ribs (45), the first support ribs (46a) are arranged on the front side of the first frame (25), and the first support ribs (46b) are arranged on the back side of the first frame (25). The front surfaces of the first support ribs (46a) on the front side of the first frame (25) are flush with the front surfaces of the intra-first passage ribs (45) and the front surface of the blocking portion (31). The back surfaces of the first support ribs (46b) on the back side of the first frame (25) are flush with the back surfaces of the intra-first passage ribs (45) and the back surface of the blocking portion (31).

Each of the first support ribs (46a, 46b) is less than half as thick as the intra-first passage ribs (45). The first support ribs (46a) on the front side of the first frame (25) and the first support ribs (46b) on the back side thereof are separated from each other in the thickness direction of the intra-first passage ribs (45). The first support ribs (46a) on the front side of the first frame (25) and the first support ribs (46b) on the back side thereof are arranged not to overlap with each other in plan view.

Second Frame

Figure 8:
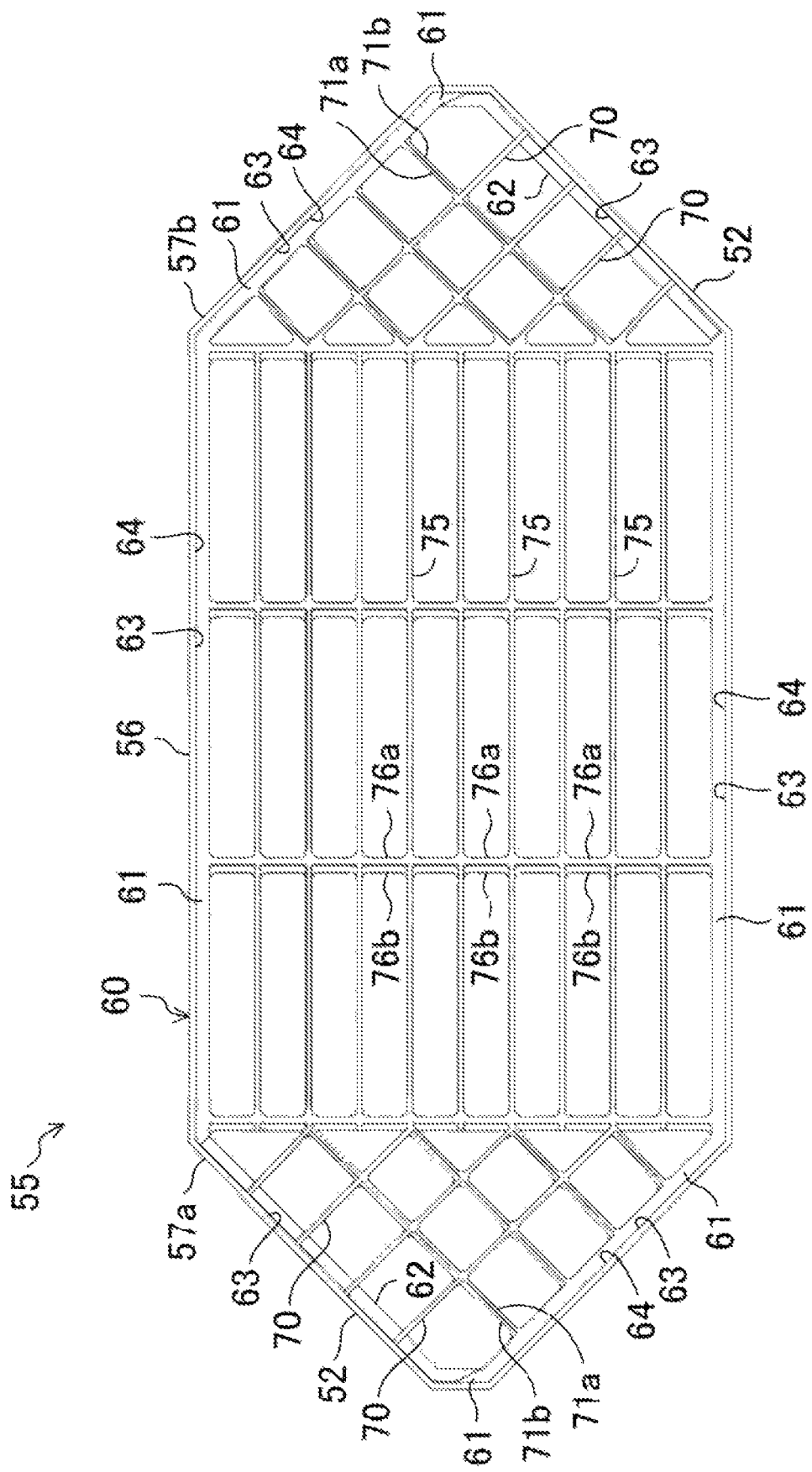
FIG. 8 is a plan view of a second frame according to the first embodiment.

As illustrated in FIG. 8, the second frame (55) is formed in a horizontally oriented octagonal shape in plan view. The second frame (55) has substantially the same outer shape as the end faces of the heat exchanger (10) in plan view. The second frame (55) is a second spacing member that keeps a space between an adjacent pair of the partition sheets (15).

The second frame (55) has a single middle area (56) and two end areas (57a, 57b). The middle area (56) is a horizontally oriented rectangular area, and is located at the middle in the right-to-left direction in FIG. 8. In the second frame (55), the end areas (57a, 57b) are formed on both sides of the middle area (56). The end areas (57a, 57b) are trapezoidal areas located on the sides of the middle area (56) in the right-to-left direction in FIG. 8.

Frame Portion

The second frame (55) includes a frame portion (60). The frame portion (60) is a portion extending along the outer periphery of the second frame (55) over the entire perimeter of the second frame (55). In other words, the frame portion (60) is formed in a horizontally oriented octagonal frame shape. The frame portion (60) surrounds the periphery of the second passage (51) formed of the second frame (55). The frame portion (60) extends along the periphery of the partition sheet (15).

The frame portion (60) of the second frame (55) has two second communication openings (52). Each second communication opening (52) allows the second passage (51) surrounded by the frame portion (60) to communicate with the outside of the frame portion (60). In the frame portion (60) shown in FIG. 8, one of the second communication openings (52) is formed over substantially the entire length of the upward oblique side of the left end area (57a), and constitutes the second outflow port (52b). Also in the frame portion (60) shown in FIG. 8, the other second communication opening (52) is formed over substantially the entire length of the downward oblique side of the right end area (57b), and constitutes the second inflow port (52a).

Figure 9:
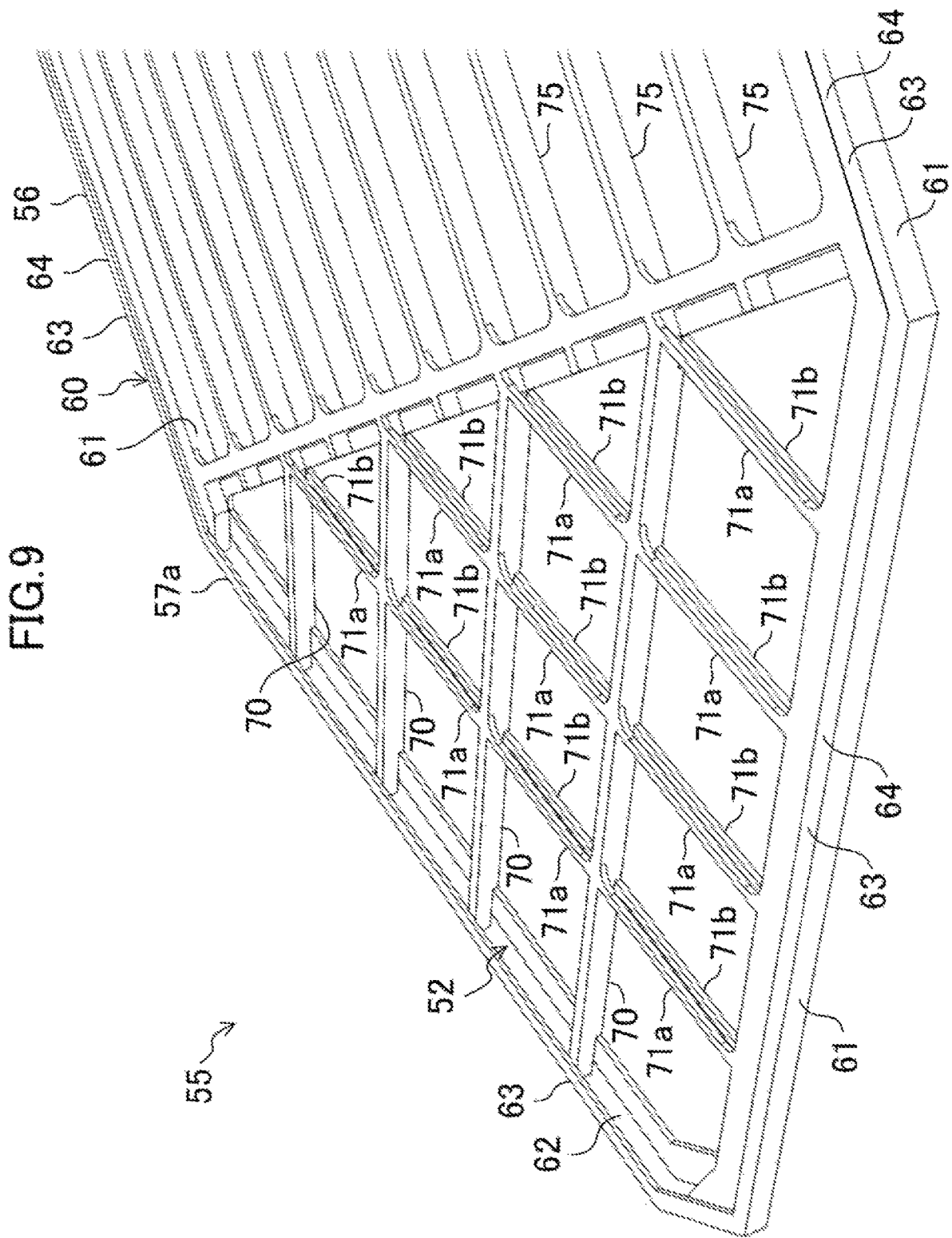
FIG. 9 is a perspective view of part of the second frame according to the first embodiment as viewed from the front side.
Figure 10:
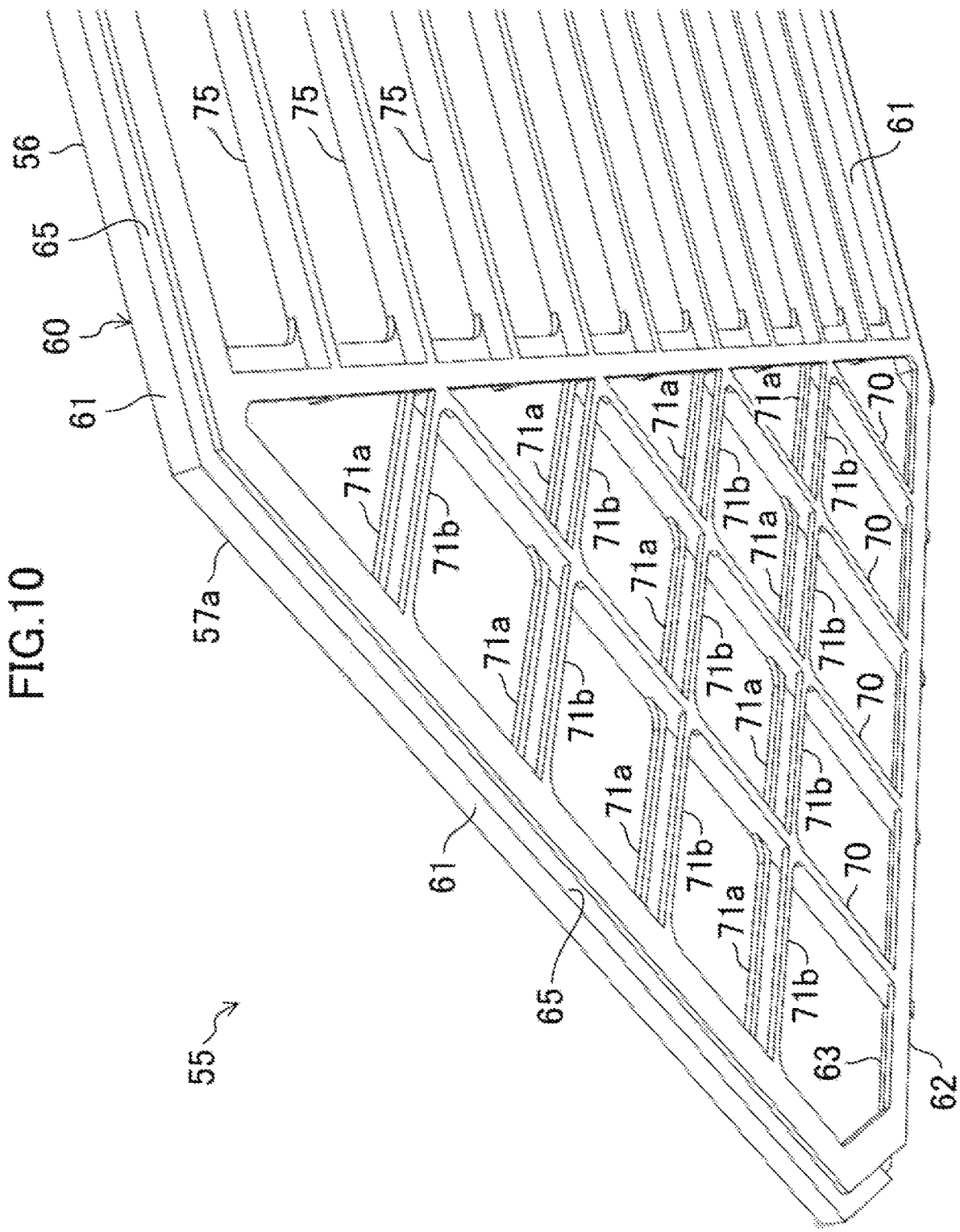
FIG. 10 is a perspective view of part of the second frame according to the first embodiment as viewed from the back side.

As illustrated in FIGS. 8 to 10, the frame portion (60) of the second frame (55) includes a blocking portion (61), an outer rib (63), and an auxiliary rib (62). A portion of the outer rib (63) constitutes a ridge (64). An elongated recess (65) is formed in the blocking portion (61).

The blocking portion (61) extends along six sides of the frame portion (60) where no second communication openings (52) are formed. When viewed in section as illustrated in FIGS. 11, 12, 15, and 16, the blocking portion (61) is in the shape of a rectangle one corner of which is cut off. The blocking portion (61) separates the second passage (51) surrounded by the frame portion (60) from the outside of the frame portion (60). The thickness of the blocking portion (61) is substantially equal to the thickness of the second passage (51).

As illustrated in FIG. 8, the outer rib (63) is a portion extending along the outer periphery of the frame portion (60) over the entire perimeter of the frame portion (60). The outer rib (63) is formed along all the eight sides of the frame portion (60). The outer rib (63) is arranged on the front surface of the blocking portion (61) and integral with the blocking portion (61).

As illustrated in FIGS. 11, 12, 15, and 16, a portion of the outer rib (63) adjacent to the blocking portion (61) serves as the ridge (64). The ridge (64) extends along the outermost peripheral edge of the blocking portion (61) and protrudes from the front surface of the blocking portion (61). The outer peripheral surface of the ridge (64) forms a plane together with the outer peripheral surface of the blocking portion (61).

As illustrated in FIGS. 11, 12, 15, and 16, the elongated recess (65) is a recessed groove that opens on the back surface of the blocking portion (61). The elongated recess (65) is formed along the outermost peripheral edge of the blocking portion (61) over the entire length of the blocking portion (61). The elongated recess (65) also opens on the outer peripheral surface of the blocking portion (61). The cross-sectional shape of the elongated recess (65) corresponds to the cross-sectional shape of the ridge (34) of the first frame (25). The outer rib (33) of the first frame (25) fits into the elongated recess (65) of the second frame (55). Thus, the ridge (34), which is a portion of the outer rib (33) of the first frame (25), fits into the elongated recess (65) of the second frame (55).

Figure 13:
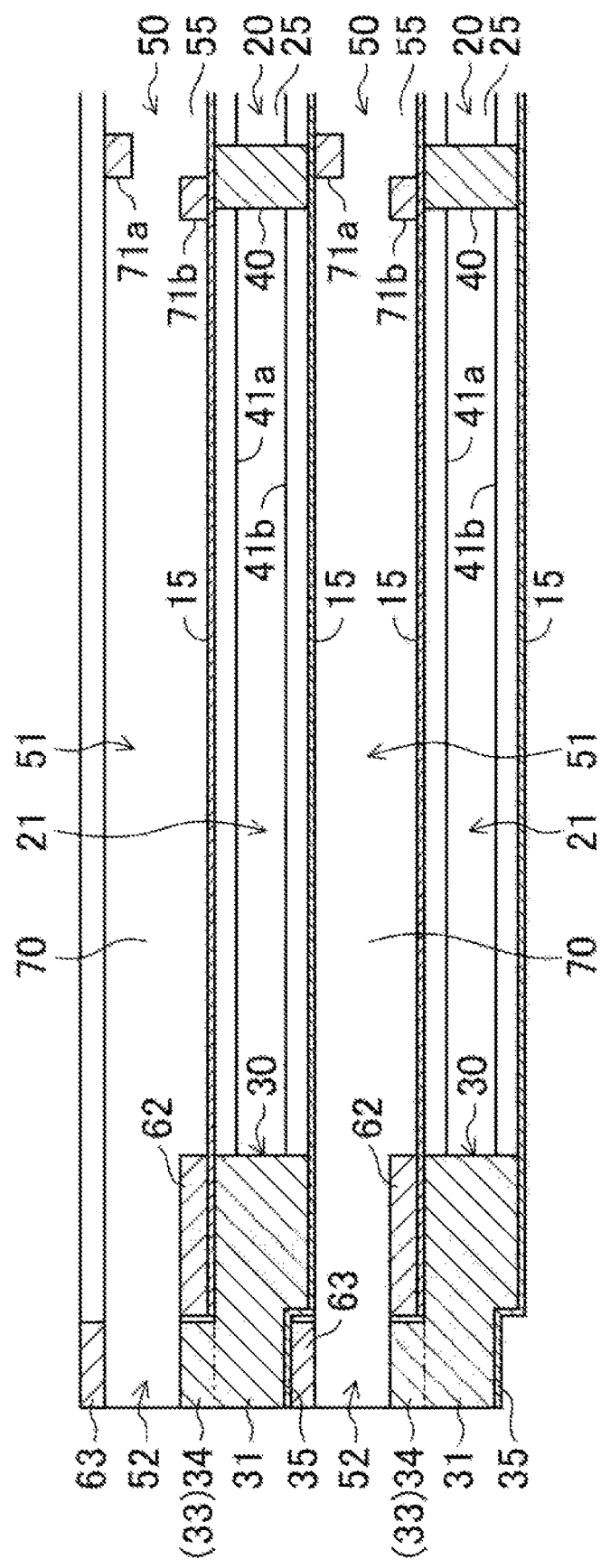
FIG. 13 is a cross-sectional view of part of the heat exchanger taken along line XIII-XIII in FIG. 3.
Figure 14:
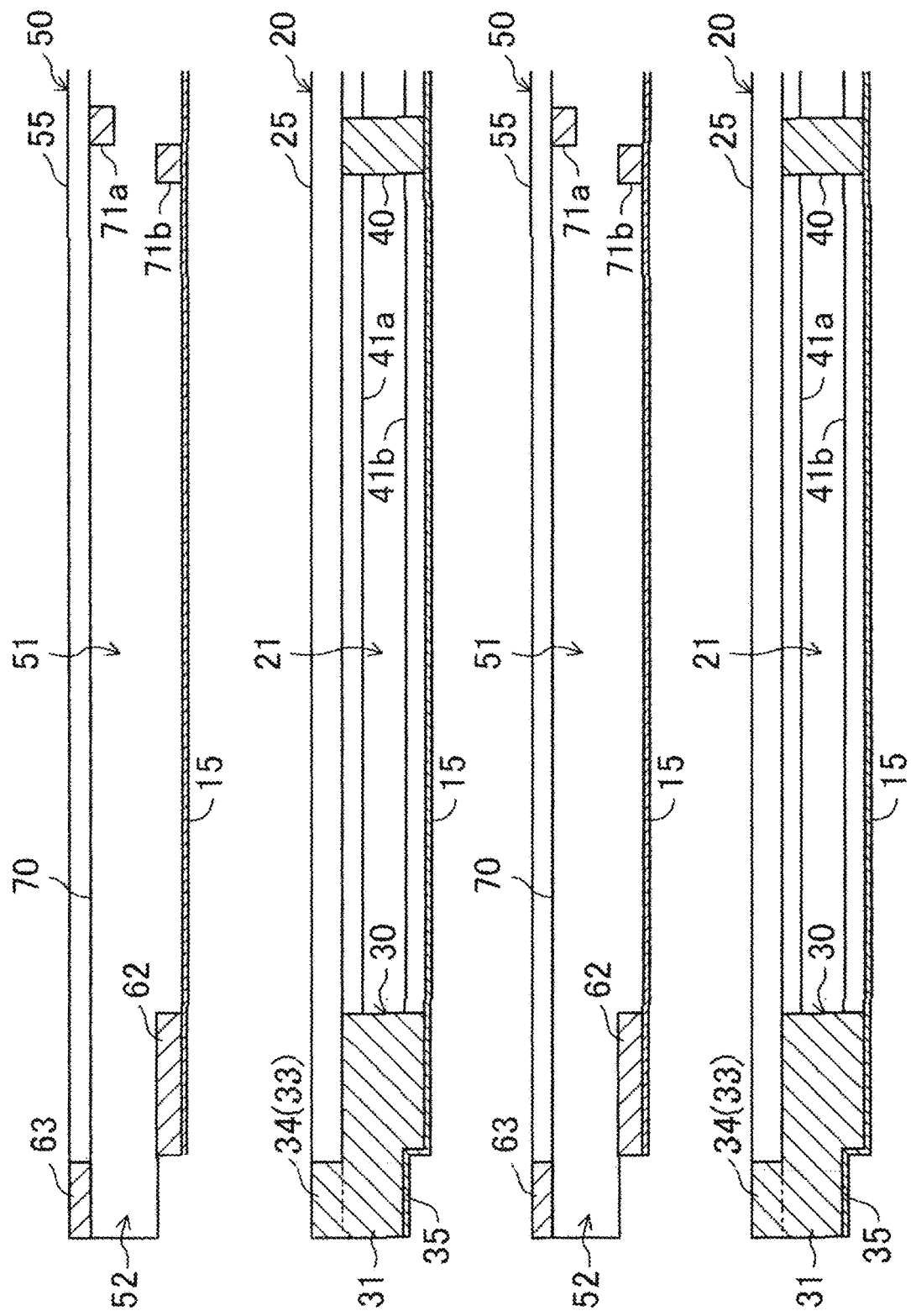
FIG. 14 is a cross-sectional view of portion of the first and second elements according to the first embodiment arranged one above the other, corresponding to FIG. 13.

As illustrated in FIGS. 8 to 10, the auxiliary rib (62) extends along each of the second communication openings (52). The auxiliary rib (62) is arranged on the back surface of the frame portion (60). As illustrated in FIGS. 13 and 14, the auxiliary rib (62) has a flat rectangular cross section. The front surface of the auxiliary rib (62) is flush with a tip end face (the upper surface in FIG. 13) of the ridge (34) of the adjacent first frame (25). The back surface of the auxiliary rib (62) is flush with the back surface of the blocking portion (61).

Second Inner Rib, Second Holding Rib

As illustrated in FIGS. 8 to 10, the second frame (55) includes second inner ribs (70) and second holding ribs (71a, 71b). The second inner ribs (70) and the second holding ribs (71a, 71b) are provided in each end area (57a, 57b) of the second frame (55).

Each of the second inner ribs (70) is formed in a straight bar shape, and extends in a direction intersecting with the second communication opening (52). In the present embodiment, the second inner ribs (70) extend from the side of the frame portion (60) where the second communication opening (52) is formed in a direction substantially orthogonal to the side. The height of the second inner ribs (70) is substantially equal to the thickness of the second passage (51) (see FIG. 13).

In each of the end areas (57a, 57b) of the second frame (55) of the present embodiment, four second inner ribs (70) are arranged in parallel to each other at substantially regular intervals. In each end area (57a, 57b), the auxiliary rib (62) connects the four second inner ribs (70) to each other. The second inner ribs (70) are integral with the auxiliary rib (62). The back surfaces of the second inner ribs (70) are flush with the back surface of the auxiliary rib (62).

Each of the second holding ribs (71a, 71b) is formed in a straight bar shape, and extends in a direction substantially orthogonal to the second inner ribs (70). Each of the second holding ribs (71a, 71b) is formed to extend from one of an adjacent pair of the second inner ribs (70) to the other. In other words, each of the second holding ribs (71a, 71b) extends across the second passage (51) between an adjacent pair of the second inner ribs (70).

As illustrated in FIGS. 9 and 10, between an adjacent pair of the second inner ribs (70), the second holding ribs (71a) are arranged on the front side of the second frame (55), and the second holding ribs (71b) are arranged on the back side of the second frame (55). The front surfaces of the second holding ribs (71a) on the front side of the second frame (55) are flush with the front surfaces of the second inner ribs (70) and the front surface of the blocking portion (61). The back surfaces of the second holding ribs (71b) on the back side of the second frame (55) are flush with the back surfaces of the second inner ribs (70) and the back surface of the blocking portion (61).

As illustrated in FIG. 13, the second holding ribs (71a, 71b) are provided along the first inner ribs (40) of the first frame (25). In plan view, each of the second holding ribs (71a, 71b) overlaps with an associated one of the first inner ribs (40) of the adjacent first frame (25) over the entire length thereof. The second holding ribs (71a) on the front side of the second frame (55) and the second holding ribs (71b) on the back side thereof are arranged not to overlap with each other in plan view.

Each of the second holding ribs (71a, 71b) is less than half as thick as the second inner ribs (70). The second holding ribs (71a) on the front side of the second frame (55) and the second holding ribs (71b) on the back side thereof are separated from each other in the thickness direction of the second inner ribs (70).

Intra-Second Passage Rib, Second Support Rib

As illustrated in FIGS. 8 to 10, the second frame (55) includes intra-second passage ribs (75) and second support ribs (76a, 76b). The intra-second passage ribs (75) and the second support ribs (76a, 76b) are provided in the middle area (56) of the second frame (55).

Each of the intra-second passage ribs (75) is formed in a straight bar shape, and extends in a direction parallel to the long side of the middle area (56). In other words, the intra-second passage ribs (75) extend from one end area (57a) toward the other end area (57b). The height of the intra-second passage ribs (75) is substantially equal to the thickness of the second passage (51) (see FIG. 15). In the middle area (56) of the second frame (55) of the present embodiment, nine intra-second passage ribs (75) are arranged in parallel to each other at substantially regular intervals.

As illustrated in FIGS. 8 and 15, each of the second support ribs (76a, 76b) is formed in a straight bar shape, and extends in a direction substantially orthogonal to the intra-second passage ribs (75). Each of the second support ribs (76a, 76b) is formed to extend from one of an adjacent pair of the intra-second passage ribs (75) to the other. In other words, each of the second support ribs (76a, 76b) extends across the second passage (51) between an adjacent pair of the intra-second passage ribs (75).

As illustrated in FIG. 15, between an adjacent pair of the intra-second passage ribs (75), the second support ribs (76a) are arranged on the front side of the second frame (55), and the second support ribs (76b) are arranged on the back side of the second frame (55). The front surfaces of the second support ribs (76a) on the front side of the second frame (55) are flush with the front surfaces of the intra-second passage ribs (75) and the front surface of the blocking portion (61). The back surfaces of the second support ribs (76b) on the back side of the second frame (55) are flush with the back surfaces of the intra-second passage ribs (75) and the back surface of the blocking portion (61).

Each of the second support ribs (76a, 76b) is less than half as thick as the intra-second passage ribs (75). The second support ribs (76a) on the front side of the second frame (55) and the second support ribs (76b) on the back side thereof are separated from each other in the thickness direction of the intra-second passage ribs (75). The second support ribs (76a) on the front side of the second frame (55) and the second support ribs (76b) on the back side thereof are arranged not to overlap with each other in plan view.

Structure for Holding Partition Sheet

The first element (20) includes the partition sheet (15) bonded to the back surface of the first frame (25). Specifically, in the frame portion (30) of the first frame (25), the partition sheet (15) is bonded to the back surfaces of the blocking portion (31) and the auxiliary rib (32) (see FIGS. 12, 14, and 16). The partition sheet (15) is bonded to the wall surface of the elongated recess (35) of the blocking portion (31). The wall surface of the elongated recess (35) is covered with the partition sheet (15). In each of the end areas (27a, 27b) of the first frame (25), the partition sheet (15) is bonded to the first inner ribs (40) and the first holding ribs (41b) on the back side. In the middle area (26) of the first frame (25), the partition sheet (15) is bonded to the intra-first passage ribs (45) and the first support ribs (46b) on the back side.

The second element (50) includes the partition sheet (15) bonded to the back surface of the second frame (55). Specifically, in the frame portion (60) of the second frame (55), the partition sheet (15) is bonded to the back surfaces of the blocking portion (61) and the auxiliary rib (62) (see FIGS. 12, 14, and 16). The partition sheet (15) is bonded to the wall surface of the elongated recess (65) of the blocking portion (61). The wall surface of the elongated recess (65) is covered with the partition sheet (15). In each of the end areas (57a, 57b) of the second frame (55), the partition sheet (15) is bonded to the second inner ribs (70) and the second holding ribs (71b) on the back side. In the middle area (56) of the second frame (55), the partition sheet (15) is bonded to the intra-second passage ribs (75) and the second support ribs (76b) on the back side.

The heat exchanger (10) includes the first elements (20) and the second elements (50) that are alternately stacked. The partition sheet (15) of each of the elements (20, 50) is sandwiched between an adjacent pair of the first frame (25) and the second frame (55).

Holding Structure (1) in Auxiliary Heat Exchange Section

As illustrated in FIG. 11, at the first communication opening (22) of the auxiliary heat exchange section (12a, 12b) of the heat exchanger (10), a portion of the outer rib (33) of the first frame (25) along the first communication opening (22) fits into the elongated recess (65) of the blocking portion (61) of the adjacent second frame (55) located on the front side of the first frame (25). The partition sheet (15) covers the wall surface of the elongated recess (65) of the blocking portion (61) of the second frame (55). Thus, the partition sheet (15) bonded to the blocking portion (61) of the second frame (55) is sandwiched between the front surface of the outer rib (33) of the first frame (25) and the wall surface of the elongated recess (65) of the second frame (55). In this way, the partition sheet (15) of the second element (50) is bonded to the blocking portion (61) of the second frame (55) and sandwiched between the outer rib (33) of the first frame (25) and the blocking portion (61) of the second frame (55).

At the first communication opening (22) of the auxiliary heat exchange section (12a, 12b) of the heat exchanger (10), the back surface of the auxiliary rib (32) of the first frame (25) faces the front surface of the blocking portion (61) of the adjacent second frame (55) located on the back side of the first frame (25). The partition sheet (15) covers the back surface of the auxiliary rib (32) of the first frame (25). Thus, the partition sheet (15) bonded to the auxiliary rib (32) of the first frame (25) is sandwiched between the back surface of the auxiliary rib (32) of the first frame (25) and the front surface of the blocking portion (61) of the second frame (55). In this way, the partition sheet (15) of the first element (20) is bonded to the auxiliary rib (32) of the first frame (25) and sandwiched between the auxiliary rib (32) of the first frame (25) and the blocking portion (61) of the second frame (55).

In the auxiliary heat exchange section (12a, 12b) of the heat exchanger (10), the front surfaces of the first holding ribs (41a) on the front side of the first frame (25) face the back surfaces of the second inner ribs (70) of the adjacent second frame (55) located on the front side of the first frame (25). The partition sheet (15) is bonded to the back surfaces of the second inner ribs (70) of the second frame (55). Thus, the partition sheet (15) bonded to the second inner ribs (70) of the second frame (55) is sandwiched between the front surfaces of the first holding ribs (41a) of the first frame (25) and the back surfaces of the second inner ribs (70) of the second frame (55). In this way, the partition sheet (15) of the second element (50) is bonded to the second inner ribs (70) of the second frame (55) and sandwiched between the first holding ribs (41a) of the first frame (25) and the second inner ribs (70) of the second frame (55).

In the auxiliary heat exchange sections (12a, 12b) of the heat exchanger (10), the back surfaces of the first holding ribs (41b) on the back side of the first frame (25) face the front surfaces of the second inner ribs (70) of the adjacent second frame (55) located on the back side of the first frame (25). The partition sheet (15) is bonded to the back surfaces of the first holding ribs (41b) of the first frame (25). Thus, the partition sheet (15) bonded to the first holding ribs (41b) of the first frame (25) is sandwiched between the back surfaces of the first holding ribs (41b) of the first frame (25) and the front surfaces of the second inner ribs (70) of the second frame (55). In this way, the partition sheet (15) of the first element (20) is bonded to the first holding ribs (41b) of the first frame (25) and sandwiched between the first holding ribs (41b) of the first frame (25) and the second inner ribs (70) of the second frame (55).

Holding Structure (2) in Auxiliary Heat Exchange Section

As illustrated in FIG. 13, at the second communication opening (52) of the auxiliary heat exchange section (12a, 12b) of the heat exchanger (10), a portion of the outer rib (63) of the second frame (55) along the second communication opening (52) fits into the elongated recess (35) of the blocking portion (31) of the adjacent first frame (25) located on the front side of the second frame (55). The partition sheet (15) covers the wall surface of the elongated recess (35) of the blocking portion (31) of the first frame (25). Thus, the partition sheet (15) bonded to the blocking portion

(31) of the first frame (25) is sandwiched between the front surface of the outer rib (63) of the second frame (55) and the wall surface of the elongated recess (35) of the first frame (25). In this way, the partition sheet (15) of the first element (20) is bonded to the blocking portion (31) of the first frame (25) and sandwiched between the outer rib (63) of the second frame (55) and the blocking portion (31) of the first frame (25).

At the second communication opening (52) of the auxiliary heat exchange section (12a, 12b) of the heat exchanger (10), the back surface of the auxiliary rib (62) of the second frame (55) faces the front surface of the blocking portion (31) of the adjacent first frame (25) located on the back side of the second frame (55). The partition sheet (15) covers the back surface of the auxiliary rib (62) of the second frame (55). Thus, the partition sheet (15) bonded to the auxiliary rib (62) of the second frame (55) is sandwiched between the back surface of the auxiliary rib (62) of the second frame (55) and the front surface of the blocking portion (31) of the first frame (25). In this way, the partition sheet (15) of the second element (50) is bonded to the auxiliary rib (62) of the second frame (55) and sandwiched between the auxiliary rib (62) of the second frame (55) and the blocking portion (31) of the first frame (25).

In the auxiliary heat exchange section (12a, 12b) of the heat exchanger (10), the front surfaces of the second holding ribs (71a) on the front side of the second frame (55) face the back surfaces of the first inner ribs (40) of the adjacent first frame (25) located on the front side of the second frame (55). The partition sheet (15) is bonded to the back surfaces of the first inner ribs (40) of the first frame (25). Thus, the partition sheet (15) bonded to the first inner ribs (40) of the first frame (25) is sandwiched between the front surfaces of the second holding ribs (71a) of the second frame (55) and the back surfaces of the first inner ribs (40) of the first frame (25). In this way, the partition sheet (15) of the first element (20) is bonded to the first inner ribs (40) of the first frame (25) and sandwiched between the second holding ribs (71a) of the second frame (55) and the first inner ribs (40) of the first frame (25).

In the auxiliary heat exchange section (12a, 12b) of the heat exchanger (10), the back surfaces of the second holding ribs (71b) on the back side of the second frame (55) face the front surfaces of the first inner ribs (40) of the adjacent first frame (25) located on the back side of the second frame (55). In the second frame (55), the partition sheet (15) is bonded to the back surfaces of the second holding ribs (71b). Thus, the partition sheet (15) bonded to the second holding ribs (71b) of the second frame (55) is sandwiched between the back surfaces of the second holding ribs (71b) of the second frame (55) and the front surfaces of the first inner ribs (40) of the first frame (25). In this way, the partition sheet (15) of the second element (50) is bonded to the second holding ribs (71b) of the second frame (55) and sandwiched between the second holding ribs (71b) of the second frame (55) and the first inner ribs (40) of the first frame (25).

Holding Structure in Main Heat Exchange Portion

In the main heat exchange section (11) of the heat exchanger (10), the back surfaces of the intra-first passage ribs (45) of the first frame (25) face the front surfaces of the intra-second passage ribs (75) of the adjacent second frame (55) located on the back side of the first frame (25). The partition sheet (15) is bonded to the back surfaces of the intra-first passage ribs (45) of the first frame (25). Thus, the partition sheet (15) bonded to the intra-first passage ribs (45) of the first frame (25) is sandwiched between the back surfaces of the intra-first passage ribs (45) of the first frame (25) and the front surfaces of the intra-second passage ribs (75) of the second frame (55). In this way, the partition sheet (15) of the first element (20) is bonded to the intra-first passage ribs (45) of the first frame (25) and sandwiched between the intra-first passage ribs (45) of the first frame (25) and the intra-second passage ribs (75) of the second frame (55).

In the main heat exchange section (11) of the heat exchanger (10), the back surfaces of the first support ribs (46b) on the back side of the first frame (25) face the front surfaces of the second support ribs (76a) of the adjacent second frame (55) located on the back side of the first frame (25). The partition sheet (15) is bonded to the back surfaces of the first support ribs (46b) of the first frame (25). Thus, the partition sheet (15) bonded to the first support ribs (46b) of the first frame (25) is sandwiched between the back surfaces of the first support ribs (46b) of the first frame (25) and the front surfaces of the second support ribs (76a) of the second frame (55). In this way, the partition sheet (15) of the first element (20) is bonded to the first support ribs (46b) of the first frame (25) and sandwiched between the first support ribs (46b) of the first frame (25) and the second support ribs (76a) of the second frame (55).

In the main heat exchange section (11) of the heat exchanger (10), the back surfaces of the intra-second passage ribs (75) of the second frame (55) face the front surfaces of the intra-first passage ribs (45) of the adjacent first frame (25) located on the back side of the second frame (55). In the second frame (55), the partition sheet (15) is bonded to the back surfaces of the intra-second passage ribs (75). Thus, the partition sheet (15) bonded to the intra-second passage ribs (75) of the second frame (55) is sandwiched between the back surfaces of the intra-second passage ribs (75) of the second frame (55) and the front surfaces of the intra-first passage ribs (45) of the first frame (25). In this way, the partition sheet (15) of the second element (50) is bonded to the intra-second passage ribs (75) of the second frame (55) and sandwiched between the intra-second passage ribs (75) of the second frame (55) and the intra-first passage ribs (45) of the first frame (25).

In the main heat exchange section (11) of the heat exchanger (10), the back surfaces of the second support ribs (76b) on the back side of the second frame (55) face the front surfaces of the first support ribs (46a) of the adjacent first frame (25) located on the back side of the second frame (55). The partition sheet (15) is bonded to the back surfaces of the second support ribs (76b) of the second frame (55). Thus, the partition sheet (15) bonded to the second support ribs (76b) of the second frame (55) is sandwiched between the back surfaces of the second support ribs (76b) of the second frame (55) and the front surfaces of the first support ribs (46a) of the first frame (25). In this way, the partition sheet (15) of the second element (50) is bonded to the second support ribs (76b) of the second frame (55) and sandwiched between the second support ribs (76b) of the second frame (55) and the first support ribs (46a) of the first frame (25).

Feature (1) of First Embodiment

The heat exchanger (10) of the present embodiment includes the plurality of flat sheet-like partition sheets (15) and the frames (25, 55) that are alternately stacked with the partition sheets (15) to keep a space between an adjacent pair of the partition sheets (15). The first passages (21) and the second passages (51) are alternately formed in the heat exchanger (10) with the partition sheets (15) interposed therebetween. Each of the frames (25, 55) has the frame portion (30, 60) formed along the periphery of the partition sheets (15).

The frame portion (30, 60) has the ridge (34, 64) and the elongated recess (35, 65). The ridge (34, 64) is formed on one of the surfaces of the frame portion (30, 60) facing the stacking direction of the partition sheets (15) and extends in the extending direction of the frame portion (30, 60). The elongated recess (35, 65) is formed on the other surface of the frame portion (30, 60) facing the stacking direction of the partition sheets (15) and extends in the extending direction of the frame portion (30, 60).

The ridge (34, 64) of one of an adjacent pair of the frames (25, 55) of the heat exchanger (10) fits into the elongated recess (35, 65) of the other. The partition sheets (15) are each sandwiched between the ridge (34, 64) of one of a pair of the first frame (25) and the second frame (55) adjacent to the partition sheet (15) and the elongated recess (35, 65) of the other.

The heat exchanger (10) of the present embodiment includes the partition sheets (15) and the frames (25, 55) that are alternately stacked, and the first passages (21) and the second passages (51) that are alternately formed. The heat exchanger (10) causes the supply air flowing through the first passage (21) and the exhaust air flowing through the second passage (51) to exchange sensible heat and latent heat (moisture) through the partition sheet (15).

In the heat exchanger (10) of the present embodiment, the ridge (34, 64) of one of an adjacent pair of the frames (25, 55) fits into the elongated recess (35, 65) of the other. The partition sheet (15) is sandwiched between the elongated recess (35, 65) and the ridge (34, 64) fitted together. Thus, the partition sheet (15) is held between the first frame (25) and the second frame (55) on both sides of the partition sheet (15). Further, a gap between the partition sheet (15) and the frames (25, 55) is sealed.

According to the present embodiment, even in the case of poor adhesion or deterioration of an adhesive, the partition sheet (15) can be held by the first frame (25) and the second frame (55) on both sides thereof, and the gap between the partition sheet (15) and the frames (25, 55) can be sealed.

Therefore, according to the present embodiment, the partition sheet (15) which is no longer held by the frames (25, 55) can be previously kept from interfering with the flow of air. Further, the present embodiment can block the air from entering from one of the first passage (21) or the second passage (51) to the other through the gap between the partition sheet (15) and the frames (25, 55). This can improve the reliability of the heat exchanger (10).

Feature (2) of First Embodiment

The heat exchanger (10) of the present embodiment includes the ridge (34, 64) and the elongated recess (35, 65) that are formed on the outermost periphery of the frame portion (30, 60).

Each of the first frame (25) and the second frame (55) includes the ridge (34, 64) and the elongated recess (35, 65) that are formed on the outermost periphery of the frame portion (30, 60) along the periphery of the partition sheet (15).

Feature (3) of First Embodiment

The frame portion (30, 60) of the heat exchanger (10) of the present embodiment has the communication openings (22, 52) and the auxiliary ribs (32, 62). Each of the communication openings (22, 52) allows the first passage (21) or the second passage (51) surrounded by the frame portion (30, 60) to communicate with the outside of the frame portion (30, 60). Each of the auxiliary ribs (32, 62) extends along the corresponding communication opening (22, 52), and faces the frame portion (30, 60) of the adjacent frame (25, 55). The partition sheet (15) is sandwiched between the auxiliary ribs (32, 62) of one of the first frame (25) and the second frame (55) adjacent to the partition sheet (15) and the frame portion (30, 60) of the other.

In the heat exchanger (10) of the present embodiment, the partition sheet (15) is sandwiched between the auxiliary ribs (32, 62) of one of the first frame (25) and the second frame (55) adjacent to each other and the frame portion (30, 60) of the other. Thus, the partition sheet (15) is held between the first frame (25) and the second frame (55) on both sides of the partition sheet (15), even at the communication openings (22, 52) formed in the frame (25, 55). Further, a gap between the partition sheet (15) and the frame (25, 55) is sealed even at the communication openings (22, 52) formed in the frame (25, 55).

Feature (4) of First Embodiment

The heat exchanger (10) of the present embodiment includes the plurality of flat sheet-like partition sheets (15) and the frames (25, 55) that are alternately stacked with the partition sheets (15) to keep a space between an adjacent pair of the partition sheets (15). The first passages (21) and the second passages (51) are alternately formed in the heat exchanger (10) with the partition sheets (15) interposed therebetween. Each of the frames (25, 55) has the frame portion (30, 60) formed along the periphery of the partition sheets (15).

Each of the frame portions (30, 60) has the communication openings (22, 52) and the auxiliary ribs (32, 62). Each of the communication openings (22, 52) allows the first passage (21) or the second passage (51) surrounded by the frame portion (30, 60) to communicate with the outside of the frame portion (30, 60). Each of the auxiliary ribs (32, 62) extends along the corresponding communication opening (22, 52), and faces the frame portion (30, 60) of the adjacent frame (25, 55). The partition sheet (15) is sandwiched between the auxiliary ribs (32, 62) of one of the first frame (25) and the second frame (55) adjacent to the partition sheet (15) and the frame portion (30, 60) of the other.

The heat exchanger (10) of the present embodiment includes the partition sheets (15) and the frames (25, 55) that are alternately stacked, and the first passages (21) and the second passages (51) that are alternately formed. The heat exchanger (10) causes the supply air flowing through the first passage (21) and the exhaust air flowing through the second passage (51) to exchange sensible heat and latent heat (moisture) through the partition sheet (15).

In the heat exchanger (10) of the present embodiment, the partition sheet (15) is sandwiched between the auxiliary ribs (32, 62) of one of the first frame (25) and the second frame (55) adjacent to each other and the frame portion (30, 60) of the other. Thus, the partition sheet (15) is held between the first frame (25) and the second frame (55) on both sides of the partition sheet (15). Further, a gap between the partition sheet (15) and the frames (25, 55) is sealed.

Feature (5) of First Embodiment

In the heat exchanger (10) of the present embodiment, each of the frame portions (30, 60) of the frames (25, 55) has the outer rib (33, 63). The outer rib (33, 63) of one of an adjacent pair of the frames (25, 55) protrudes from a surface of the frame portion (30, 60) facing the auxiliary ribs (32, 62) of the other frame (25, 55), and extends along the outer sides of the auxiliary ribs (32, 62). The tip end face of the outer rib (33, 63) of the frame (25, 55) is flush with the surfaces of the auxiliary ribs (32, 62) of the other frame (25, 55) adjacent thereto in the protruding direction of the outer rib (33, 63), the surfaces being opposite to the partition member (15).

In the heat exchanger (10) of the present embodiment, the outer rib (33, 63) is provided along the outer sides of the auxiliary ribs (32, 62) in the frame portion (30, 60) of the frame (25, 55). The tip end face of the outer rib (33, 63) of the frame (25, 55) faces the first passage (21) or the second passage (51) formed by the other frame (25, 55) adjacent thereto in the protruding direction of the outer rib (33, 63), i.e., on the front side thereof. The surfaces of the auxiliary ribs (32, 62) of the frame (25, 55) opposite to the partition sheet (15), i.e., the front surfaces, face the first passage (21) or the second passage (51) formed by the frame (25, 55).

In the heat exchanger (10) of the present embodiment, the tip end face of the outer rib (33, 63) of the frame (25, 55) is flush with the surfaces of the auxiliary ribs (32, 62) of the other frame (25, 55) adjacent thereto in the protruding direction of the outer rib (33, 63), the surfaces being opposite to the partition member (15). Therefore, the air smoothly flows around the communication openings (22, 52) communicating with the first passage (21) or the second passage (51) formed by the adjacent frame (25, 55).

Feature (6) of First Embodiment

In the heat exchanger (10) of the present embodiment, each of the frame portions (30, 60) of the frames (25, 55) has the outer rib (33, 63). The outer rib (33, 63) extends along the outer periphery of the frame (25, 55) over the entire perimeter of the frame (25, 55).

In the heat exchanger (10) of the present embodiment, the outer rib (33, 63) is provided for the frame portion (30, 60) of the frame (25, 55). The outer rib (33, 63) extends along the outer periphery of the frame (25, 55) over the entire perimeter of the frame (25, 55). Therefore, the frame (25, 55) can achieve higher strength and rigidity than a frame having the frame portion (30, 60) divided in the middle.

Feature (7) of First Embodiment

In the heat exchanger (10) of the present embodiment, each of the frame portions (30, 60) of the frames (25, 55) has the outer rib (33, 63). The outer rib (33, 63) extends along the communication openings (22, 52), and is located outside the auxiliary rib (32, 62) in its entirety.

In the heat exchanger (10) of the present embodiment, the outer rib (33, 63) is provided for the frame portion (30, 60) of the frame (25, 55). A portion of the outer rib (33, 63) extending along the communication openings (22, 52) is located outside the auxiliary rib (32, 62) in its entirety.

In the frame (25, 55) of the present embodiment, the outer rib (33, 63) and the auxiliary rib (32, 62) do not overlap with each other in plan view. Thus, a simple molding die divided in two parts, i.e., one on the front side and one on the back side of the frame (25, 55), can be used as an injection molding die used for manufacturing the frame (25, 55). Therefore, the present embodiment can provide the frame portion (30, 60) of the frame (25, 55) with the outer rib (33, 63) and the auxiliary ribs (32, 62) without increasing the manufacturing cost of the frame (25, 55).

Feature (8) of First Embodiment

In the present embodiment, an outer peripheral surface of a stack of the plurality of frames (25, 55) constitute a flat side surface of the heat exchanger (10).

The heat exchanger (10) of the present embodiment has the flat side surfaces. Thus, the heat exchanger (10) can be assembled into a ventilator, while easily sealing the side surfaces of the heat exchanger (10) with the structure of the ventilator. This can improve the usability of the heat exchanger (10).

Feature (9) of First Embodiment

The heat exchanger (10) of the present embodiment includes the plurality of flat sheet-like partition sheets (15) and the frames (25, 55) that are alternately stacked with the partition sheets (15) to keep a space between an adjacent pair of the partition sheets (15). The heat exchanger (10) includes the first passages (21) and the second passages (51) that are alternately formed with the partition sheets (15) interposed therebetween. Each of the frames (25, 55) has the frame portion (30, 60) formed along the periphery of the partition sheets (15).

Each of the first frames (25) forming the first passages (21) includes the first communication openings (22) and the first inner ribs (40). The first communication openings (22) are formed in the frame portion (30) of the first frame (25), and allow the first passage (21) surrounded by the frame portion (30) to communicate with the outside of the frame portion (30). The first inner ribs (40) extend from each of the first communication openings (22) in a direction intersecting with the corresponding first communication opening (22), and are in contact with the partition sheets (15) on both sides of the first frame (25).

Each of the second frames (55) forming the second passages (51) includes the second communication openings (52) and the second inner ribs (70). The second communication openings (52) are formed in the frame portion (60) of the second frame (55), and allow the second passage (51) surrounded by the frame portion (60) to communicate with the outside of the frame portion (60). The second inner ribs (70) extend from each of the second communication openings (52) in a direction intersecting with the corresponding second communication opening (52), and are in contact with the partition sheets (15) on both sides of the second frame (55).

The first frame (25) further includes the first holding ribs (41a, 41b). The first holding ribs (41a, 41b) extend in a direction intersecting with the first inner ribs (40) and along the second inner ribs (70) of the second frame (55), and sandwich the partition sheet (15) between the first holding ribs (41a, 41b) and the second inner ribs (70) of the adjacent second frame (55).

The second frame (55) further includes the second holding ribs (71a, 71b). The second holding ribs (71a, 71b) extend in a direction intersecting with the second inner ribs (70) and along the first inner ribs (40) of the first frame (25), and sandwich the partition sheet (15) between the second holding ribs (71a, 71b) and the first inner ribs (40) of the adjacent first frame (25).

The heat exchanger (10) of the present embodiment includes the partition sheets (15) and the frames (25, 55) that are alternately stacked, and the first passages (21) and the second passages (51) that are alternately formed. An adjacent pair of the first frame (25) and the second frame (55) sandwich the partition sheet (15). The heat exchanger (10) causes the supply air flowing through the first passage (21) and the exhaust air flowing through the second passage (51) to exchange sensible heat and latent heat (moisture) through the partition sheet (15).

The first frame (25) of the heat exchanger (10) of the present embodiment includes the first inner ribs (40) and the first holding ribs (41a, 41b). The first inner rib (40) and the first holding rib (41a, 41b) are located in the first passage (21). The second frame (55) includes the second inner ribs (70) and the second holding ribs (71a, 71b). The second inner rib (70) and the second holding rib (71a, 71b) are located in the second passage (51).

The first frame (25) of the heat exchanger (10) of the present embodiment includes the first holding ribs (41a, 41b) extending along the second inner ribs (70) of the second frame (55). The second holding ribs (71a, 71b) of the second frame (55) extend along the first inner ribs (40) of the first frame (25). The partition sheet (15) serving as a partition between the first passage (21) and the second passage (51) is sandwiched between the first holding ribs (41a, 41b) and the second inner ribs (70) adjacent to each other, and between the second holding ribs (71a, 71b) and the first inner ribs (40) adjacent to each other. Thus, a portion of the partition sheet (15) inward of the frame portion (30, 60) of the frame (25, 55) is held by the first holding ribs (41a, 41b) and the second inner ribs (70) adjacent to each other, and by the second holding ribs (71a, 71b) and the first inner ribs (40) adjacent to each other.

According to the present embodiment, the partition sheet (15) can be held by the frames (25, 55) on both sides thereof, even in the case of poor adhesion or deterioration of an adhesive. Therefore, according to the present embodiment, the partition sheet (15) which is no longer held by the frames (25, 55) can be previously kept from interfering with the flow of air. This can improve the reliability of the heat exchanger (10).

Feature (10) of First Embodiment

The first frame (25) of the heat exchanger (10) of the present embodiment includes the first holding ribs (41a) that are on one side thereof and in contact with one of a pair of the partition sheets (15) adjacent to the first frame (25), and the first holding ribs (41b) that are on the other side and in contact with the other partition sheet (15). The second frame (55) of the heat exchanger (10) includes the second holding ribs (71a) that are on one side thereof and in contact with one of a pair of the partition sheets (15) adjacent to the second frame (55), and the second holding ribs (71b) that are on the other side and in contact with the other partition sheet (15).

In the heat exchanger (10) of the present embodiment, one of the two partition sheets (15) adjacent to the first frame (25) is sandwiched and held between the first holding ribs (41a) on the one side and the second inner ribs (70) adjacent to the first holding ribs (41a). The other partition sheet (15) adjacent to the first frame (25) is sandwiched and held between the first holding ribs (41b) on the other side and the second inner ribs (70) adjacent to the first holding ribs (41b).

In the heat exchanger (10) of the present embodiment, one of the two partition sheets (15) adjacent to the second frame (55) is sandwiched and held between the second holding ribs (71a) on the one side and the first inner ribs (40) adjacent to the second holding ribs (71a). The other partition sheet (15) adjacent to the second frame (55) is sandwiched and held between the second holding ribs (71b) on the other side and the first inner ribs (40) adjacent to the second holding ribs (71b).

Thus, in the heat exchanger (10) of the present embodiment, the first support ribs (46a, 46b) and the second support ribs (76a, 76b) adjacent to each other reliably sandwich and hold a portion of the partition sheet (15) located in the main heat exchange section (11) of the heat exchanger (10).

Feature (11) of First Embodiment

The first frame (25) of the heat exchanger (10) of the present embodiment includes the intra-first passage ribs (45) and the first support ribs (46a, 46b). The intra-first passage ribs (45) are provided in the first passage (21) surrounded by the frame portion (30) of the first frame (25), and are in contact with a pair of the partition sheets (15) adjacent to the first frame (25). The first support ribs (46a, 46b) extend in a direction intersecting with the intra-first passage ribs (45), and are in contact with one of the partition sheets (15) adjacent to the first frame (25).

The second frame (55) of the heat exchanger (10) of the present embodiment includes the intra-second passage ribs (75) and the second support ribs (76a, 76b). The intra-second passage ribs (75) are provided in the second passage (51) surrounded by the frame portion (60) of the second frame (55), extend along the intra-first passage ribs (45) of the first frame (25), and are in contact with a pair of the partition sheets (15) adjacent to the second frame (55). The second support ribs (76a, 76b) extend in a direction intersecting with the intra-second passage ribs (75), and are in contact with one of the partition sheets (15) adjacent to the second frame (55).

In the heat exchanger (10) of the present embodiment, the first frame (25) is provided with the intra-first passage ribs (45), and the second frame (55) is provided with the intra-second passage ribs (75). The intra-first passage ribs (45) are in contact with the two partition sheets (15) located on both sides of the first frame (25). The intra-second passage ribs (75) are in contact with the two partition sheets (15) located on both sides of the second frame (55). The intra-second passage rib (75) extends along the intra-first passage rib (45). Thus, the partition sheet (15) positioned between the first frame (25) and the second frame (55) is sandwiched between the intra-first passage ribs (45) and the intra-second passage ribs (75).

In the heat exchanger (10) of the present embodiment, the first frame (25) is provided with the first support ribs (46a, 46b), and the second frame (55) is provided with the second support ribs (76a, 76b). The first support ribs (46a, 46b) are in contact with one of the partition sheets (15) adjacent to the first frame (25), and support this partition sheet (15). The second support ribs (76a, 76b) are in contact with one of the partition sheets (15) adjacent to the second frame (55), and support this partition sheet (15).

Second Embodiment

A second embodiment will be described below. A heat exchanger (10) of the present embodiment is a variation of the heat exchanger (10) of the first embodiment in which the first frame (25) and the second frame (55) have been changed. Thus, the following description will be focused on the differences between the heat exchanger (10) of the present embodiment and the heat exchanger (10) of the first embodiment.

First Frame, Second Frame

As illustrated in FIGS. 17 to 20, each of the first frame (25) and the second frame (55) includes a linear protrusion (36, 66) formed in the auxiliary rib (32, 62), and a linear recess (37, 67) in the blocking portion (31, 61). Specifically, the first frame (25) includes the linear protrusion (36) formed in the auxiliary rib (32), and the linear recess (37) in the blocking portion (31). The second frame (55) includes the linear protrusion (66) formed in the auxiliary rib (62), and the linear recess (67) in the blocking portion (61).

The linear protrusion (36, 66) extends along the outer side surface of the auxiliary rib (32, 62), and protrudes from the back surface of the auxiliary rib (32, 62). The linear protrusion (36, 66) is formed over the entire length of the auxiliary rib (32, 62). The linear protrusion (36, 66) has a rectangular cross section. The outer side surface of the linear protrusion (36, 66) forms a plane together with the outer side surface of the auxiliary rib (32, 62). The partition sheet (15) is bonded to the tip end face (lower surface in FIGS. 17 to 20) and inner side surface of the linear protrusion (36, 66).

The linear recess (37, 67) is a recessed groove that opens on the front surface of the blocking portion (31, 61). The linear recess (37, 67) is a linear recessed groove extending along the inner side surface of the ridge (34, 64).

In the first frame (25), the linear recess (37) is formed in a portion of the blocking portion (31) facing the auxiliary rib (62) of the second frame (55). The cross-sectional shape of the linear recess (37) corresponds to that of the linear protrusion (66) of the second frame (55). The linear protrusion (66) of the second frame (55) fits into the linear recess (37) of the first frame (25).

In the second frame (55), the linear recess (67) is formed in a portion of the blocking portion (61) facing the auxiliary rib (32) of the first frame (25). The cross-sectional shape of the linear recess (67) corresponds to that of the linear protrusion (36) of the first frame (25). The linear protrusion (36) of the first frame (25) fits into the linear recess (67) of the second frame (55).

Structure for Holding Partition Sheet

Figure 17:
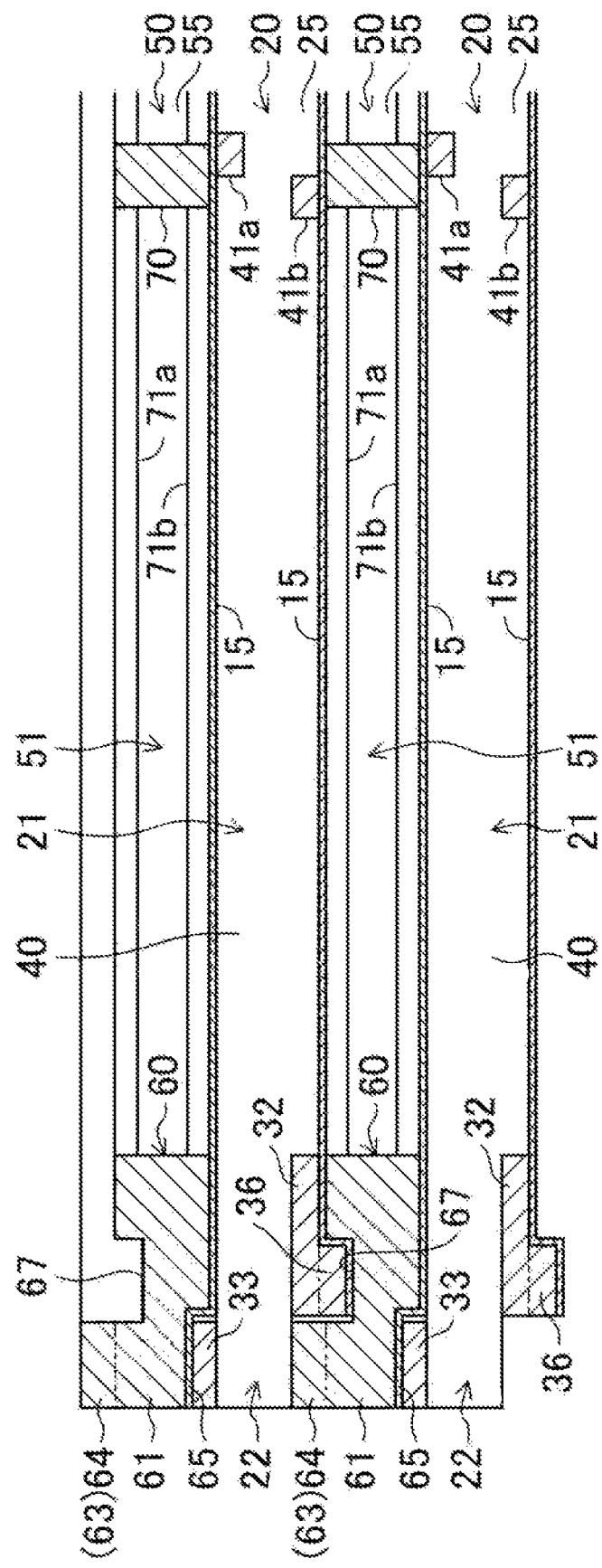
FIG. 17 is a cross-sectional view of portion of a heat exchanger according to a second embodiment, corresponding to FIG. 11.
Figure 18:
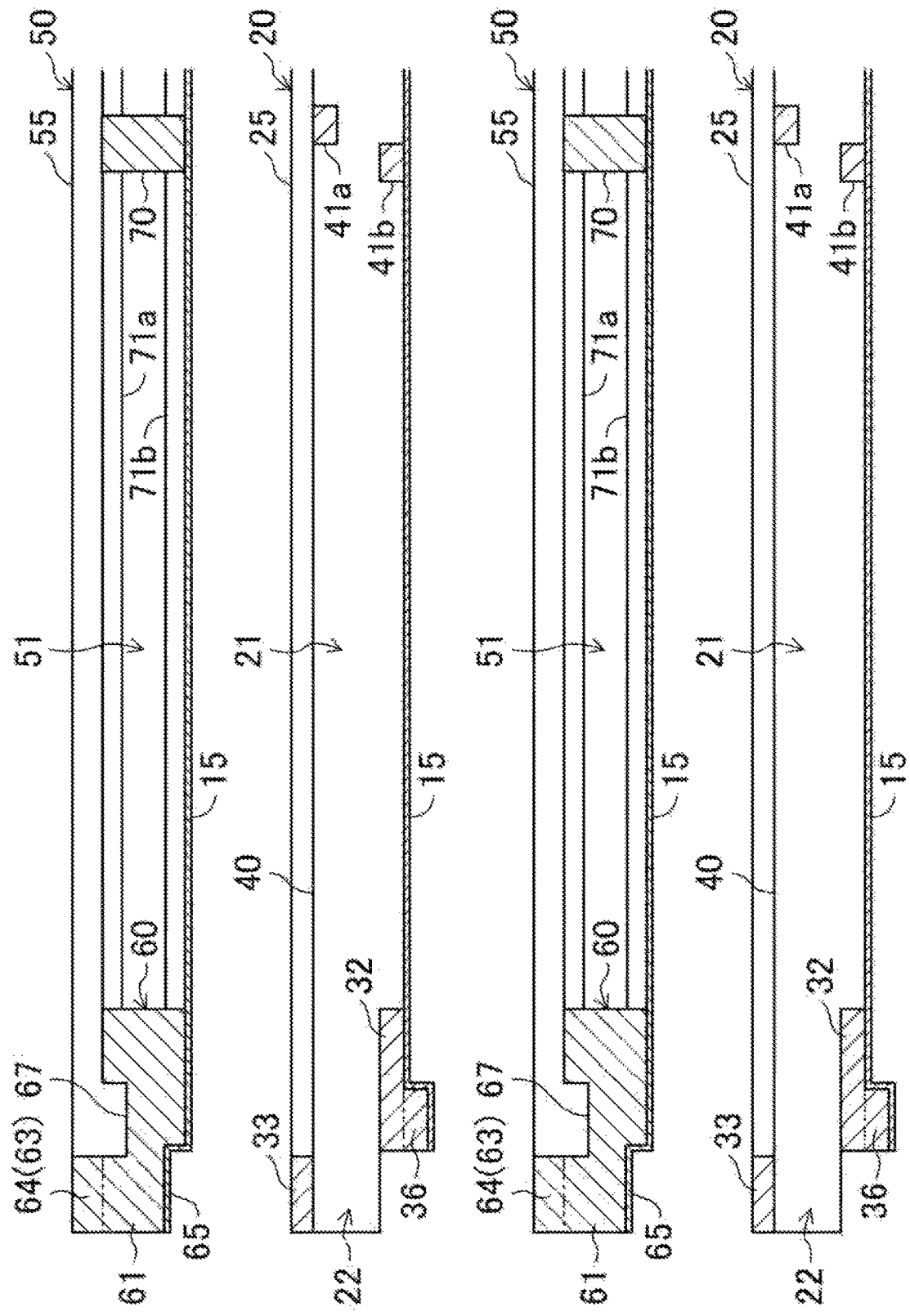
FIG. 18 is a cross-sectional view of portion of first and second elements according to the second embodiment arranged one above the other, corresponding to FIG. 17.

As illustrated in FIG. 17, at the first communication opening (22) of the auxiliary heat exchange section (12a, 12b) of the heat exchanger (10), the linear protrusion (36) of the first frame (25) fits into the linear recess (67) of the adjacent second frame (55) on the back side of the first frame (25). The partition sheet (15) covers the tip end face and inner side surface of the linear protrusion (36) of the first frame (25). Thus, the partition sheet (15) bonded to the linear protrusion (36) of the first frame (25) is sandwiched between the tip end face of the linear protrusion (36) of the first frame (25) and the wall surface of the linear recess (67) of the second frame (55). In this way, the partition sheet (15) of the first element (20) is bonded to the linear protrusion (36) of the first frame (25) and sandwiched between the linear protrusion (36) of the first frame (25) and the wall surface of the linear recess (67) of the second frame (25).

Figure 19:
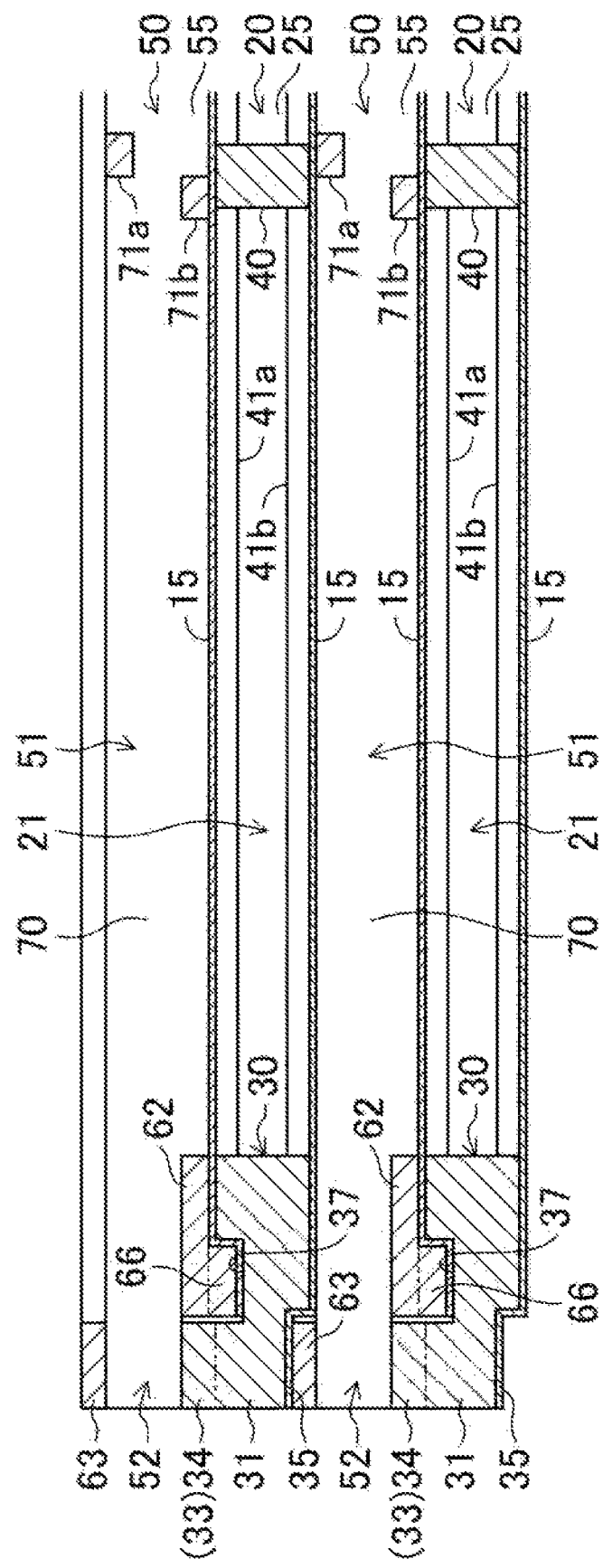
FIG. 19 is a cross-sectional view of portion of the heat exchanger according to the second embodiment, corresponding to FIG. 13.
Figure 20:
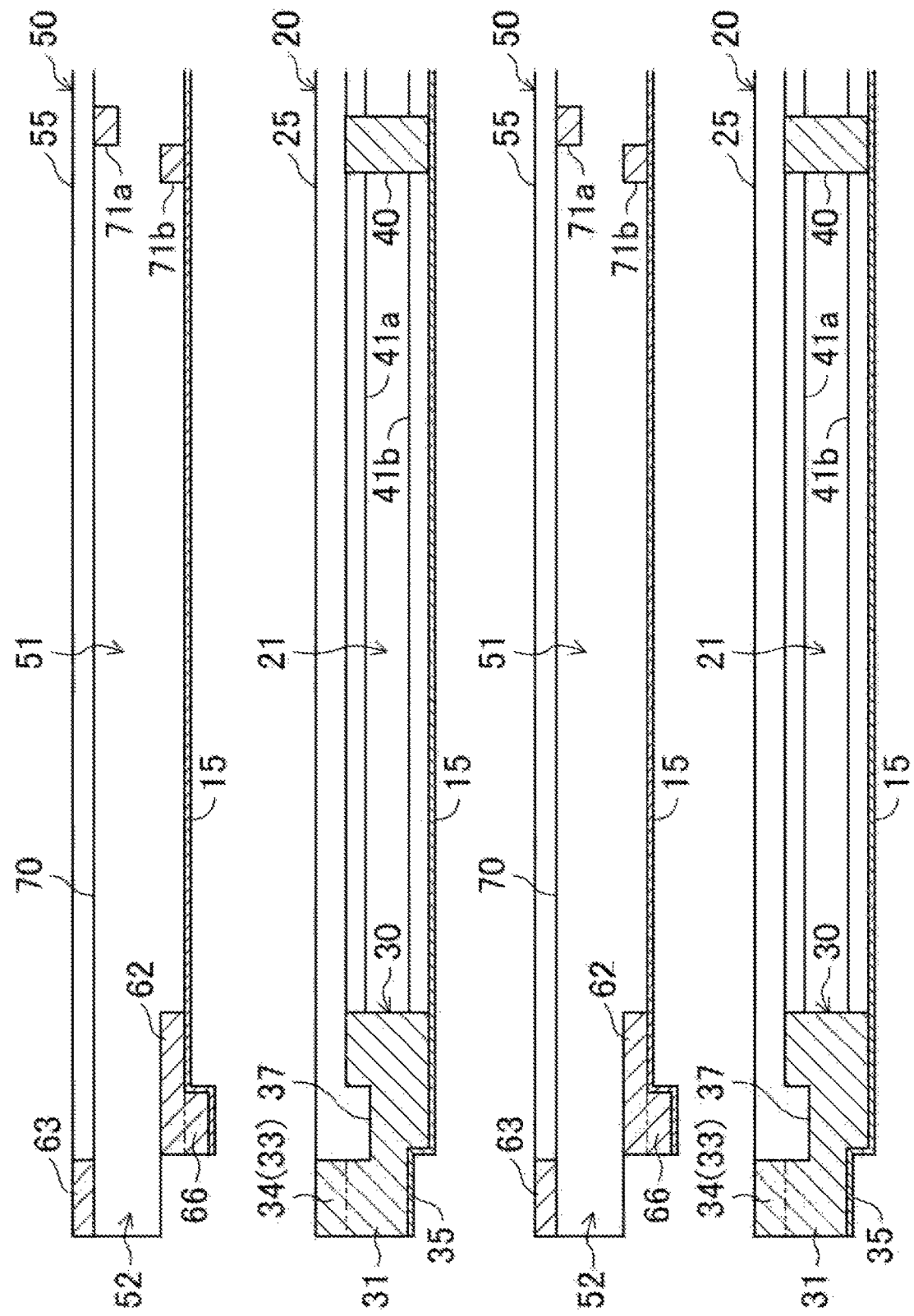
FIG. 20 is a cross-sectional view of portion of the first and second elements according to the second embodiment arranged one above the other, corresponding to FIG. 19.
Figure 21:
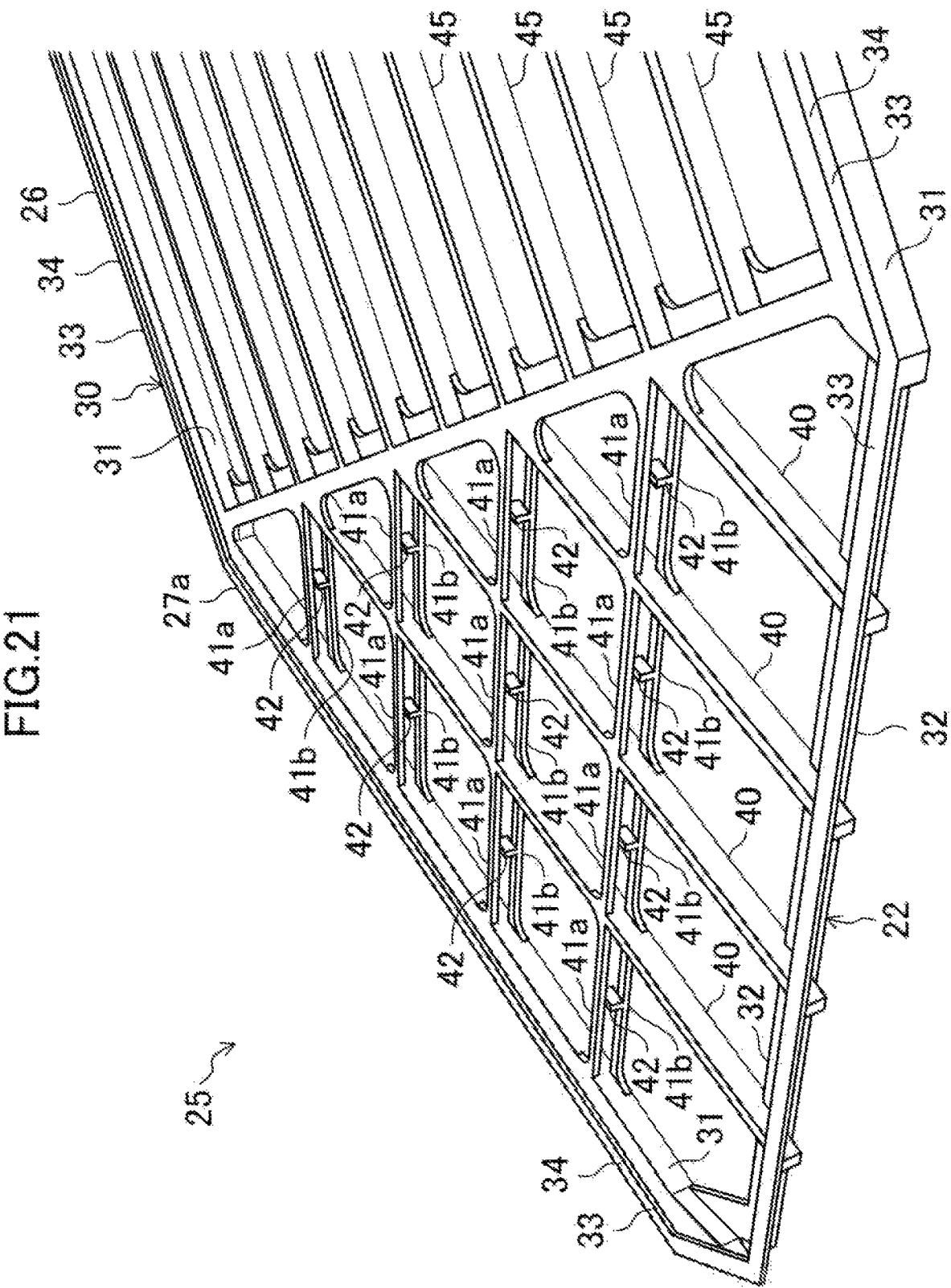
FIG. 21 is a perspective view of a first frame according to a third embodiment, corresponding to FIG. 6.
Figure 22:
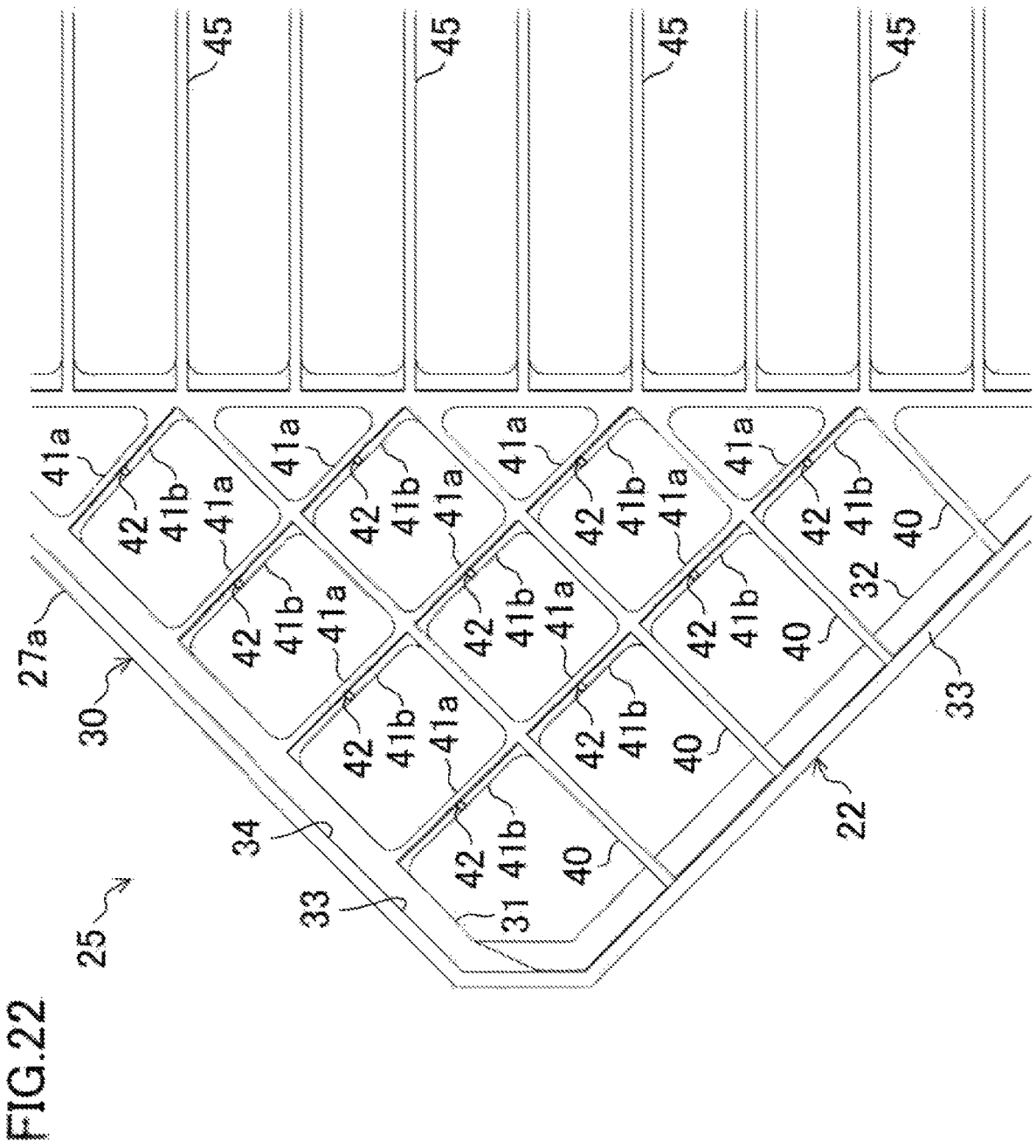
FIG. 22 is a plan view of part of the first frame according to the third embodiment enlarged.

As illustrated in FIG. 19, at the second communication opening (52) of the auxiliary heat exchange section (12a, 12b) of the heat exchanger (10), the linear protrusion (66) of the second frame (55) fits into the linear recess (37) of the adjacent first frame (25) on the back side of the second frame (55). The partition sheet (15) covers the tip end face and inner side surface of the linear protrusion (66) of the second frame (55). Thus, the partition sheet (15) bonded to the linear protrusion (66) of the second frame (55) is sandwiched between the tip end face of the linear protrusion (66) of the second frame (55) and the wall surface of the linear recess (37) of the first frame (25). In this way, the partition sheet (15) of the second element (50) is bonded to the linear protrusion (66) of the second frame (55) and sandwiched between the linear protrusion (66) of the second frame (55) and the wall surface of the linear recess (37) of the first frame (25).

Feature (1) of Second Embodiment

In the present embodiment, the auxiliary rib (32, 62) of the frame (25, 55) of the heat exchanger (10) has the linear protrusion (36, 66). The linear protrusion (36, 66) extends along the auxiliary rib (32, 62), and protrudes towards the other frame (25, 55) facing the auxiliary rib (32, 62). This heat exchanger (10) includes the linear recess (37, 67) formed in the frame portion (30, 60) of the frame (25, 55). The linear protrusion (36, 66) of the other adjacent frame (25, 55) fits into the linear recess (37, 67).

In the heat exchanger (10) of the present embodiment, the linear protrusion (36, 66) of one of the first frame (25) and the second frame (55) adjacent to each other fits into the linear recess (37, 67) of the other. Thus, the linear protrusion (36, 66) and the linear recess (37, 67) fitted to each other seals a gap between the first frame (25) and the second frame (55) adjacent to each other. The linear protrusion (36, 66) formed on the auxiliary rib (32, 62) improves the rigidity of the auxiliary rib (32, 62).

Feature (2) of Second Embodiment

In the heat exchanger (10) of the present embodiment, the partition sheet (15) is sandwiched between the linear protrusion (36, 66) of one of the first frame (25) and the second frame (55) adjacent to the partition sheet (15) and the linear recess (37, 67) of the other.

The linear protrusion (36, 66) and the linear recess (37, 67) fitted to each other in the heat exchanger (10) of the present embodiment sandwich the partition sheet (15) between the first frame (25) and the second frame (55) adjacent to each other. Thus, the partition sheet (15) is held between the first frame (25) and the second frame (55) on both sides of the partition sheet (15). Further, a gap between the partition sheet (15) and the frames (25, 55) is sealed.

Third Embodiment

A third embodiment will be described below. A heat exchanger (10) of the present embodiment is a variation of the heat exchanger (10) of the first embodiment in which the first frame (25) and the second frame (55) have been changed. Thus, the following description will be focused on the differences between the heat exchanger (10) of the present embodiment and the heat exchanger (10) of the first embodiment.

First Frame

As illustrated in FIGS. 21 to 24, the first frame (25) of the heat exchanger (10) of the present embodiment is provided with first supports (42). The first supports (42) are provided in each of end areas (27a, 27b) of the first frame (25). Each of the end areas (27a, 27b) is provided with the same number of first supports (42) as the first holding ribs (41a) on the front side and the first holding ribs (41b) on the back side.

Each of the first supports (42) is provided between a pair of first holding ribs (41a, 41b) adjacent to each other in the thickness direction of the first frame (25). Each of the first supports (42) connects a corresponding pair of first holding ribs (41a, 41b). Each of the first supports (42) is a small rectangular plate-shaped member, and integral with the corresponding pair of first holding ribs (41a, 41b). The long side of each of the first supports (42) is substantially orthogonal to the longitudinal direction of the corresponding first holding ribs (41a, 41b) (a direction orthogonal to the adjacent first inner ribs (40)). Each of the first supports (42) is provided substantially at the middle in the longitudinal direction of the corresponding first holding ribs (41a, 41b).

Second Frame

Figure 23:
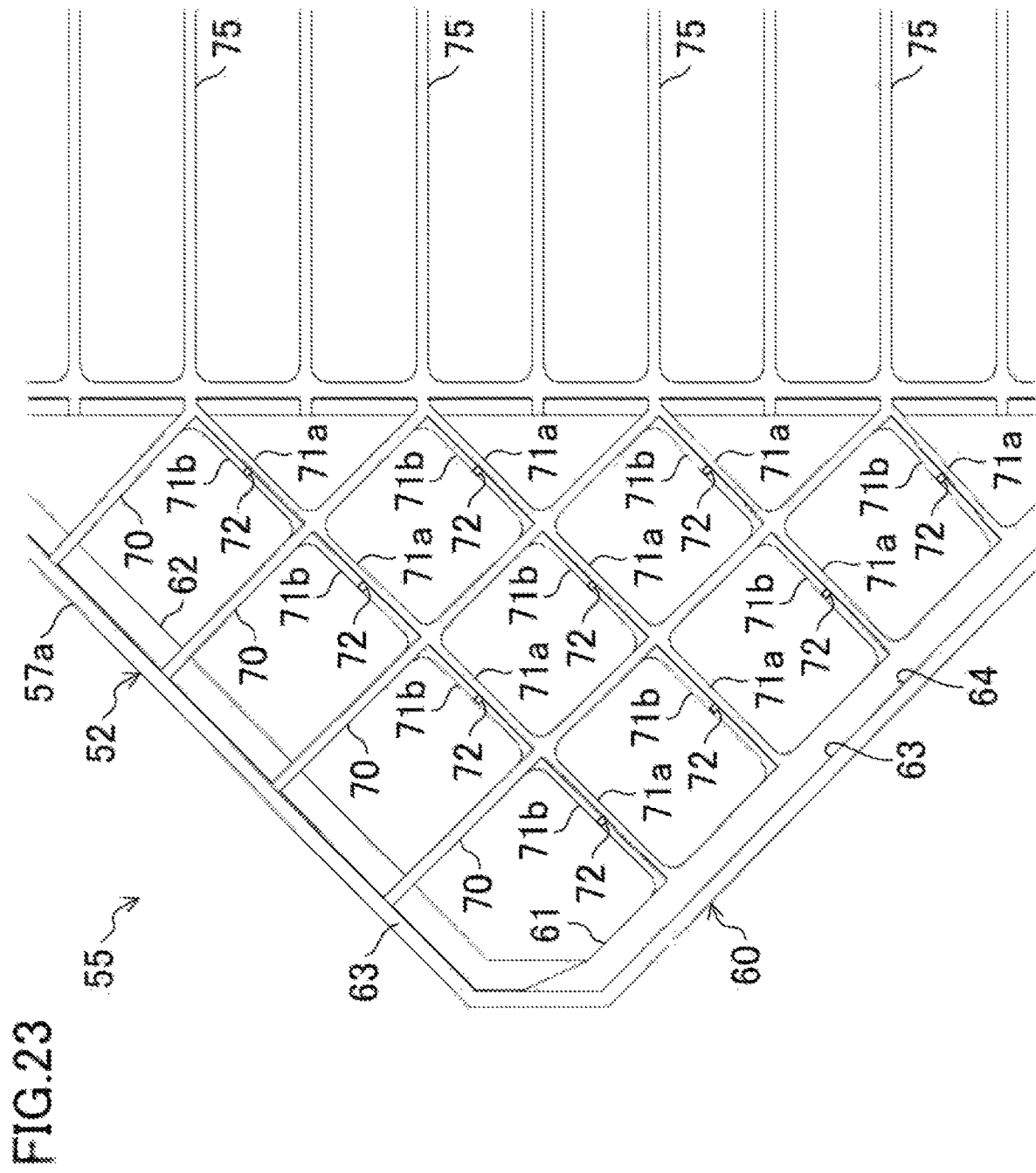
FIG. 23 is a plan view of part of a second frame according to the third embodiment enlarged.
Figure 24:
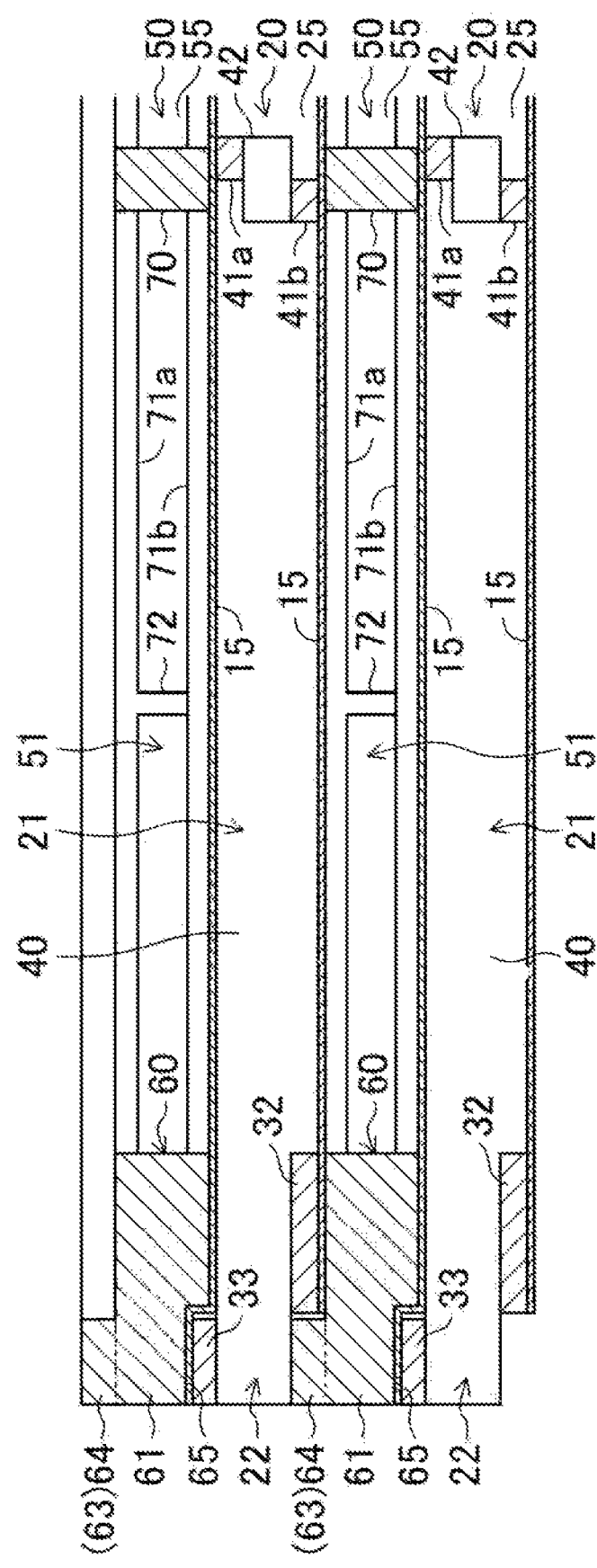
FIG. 24 is a cross-sectional view of portion of a heat exchanger according to the third embodiment, corresponding to FIG. 11.
Figure 25:
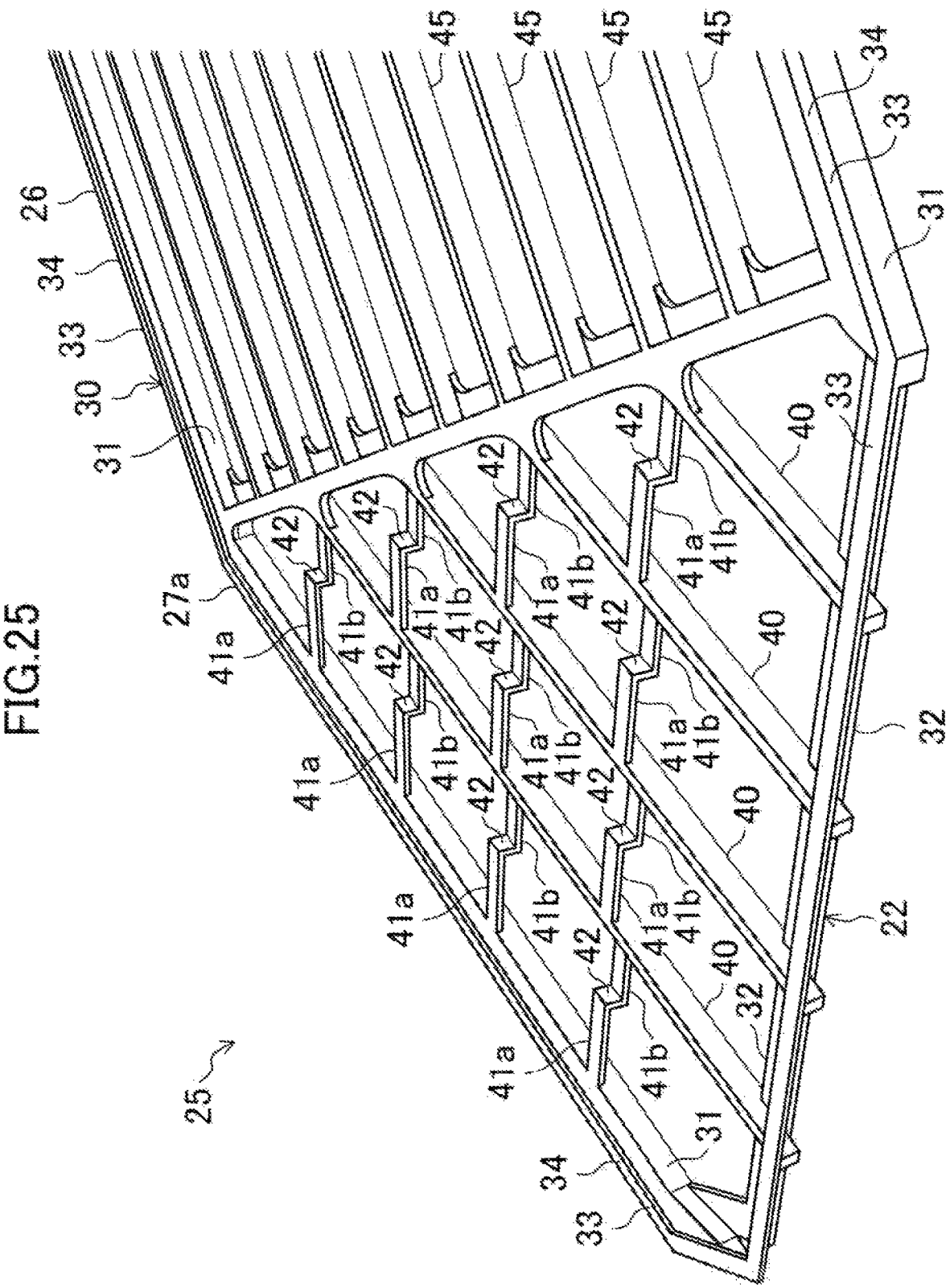
FIG. 25 is a perspective view of a first frame according to a fourth embodiment, corresponding to FIG. 6.
Figure 26:
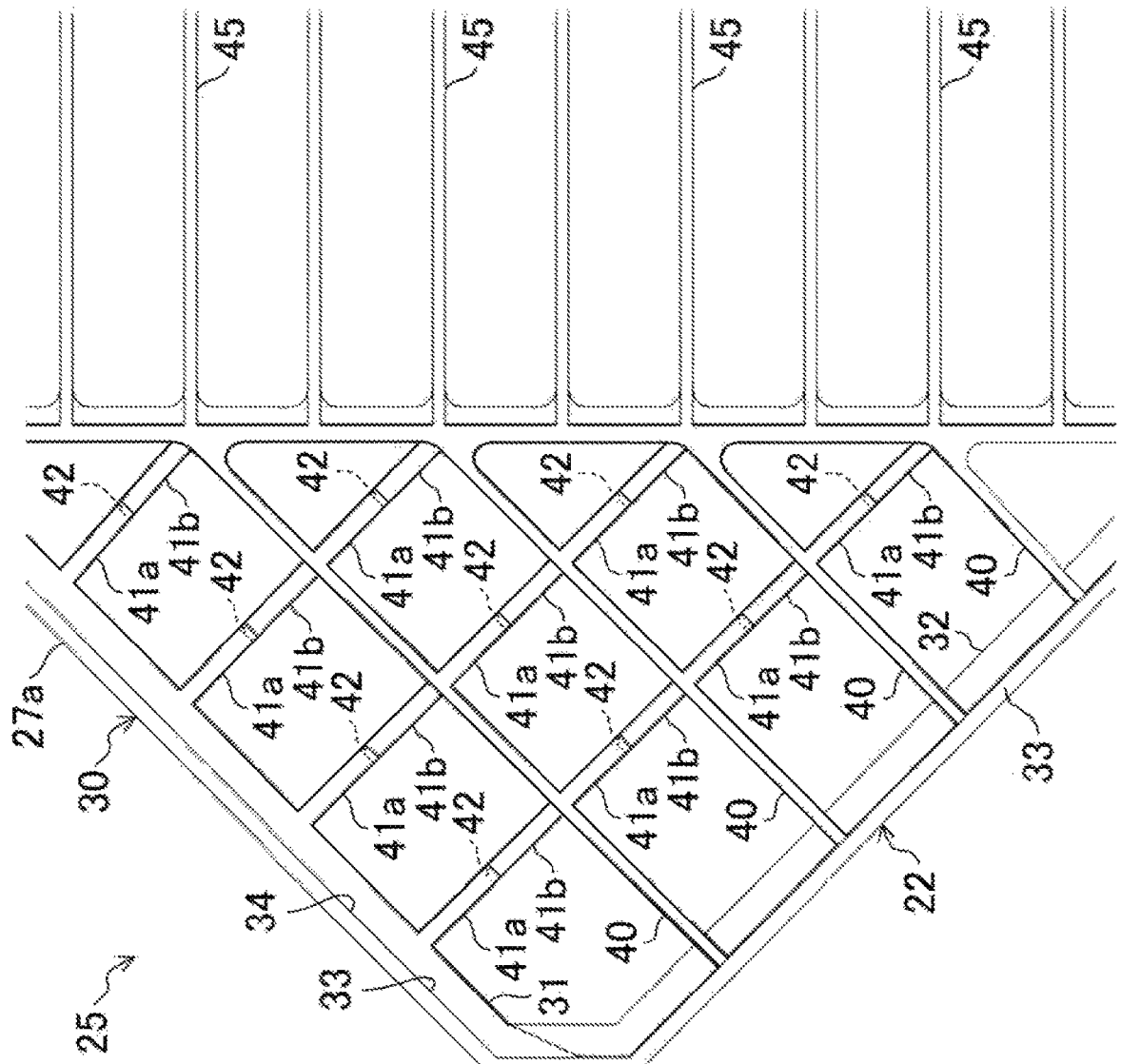
FIG. 26 is a plan view of part of a first frame according to the fourth embodiment enlarged.

As illustrated in FIGS. 23 and 24, the second frame (55) of the heat exchanger (10) of the present embodiment is provided with second supports (72). The second supports (72) are provided in each of the end areas (57a, 57b) of the second frame (55). Each of the end areas (57a, 57b) is provided with the same number of second supports (72) as the second holding ribs (71a) on the front side and the second holding ribs (71b) on the back side.

Each of the second supports (72) is provided between a pair of second holding ribs (71a, 71b) adjacent to each other in the thickness direction of the second frame (55). Each of the second supports (72) connects a corresponding pair of second holding ribs (71a, 71b). Each of the second supports (72) is a small rectangular plate-shaped member, and integral with the corresponding pair of second holding ribs (71a, 71b). The long side of each of the second supports (72) is substantially orthogonal to the longitudinal direction of the corresponding second holding ribs (71a, 71b) (a direction orthogonal to the adjacent second inner ribs (70)). Each of the second supports (72) is provided substantially at the middle in the longitudinal direction of the corresponding second holding ribs (71a, 71b).

Features of Third Embodiment

In the heat exchanger (10) of the present embodiment, the first frame (25) includes the first supports (42), and the second frame (55) the second supports (72). Each of the first supports (42) of the first frame (25) is connected to the corresponding pair of the first holding rib (41a) on the one side and the first holding rib (41b) on the other side. Each of the second supports (72) of the second frame (55) is connected to the corresponding pair of the second holding rib (71a) on the one side and the second holding rib (71b) on the other side.

In the first frame (25) of the present embodiment, each of the first supports (42) is connected to the corresponding pair of the first holding rib (41a) on the one side and the first holding rib (41b) on the other side. The first support (42) keeps a distance between the one first holding rib (41a) and the other first holding rib (41b). This keeps the first holding ribs (41a, 41b) from sagging, and the first holding ribs (41a, 41b) and the second inner ribs (70) hold the partition sheet (15).

Each of the second supports (72) of the second frame (55) of the present embodiment is connected to the corresponding pair of the second holding rib (71a) on the one side and the second holding rib (71b) on the other side. The second support (72) keeps a distance between the one second holding rib (71a) and the other second holding rib (71b). This keeps the second holding ribs (71a, 71b) from sagging, and the second holding ribs (71a, 71b) and the first inner ribs (40) hold the partition sheet (15).

Variation of Third Embodiment

The heat exchanger (10) of the present embodiment may include the supports provided in the middle area (26, 56) of each of the frames (25, 55). The supports provided in the middle area (26, 56) are small rectangular plate-shaped members similar to the supports (42, 72) provided in the end areas (27a, 27b, 57a, 57b). In the first frame (25) of this variation, each of the supports connects a corresponding pair of the first support rib (46a) on the front side and the first support rib (46b) on the back side. In the second frame (55) of this variation, each of the supports connects a corresponding pair of the second support rib (76a) on the front side and the second support rib (76b) on the back side.

Fourth Embodiment

A fourth embodiment will be described below. A heat exchanger (10) of the present embodiment is a variation of the heat exchanger (10) of the third embodiment in which the first frame (25) and the second frame (55) have been changed. Thus, the following description will be focused on the differences between the heat exchanger (10) of this embodiment and the heat exchanger (10) of the third embodiment.

First Frame

As illustrated in FIGS. 25 to 28, the first frame (25) of the present embodiment differs from that of the third embodiment in the shape of the first holding ribs (41a, 41b).

Each of the first holding ribs (41a) on the front side is formed in a cantilever shape protruding from one of an adjacent pair of the first inner ribs (40) toward the other. The first holding rib (41a) is integral with the one of the adjacent first inner ribs (40). The first holding rib (41a) has a rectangular plate shape. A tip end of the first holding rib (41a) is positioned near the middle of a space between the adjacent pair of first inner ribs (40). The width of the first holding rib (41a) is substantially equal to the width of the second inner ribs (70) of the second frame (55).

Each of the first holding ribs (41b) on the back side are formed in a cantilever shape protruding toward one of an adjacent pair of the first inner ribs (40) from the other. The first holding rib (41b) is integral with the other of the adjacent first inner ribs (40). The first holding rib (41b) has a rectangular plate shape. A tip end of the first holding rib (41b) is positioned near the middle of a space between the adjacent pair of first inner ribs (40). The width of the first holding rib (41b) is substantially equal to the width of the second inner ribs (70) of the second frame (55).

In the same manner as in the third embodiment, each of the first supports (42) is a small rectangular plate-shaped member, and integral with a corresponding pair of first holding ribs (41a, 41b). Each of the first supports (42) connects the tip ends of the corresponding pair of first holding ribs (41a, 41b). Each of the first supports (42) is substantially orthogonal to the corresponding pair of first holding ribs (41a, 41b).

Second Frame

Figure 27:
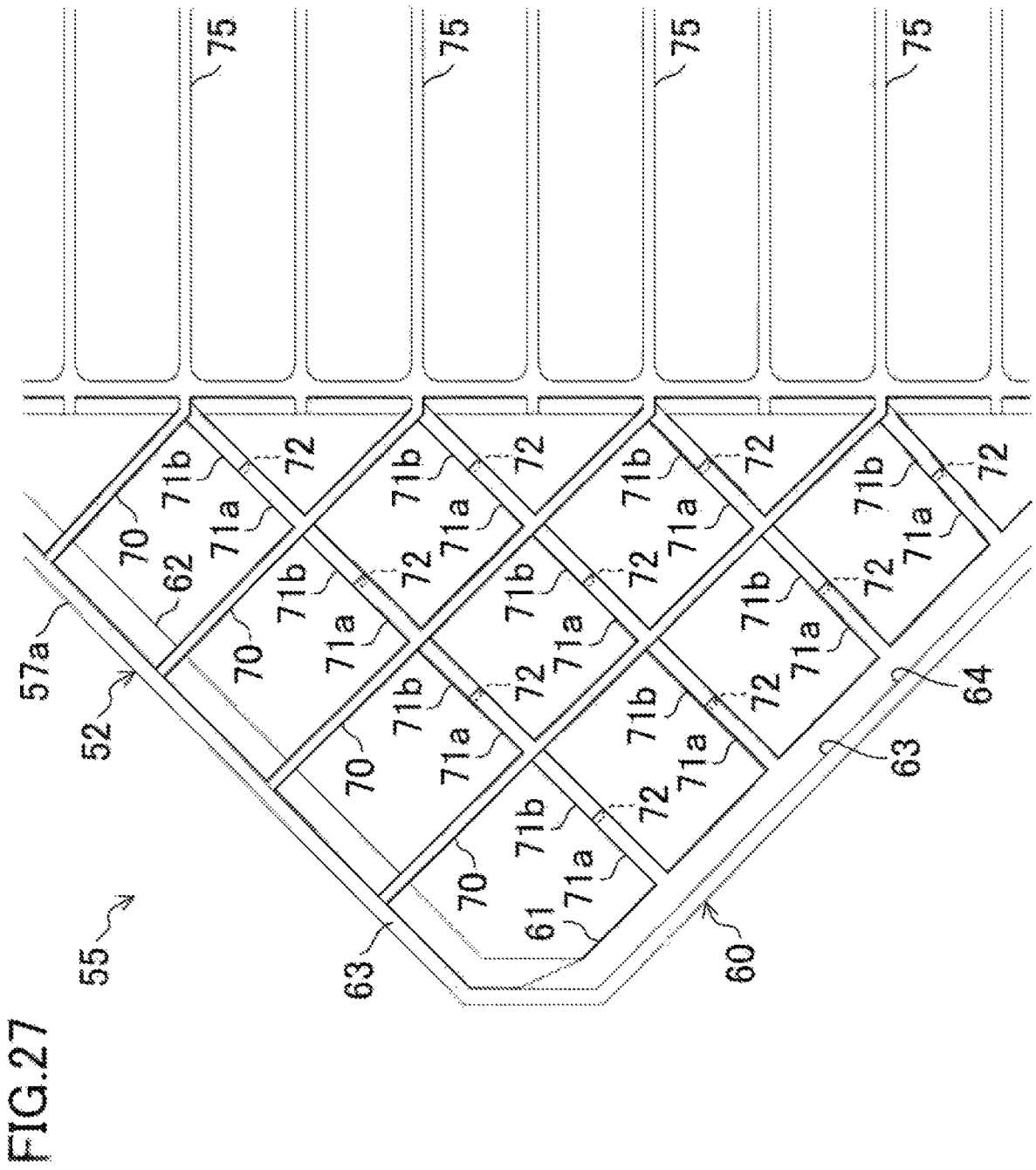
FIG. 27 is a plan view of part of a second frame according to the fourth embodiment enlarged.
Figure 28:
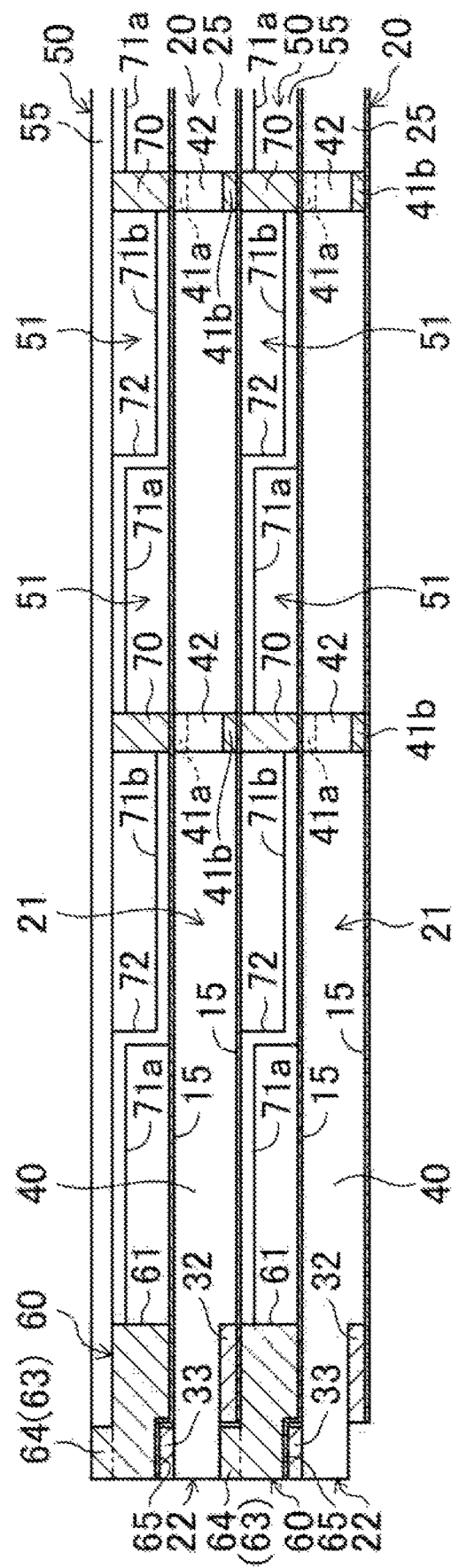
FIG. 28 is a cross-sectional view of portion of a heat exchanger of the fourth embodiment, corresponding to FIG. 11.

As illustrated in FIGS. 27 and 28, the second frame (55) of the present embodiment differs from that of the third embodiment in the shape of the second holding ribs (71a, 71b).

Each of the second holding ribs (71a) on the front side is formed in a cantilever shape protruding from one of an adjacent pair of second inner ribs (70) toward the other. The second holding rib (71a) is integral with the one of the adjacent second inner ribs (70). The second holding rib (71a) has a rectangular plate shape. A tip end of the second holding rib (71a) is positioned near the middle of a space between the adjacent pair of second inner ribs (70). The width of the second holding rib (71a) is substantially equal to the width of the first inner ribs (40) of the first frame (25).

Each of the second holding ribs (71b) on the back side is formed in a cantilever shape protruding toward one of an adjacent pair of the second inner ribs (70) from the other. The second holding rib (71b) is integral with the other of the adjacent second inner ribs (70). The second holding rib (71b) has a rectangular plate shape. A tip end of the second holding rib (71b) is positioned near the middle of a space between the adjacent pair of second inner ribs (70). The width of the second holding rib (71b) is substantially equal to the width of the first inner ribs (40) of the first frame (25).

Each of the second supports (72) is a small rectangular plate-shaped member, and integral with the corresponding pair of second holding ribs (71a, 71b), just like that of the third embodiment. Each of the second supports (72) connects the tip ends of the corresponding pair of second holding ribs (71a, 71b). Each of the second supports (72) is substantially orthogonal to the corresponding pair of second holding ribs (71a, 71b).

Features of Fourth Embodiment

The first frame (25) of the heat exchanger (10) of the present embodiment includes the plurality of first inner ribs (40) arranged parallel to each other. Between an adjacent pair of first inner ribs (40), the first holding rib (41a) on one side of the first frame (25) protrudes from one of the adjacent first inner ribs (40) toward the other, the first holding rib (41b) on the other side protrudes toward the one of the adjacent first inner ribs (40) from the other, and the first support (42) is connected to the tip end of the first holding rib (41a) on the one side and the tip end of the first holding rib (41b) on the other side.

The second frame (55) of the heat exchanger (10) of the present embodiment includes the plurality of second inner ribs (70) arranged parallel to each other. Between an adjacent pair of second inner ribs (70), the second holding rib (71a) on one side of the second frame (55) protrudes from one of the adjacent second inner ribs (70) toward the other, the second holding rib (71b) on the other side protrudes toward the one of the adjacent second inner ribs (70) from the other, and the second support (72) is connected to the tip end of the second holding rib (71a) on the one side and the tip end of the second holding rib (71b) on the other side.

In the first frame (25) of the present embodiment, the first support (42) is connected to the tip end of the first holding rib (41a) protruding from the one of the adjacent first inner ribs (40) and the tip end of the first holding rib (41b) protruding from the other. The first support (42) maintains a distance between the tip end of the one first holding rib (41a) and the tip end of the other first holding rib (41b), thereby keeping the first holding ribs (41a, 41b) from sagging.

In the second frame (55) of the present embodiment, the second support (72) is connected to the tip end of the second holding rib (71a) protruding from the one of the adjacent second inner ribs (70) and the tip end of the second holding rib (71b) protruding from the other. The second support (72) maintains a distance between the tip end of the one second holding rib (71a) and the tip end of the other second holding rib (71b), thereby keeping the second holding ribs (71a, 71b) from sagging.

In the first frame (25) of the present embodiment, desirably, each of the corresponding pair of first holding ribs (41a, 41b) and the first support (42) connected to the pair of first holding ribs (41a, 41b) form an angle of 90° or more. Setting the angle formed by the first holding rib (41a, 41b) and the first support (42) 90° or more makes it possible to use a simple molding die divided in two parts, i.e., one on the front side and one on the back side of the first frame (25), as an injection molding die used for manufacturing the first frame (25). Therefore, in this case, the first frame (25) can be provided with the first holding ribs (41a, 41b) and the first supports (42) without increasing the manufacturing cost of the first frame (25).

In the second frame (55) of the present embodiment, desirably, each of the corresponding pair of second holding ribs (71a, 71b) and the second support (72) connected to the pair of second holding ribs (71a, 71b) form an angle (interior angle) of 90° or more. Setting the angle formed by the second holding rib (71a, 71b) and the second support (72) to 90° or more makes it possible to use a simple molding die divided in two parts, i.e., one on the front side and one on the back side of the second frame (55), as an injection molding die used for manufacturing the second frame (55). Therefore, in this case, the second frame (55) can be provided with the second holding ribs (71a, 71b) and the second supports (72) without increasing the manufacturing cost of the second frame (55).

First Variation of Fourth Embodiment

Figure 29:
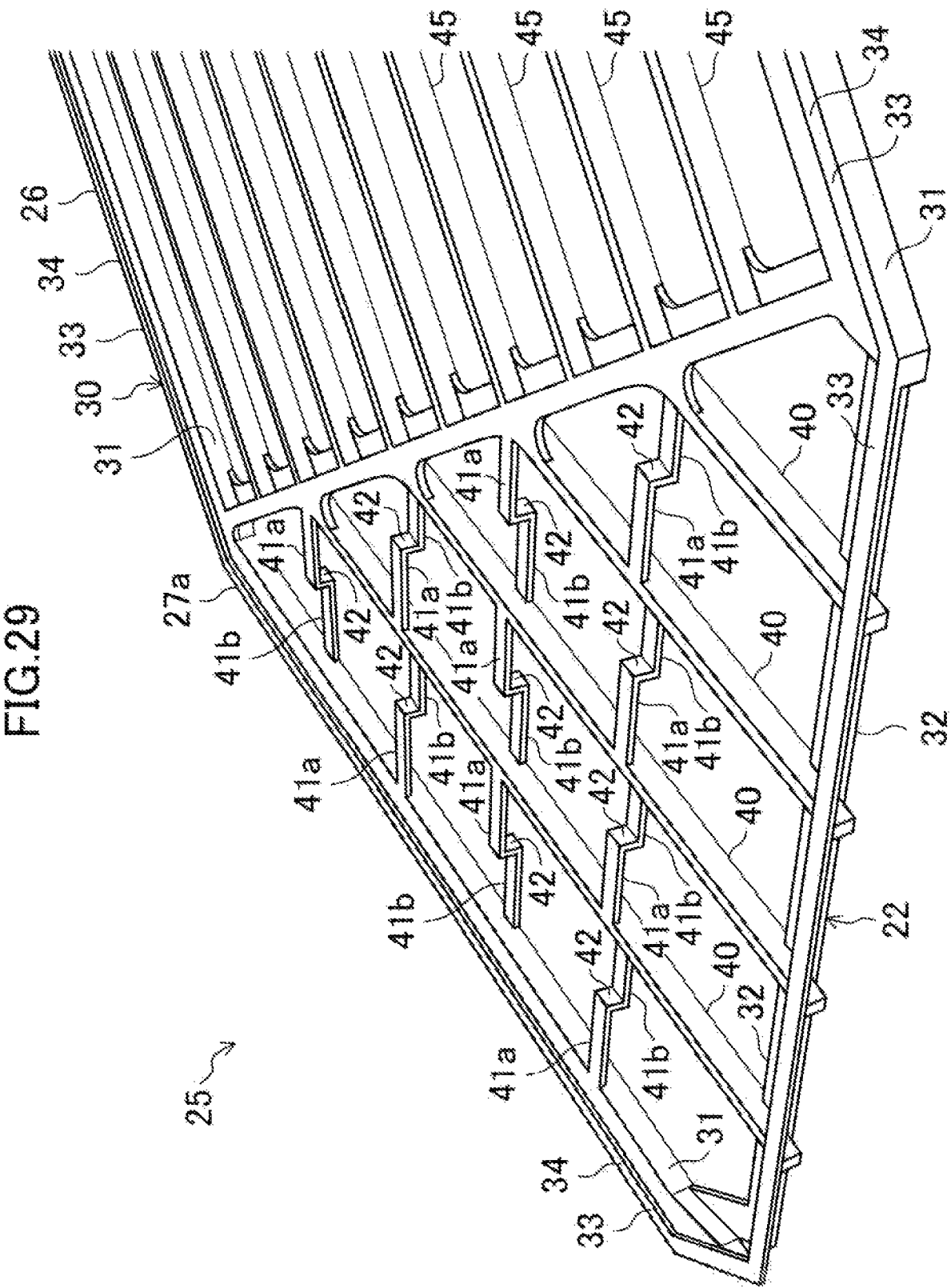
FIG. 29 is a perspective view of a first frame according to a first variation of the fourth embodiment, corresponding to FIG. 6.
Figure 30:
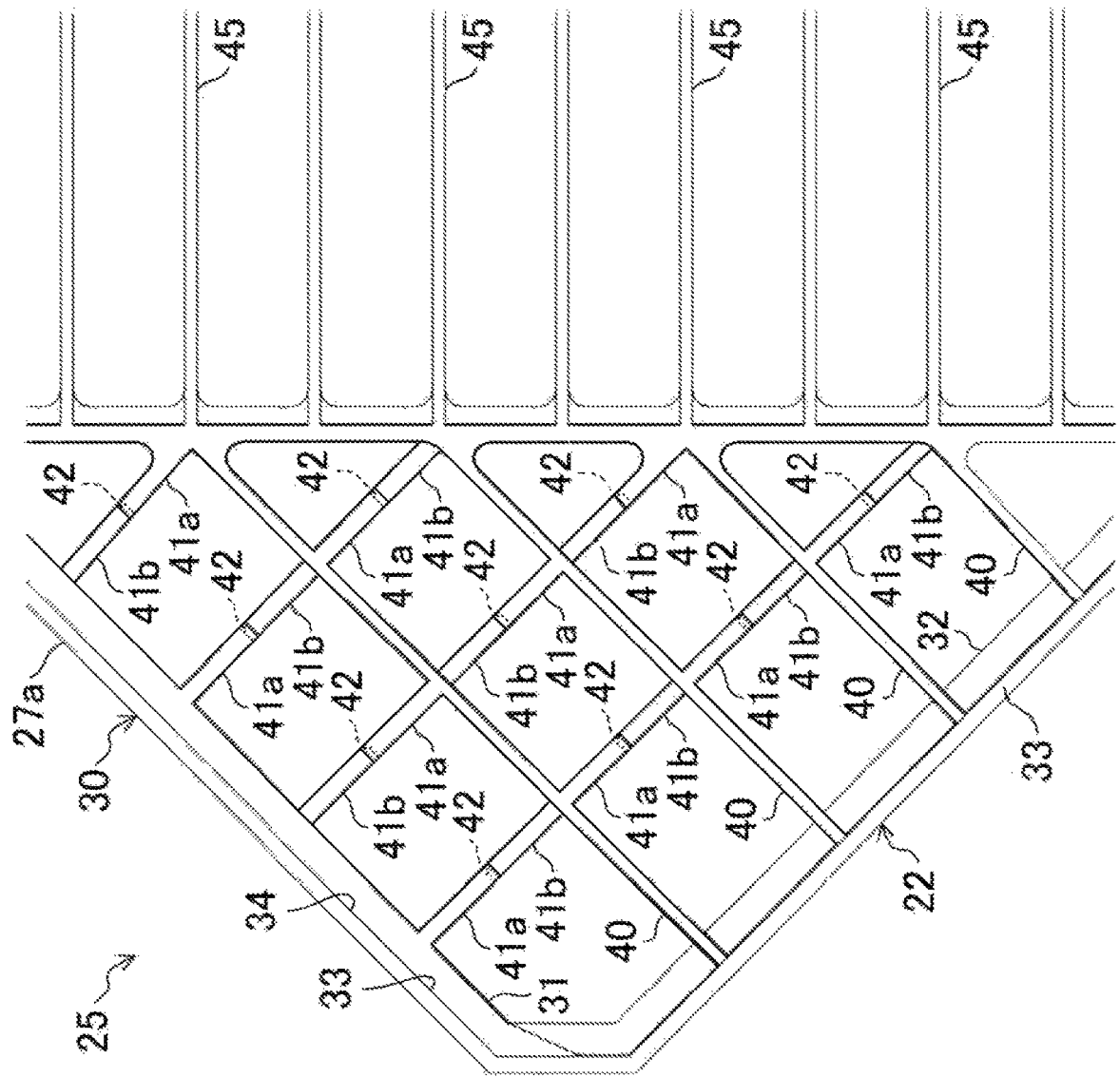
FIG. 30 is a plan view of part of the first frame according to the first variation of the fourth embodiment enlarged.
Figure 31:
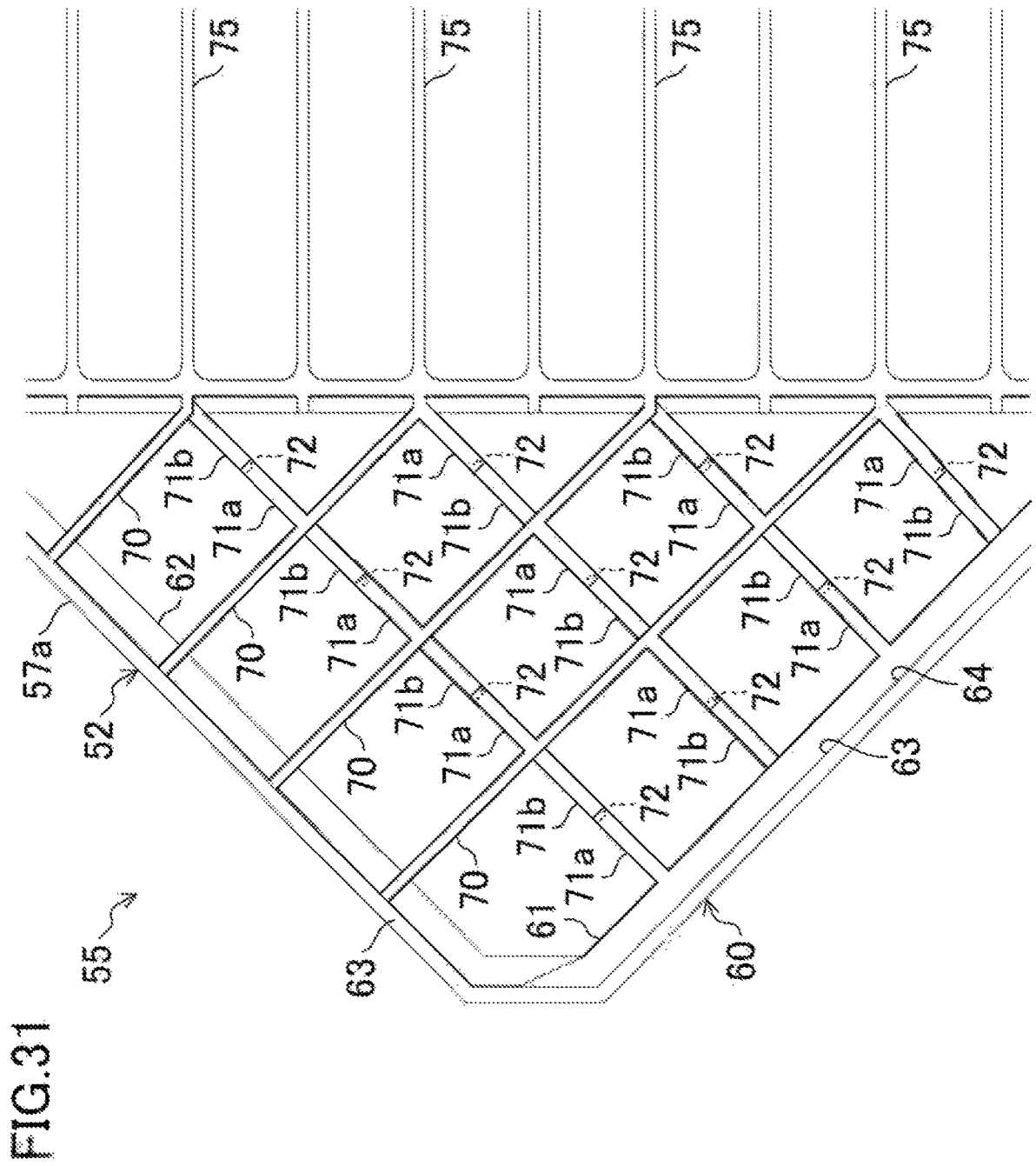
FIG. 31 is a plan view of part of a second frame according to the first variation of the fourth embodiment enlarged.
Figure 32:
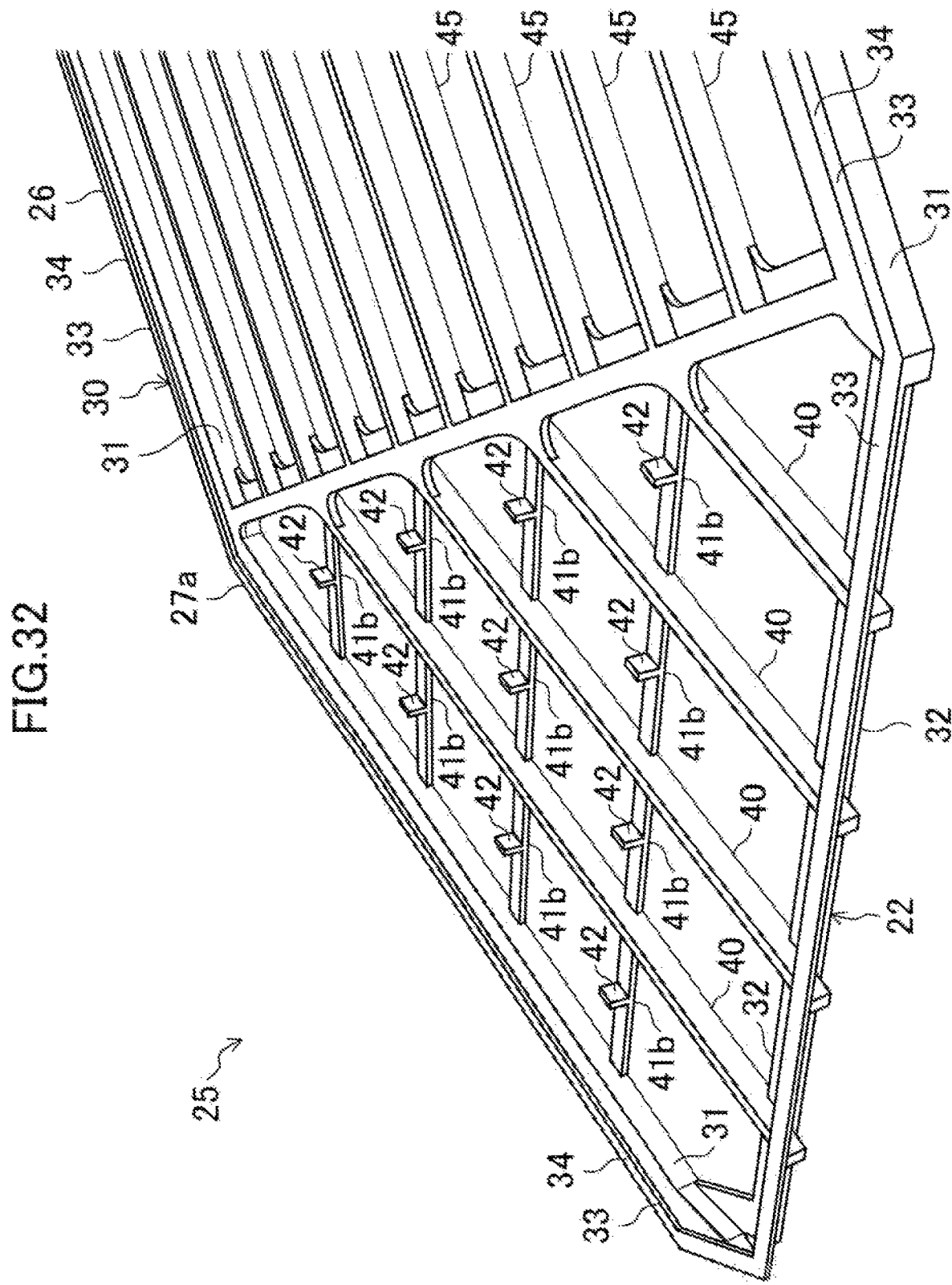
FIG. 32 is a perspective view of a first frame according to a fifth embodiment, corresponding to FIG. 6.
Figure 33:
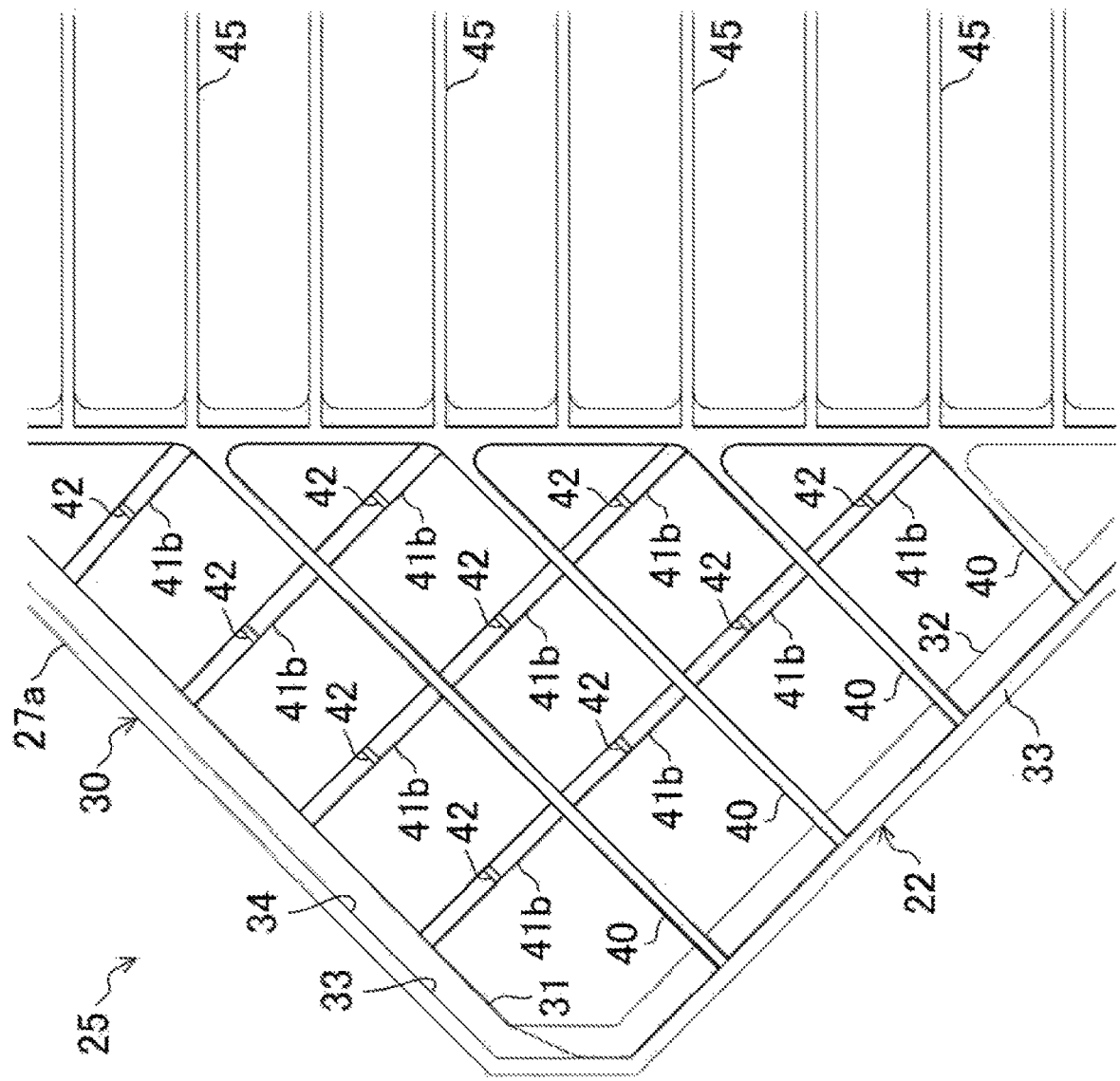
FIG. 33 is a plan view of part of the first frame according to the fifth embodiment enlarged.

The heat exchanger (10) of the present embodiment may have the first frame (25) configured as illustrated in FIGS. 29 and 30, and the second frame (55) configured as illustrated in FIG. 31.

First Frame

In the first frame (25) of this variation, the first holding ribs (41a) protruding on the front side from one of an adjacent pair of the first inner ribs (40) and the first holding ribs (41b) protruding on the back side from the one of the first inner ribs (40) are alternately arranged in the extending direction of the one of the first inner ribs (40). Each of the first holding ribs (41a) on the front side and the first holding ribs (41b) on the back side, both protruding from the one of the adjacent first inner ribs (40), is formed in a cantilever shape integral with the one of the first inner ribs (40).

Further, in the first frame (25) of this variation, the first holding ribs (41b) protruding on the back side from the other of the adjacent pair of first inner ribs (40) and the first holding ribs (41a) protruding on the front side from the other first inner rib (40) are alternately arranged in the extending direction of the other first inner rib (40). Each of the first holding ribs (41b) on the back side and the first holding ribs (41a) on the front side, both protruding from the other first inner rib (40), is formed in a cantilever shape integral with the other first inner rib (40).

Also in this variation, the first support (42) of the first frame (25) is integral with the corresponding pair of first holding ribs (41a, 41b), and connects the tip ends of the corresponding pair of first holding ribs (41a, 41b).

Second Frame

In the second frame (55) of this variation, the second holding ribs (71a) protruding on the front side from one of an adjacent pair of the second inner ribs (70) and the second holding ribs (71b) protruding on the back side from the one of the second inner ribs (70) are alternately arranged in the extending direction of the one of the second inner ribs (70). Each of the second holding ribs (71b) on the front side and the second holding ribs (71b) on the back side, both protruding from the one of the adjacent second inner ribs (70), is formed in a cantilever shape integral with the one of the second inner ribs (70).

Further, in the second frame (55) of this variation, the second holding ribs (71b) protruding on the back side from the other of the adjacent pair of second inner ribs (70) and the second holding ribs (71a) protruding on the front side from the other second inner rib (70) are alternately arranged in the extending direction of the other second inner rib (70). Each of the second holding ribs (71b) on the back side and the second holding ribs (71a) on the front side, both protruding from the other second inner rib (70), is formed in a cantilever shape integral with the other first inner rib (70).

Also in this variation, the second support (72) of the second frame (55) is integral with the corresponding pair of second holding ribs (71a, 71b), and connects the tip ends of the corresponding pair of second holding ribs (71a, 71b).

Features of First Variation

The first frame (25) of the heat exchanger (10) of this variation includes the plurality of first inner ribs (40) arranged parallel to each other. Between an adjacent pair of first inner ribs (40) of the first frame (25), the first holding ribs (41a) protruding on the front side from one of the adjacent first inner ribs (40) toward the other and the first holding ribs (41b) protruding on the back side from the one of the adjacent first inner ribs (40) toward the other are alternately arranged in the extending direction of the one of the adjacent first inner ribs (40). Further, between the adjacent pair of first inner ribs (40) of the first frame (25), the first holding ribs (41b) protruding on the back side toward the one of the adjacent first inner ribs (40) from the other and the first holding ribs (41a) protruding on the front side toward the one of the adjacent first inner ribs (40) from the other are alternately arranged in the extending direction of the other first inner rib (40).

The second frame (55) of the heat exchanger (10) of this variation includes the plurality of second inner ribs (70) arranged parallel to each other. Between an adjacent pair of second inner ribs (70) of the second frame (55), the second holding ribs (71a) protruding on the front side from one of the adjacent second inner ribs (70) toward the other and the second holding ribs (71b) protruding on the back side from the one of the adjacent second inner ribs (70) toward the other are alternately arranged in the extending direction of the one of the adjacent second inner ribs (70). Further, between the adjacent pair of second inner ribs (70) of the second frame (55), the second holding ribs (71b) protruding on the back side toward the one of the adjacent second inner ribs (70) from the other and the second holding ribs (71a) protruding on the front side toward the one of the adjacent second inner ribs (70) from the other are alternately arranged in the extending direction of the other second inner rib (70).

In the first frame (25) of this variation, the first holding ribs (41a) on the front side and the first holding ribs (41b) on the back side, both protruding from one of the adjacent pair of the first inner ribs (40), are alternately arranged in the extending direction of the one of the first inner ribs (40). In this first frame (25), the first holding ribs (41b) on the back side and the first holding ribs (41a) on the front side, both protruding from the other of the adjacent pair of first inner ribs (40), are alternately arranged in the extending direction of the other first inner rib (40).

In the heat exchanger (10) of this variation, the partition sheet (15) on the front side of the first frame (25) is supported by the first holding ribs (41a) protruding on the front side from the one of the adjacent first inner ribs (40) and the first holding ribs (41a) protruding on the front side from the other first inner rib (40). This allows the first frame (25) to hold the partition sheet (15) more reliably than a frame configured to support the partition sheet (15) only with the first holding ribs (41a) protruding on the front side from the one of the adjacent first inner ribs (40).

In the heat exchanger (10) of this variation, the partition sheet (15) on the back side of the first frame (25) is supported by the first holding ribs (41b) protruding on the back side from the one of the adjacent first inner ribs (40) and the first holding ribs (41b) protruding on the back side from the other of the adjacent first inner ribs (40). This allows the first frame (25) to hold the partition sheet (15) more reliably than a frame configured to support the partition sheet (15) only with the first holding ribs (41b) protruding on the back side from the other of the adjacent first inner ribs (40).

In the second frame (55) of this variation, the second holding ribs (71a) on the front side and the second holding ribs (71b) on the back side, both protruding from one of an adjacent pair of the second inner ribs (70), are alternately arranged in the extending direction of the one of the second inner ribs (70). In this the second frame (55), the second holding ribs (71b) on the back side and the second holding ribs (71a) on the front side, both protruding from the other second inner rib (70), are alternately arranged in the extending direction of the other second inner rib (70).

In the heat exchanger (10) of this variation, the partition sheet (15) on the front side of the second frame (55) is supported by the second holding ribs (71a) protruding on the front side from the one of the adjacent second inner ribs (70) and the second holding ribs (71a) protruding on the front side from the other second inner rib (70). This allows the second frame (55) to hold the partition sheet (15) more reliably than a frame configured to support the partition sheet (15) only with the second holding ribs (71a) protruding on the front side from the one of the adjacent second inner ribs (70).

In the heat exchanger (10) of this variation, the partition sheet (15) on the back side of the second frame (55) is supported by the second holding ribs (71b) protruding on the back side from the one of the adjacent second inner ribs (70) and the second holding ribs (71b) protruding on the back side from the other second inner rib (70). This allows the second frame (55) to hold the partition sheet (15) more reliably than a frame configured to support the partition sheet (15) only with the second holding ribs (71b) protruding on the back side from the other of the adjacent second inner ribs (70).

Second Variation of Fourth Embodiment

Each of the frames (25, 55) of the heat exchanger (10) of the present variation may include, in the middle area (26, 56), the support ribs (46a, 46b, 76a, 76b) formed in a cantilever shape just like the holding ribs (41a, 41b, 71a, 71b) in the end areas (27a, 27b, 57a, 57b).

Between an adjacent pair of intra-first passage ribs (45) of the first frame (25) of this variation, the first support rib (46a) protrudes on the front side from one of the pair of intra-first passage ribs (45) toward the other, and the first support rib (46b) protrudes on the back side toward the one of the pair of intra-first passage ribs (45) from the other. The first frame (25) includes the supports each connecting the tip end of the first support rib (46a) on the front side and the tip end of the first support rib (46b) on the back side. The supports are small plate-shaped rectangular members just like the first supports (42) provided in the end areas (27a, 27b).

Between an adjacent pair of intra-second passage ribs (75) of the second frame (55) of this variation, the second support rib (76a) protrudes on the front side from one of the pair of intra-second passage ribs (75) toward the other, and the second support rib (76b) protrudes on the back side toward the one of the pair of intra-second passage ribs (75) from the other. The second frame (55) includes the supports each connecting the tip end of the second support rib (76a) on the front side and the tip end of the second support rib (76b) on the back side. The supports are small plate-shaped rectangular members just like the second supports (72) provided in the end areas (57a, 57b).

Fifth Embodiment

A fifth embodiment will be described below. A heat exchanger (10) of the present embodiment is a variation of the heat exchanger (10) of the third embodiment in which the first frame (25) and the second frame (55) have been changed. Thus, the following description will be focused on the differences between the heat exchanger (10) of this embodiment and the heat exchanger (10) of the third embodiment.
First Frame
As illustrated in FIGS. 32 to 35, the first frame (25) of the present embodiment differs from that of the third embodiment in the shape of the first holding ribs (41b) on the back side and the shape of the first supports (42). The first frame (25) of the present embodiment has no first holding ribs (41a) on the front side.

Each of the first holding ribs (41b) on the back side is formed to extend from one of an adjacent pair of the first inner ribs (40) to the other, just like those of the third embodiment. The first holding rib (41b) has a rectangular plate shape. The width of the first holding rib (41b) is substantially equal to the width of the second inner ribs (70) of the second frame (55).

Figure 34:
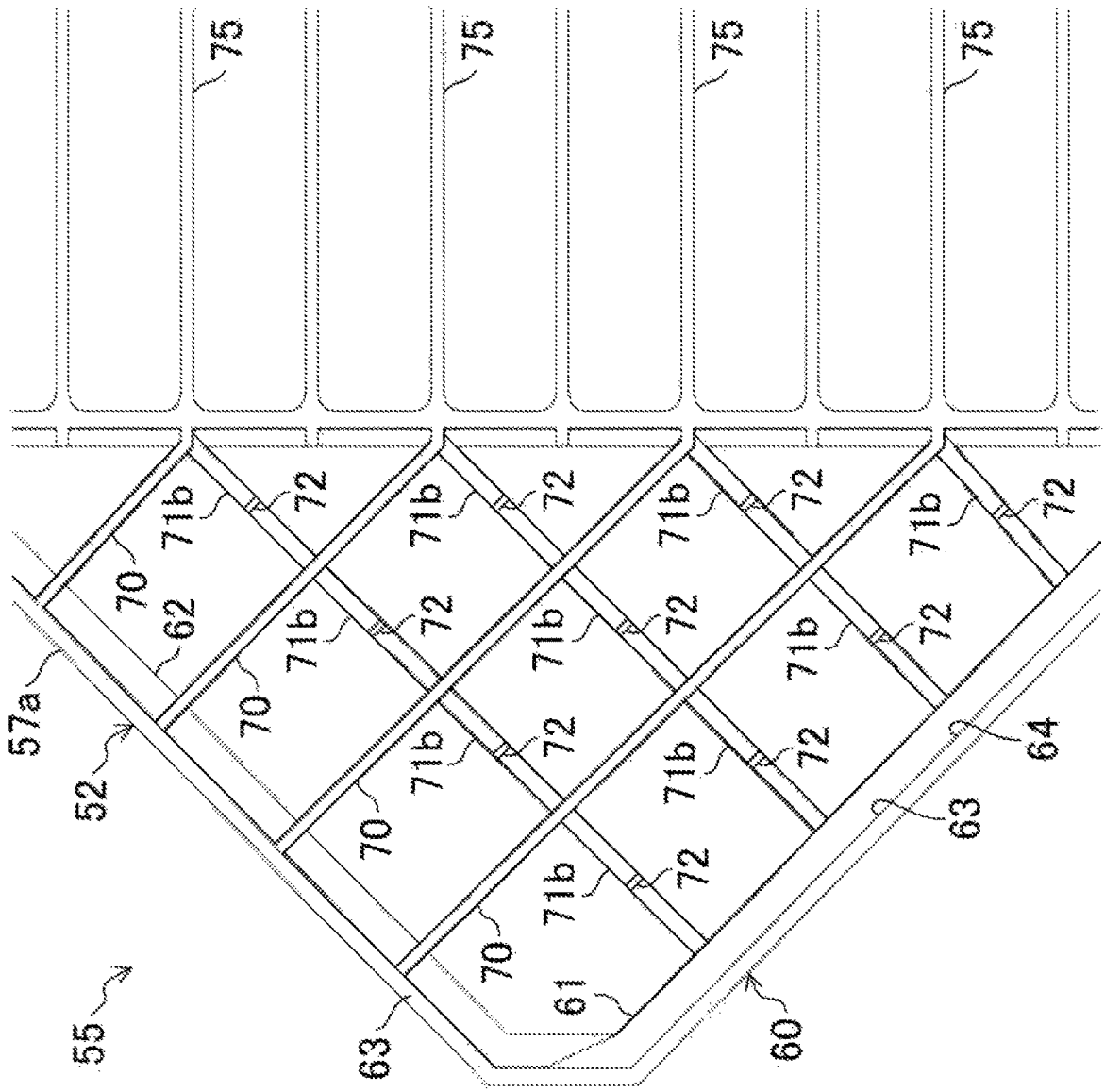
FIG. 34 is a plan view of part of a second frame according to the fifth embodiment enlarged.
Figure 35:
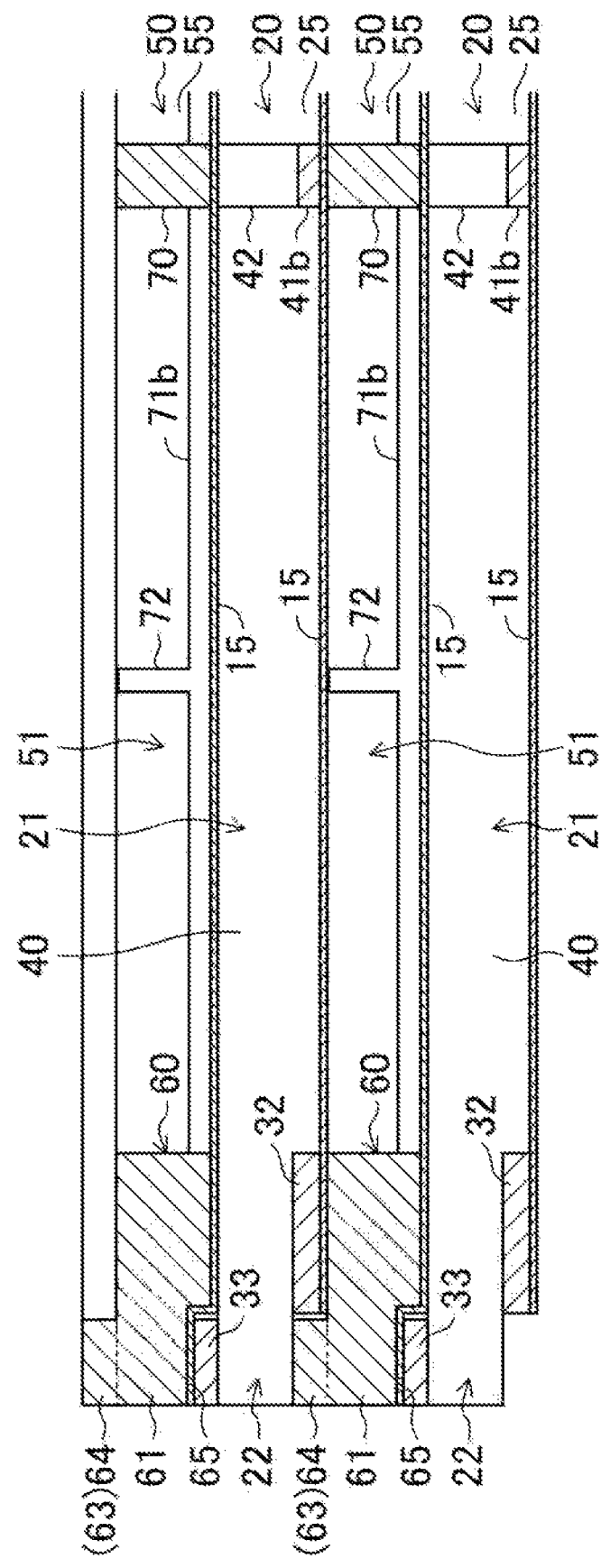
FIG. 35 is a cross-sectional view of portion of a heat exchanger of the fifth embodiment, corresponding to FIG. 11.

Each of the first supports (42) is a small rectangular plate-shaped member, and integral with the corresponding first holding rib (41b). The long side of each of the first supports (42) is substantially orthogonal to the longitudinal direction of the corresponding first holding rib (41b) in the same manner as in the third embodiment. The first support (42) protrudes from the front surface of the first holding rib (41b). The tip end face of the first support (42) is flush with the front surfaces of the first inner ribs (40) and the blocking portion (31).
Second Frame
As illustrated in FIGS. 34 and 35, the second frame (55) of the present embodiment is different from that of the third embodiment in the shape of the second holding ribs (71b) on the back side and the shape of the second supports (72). The second frame (55) of the present embodiment has no second holding ribs (71a) on the front side.

Each of the second holding ribs (71b) on the back side is formed to extend from one of an adjacent pair of the second inner ribs (70) to the other, just like those of the third embodiment. The second holding rib (71b) is formed in a rectangular plate shape. The width of the second holding rib (71b) is substantially equal to the width of the first inner ribs (40) of the first frame (25).

Each of the second supports (72) is a small rectangular plate-shaped member, and integral with the corresponding second holding rib (71b). The long side of each of the second supports (72) is substantially orthogonal to the longitudinal direction of the corresponding second holding rib (71b) in the same manner as in the third embodiment. The second support (72) protrudes from the front surface of the second holding rib (71b). The tip end face of the second support (72) is flush with the front surfaces of the second inner ribs (70) and the blocking portion (61).
Structure for Holding Partition Sheet
As illustrated in FIG. 35, in the auxiliary heat exchange section (12a, 12b) of the heat exchanger (10), the tip end faces of the first supports (42) of the first frame (25) face the back surfaces of the second inner ribs (70) of the adjacent second frame (55) located on the front side of the first frame (25). The partition sheet (15) is bonded to the back surfaces of the second inner ribs (70) of the second frame (55). Thus, the partition sheet (15) bonded to the second inner ribs (70) of the second frame (55) is sandwiched between the tip end faces of the first supports (42) of the first frame (25) and the back surfaces of the second inner ribs (70) of the second frame (55). In this way, the partition sheet (15) of the second element (50) is bonded to the second inner ribs (70) of the second frame (55) and sandwiched between the first supports (42) of the first frame (25) and the second inner ribs (70) of the second frame (55).

In the auxiliary heat exchange section (12a, 12b) of the heat exchanger (10), the tip end faces of the second supports (72) of the second frame (55) face the back surfaces of the first inner ribs (40) of the adjacent first frame (25) located on the front side of the second frame (55). The partition sheet (15) is bonded to the back surfaces of the first inner ribs (40) of the first frame (25). Thus, the partition sheet (15) bonded to the first inner ribs (40) of the first frame (25) is sandwiched between the tip end faces of the second supports (72) of the second frame (55) and the back surfaces of the first inner ribs (40) of the first frame (25). In this way, the partition sheet (15) of the first element (20) is bonded to the first inner ribs (40) of the first frame (25) and sandwiched between the second supports (72) of the second frame (55) and the first inner ribs (40) of the first frame (25).

Features of Fifth Embodiment

The first frame (25) of the heat exchanger (10) of the present embodiment includes the first holding ribs (41b) that are in contact with one of the two partition sheets (15) adjacent to the first frame (25). The first frame (25) includes the first supports (42). Each of the first supports (42) protrudes from an associated one of the first holding ribs (41b). The tip end of the first support (42) is in contact with the other of the two partition sheets (15) adjacent to the first frame (25).

The second frame (55) of the heat exchanger (10) of the present embodiment includes the second holding ribs (71b) that are in contact with one of the two partition sheets (15) adjacent to the second frame (55). The second frame (55) includes the second supports (72). Each of the second supports (72) protrudes from an associated one of the second holding ribs (71b). The tip end of the second support (72) is in contact with the other of the two partition sheets (15) adjacent to the second frame (55).

In the present embodiment, the first holding ribs (41b) are in contact with one of the two partition sheets (15) on both sides of the first frame (25), and the tip ends of the first supports (42) are in contact with the other. The one of the partition sheets (15) adjacent to the first frame (25) is sandwiched between the first holding ribs (41b) and the second inner ribs (70) of the second frame (55) in contact with the partition sheet (15). The other partition sheet (15) adjacent to the first frame (25) is sandwiched between the first supports (42) and the second inner ribs (70) of the second frame (55) in contact with the partition sheet (15).

In the present embodiment, the second holding ribs (71b) are in contact with one of the two partition sheets (15) on both sides of the second frame (55), and the tip ends of the second supports (72) are in contact with the other. The one of the partition sheets (15) adjacent to the second frame (55) is sandwiched between the second holding ribs (71b) and the first inner ribs (40) of the first frame (25) in contact with the partition sheet (15). The other partition sheet (15) adjacent to the second frame (55) is sandwiched between the second supports (72) and the first inner ribs (40) of the first frame (25) in contact with the partition sheet (15).

Variation of Fifth Embodiment

The heat exchanger (10) of the present embodiment may have no support ribs (46a, 76a) on the front side in the middle area (26, 56) of each frame (25, 55).

Each of the frames (25, 55) of this variation includes the supports that are integral with the support ribs (46a, 76a) in the middle area (26, 56). The supports of each of the frames (25, 55) are small rectangular plate-shaped members just like the supports (42, 72) provided in the end areas (27a, 27b, 57a, 57b).

The supports provided in the middle area (26) of the first frame (25) protrude from the front surfaces of the first support ribs (46b). The tip ends of the supports are in contact with the partition sheet (15) located on the front side of the first frame (25). The supports provided in the middle area (56) of the second frame (55) protrude from the front surfaces of the second support ribs (76b). The tip ends of the supports are in contact with the partition sheet (15) located on the front side of the second frame (55).

Sixth Embodiment

A sixth embodiment will be described below. A heat exchanger (10) of the present embodiment has its configuration changed from the heat exchanger (10) of the first embodiment. Thus, the following description will be focused on the differences between the heat exchanger (10) of the present embodiment and the heat exchanger (10) of the first embodiment.

In the following description, the upper surfaces of the first frame (25) and the second frame (55) in FIGS. 36, 37, and 38 will be referred to as "front surfaces," and the lower surfaces of the first frame (25) and the second frame (55) in FIGS. 36, 37, and 38 will be referred to as "back surfaces."

The frame portion (30) of the first frame (25) of the present embodiment includes an outer rib (33) which is an outer portion extending along the periphery of the frame portion (30). The frame portion (30) also includes an inner portion (136) which is a portion of the blocking portion (31) located inward of the outer rib (33) and extending along the outer rib (33).

The frame portion (60) of the second frame (55) of the present embodiment includes an outer rib (63) which is an outer portion extending along the periphery of the frame portion (60). The frame portion (60) also includes an inner portion (166) which is a portion of the blocking portion (61) located inward of the outer rib (63) and extending along the outer rib (63).

Outer Clearance

Figure 36:
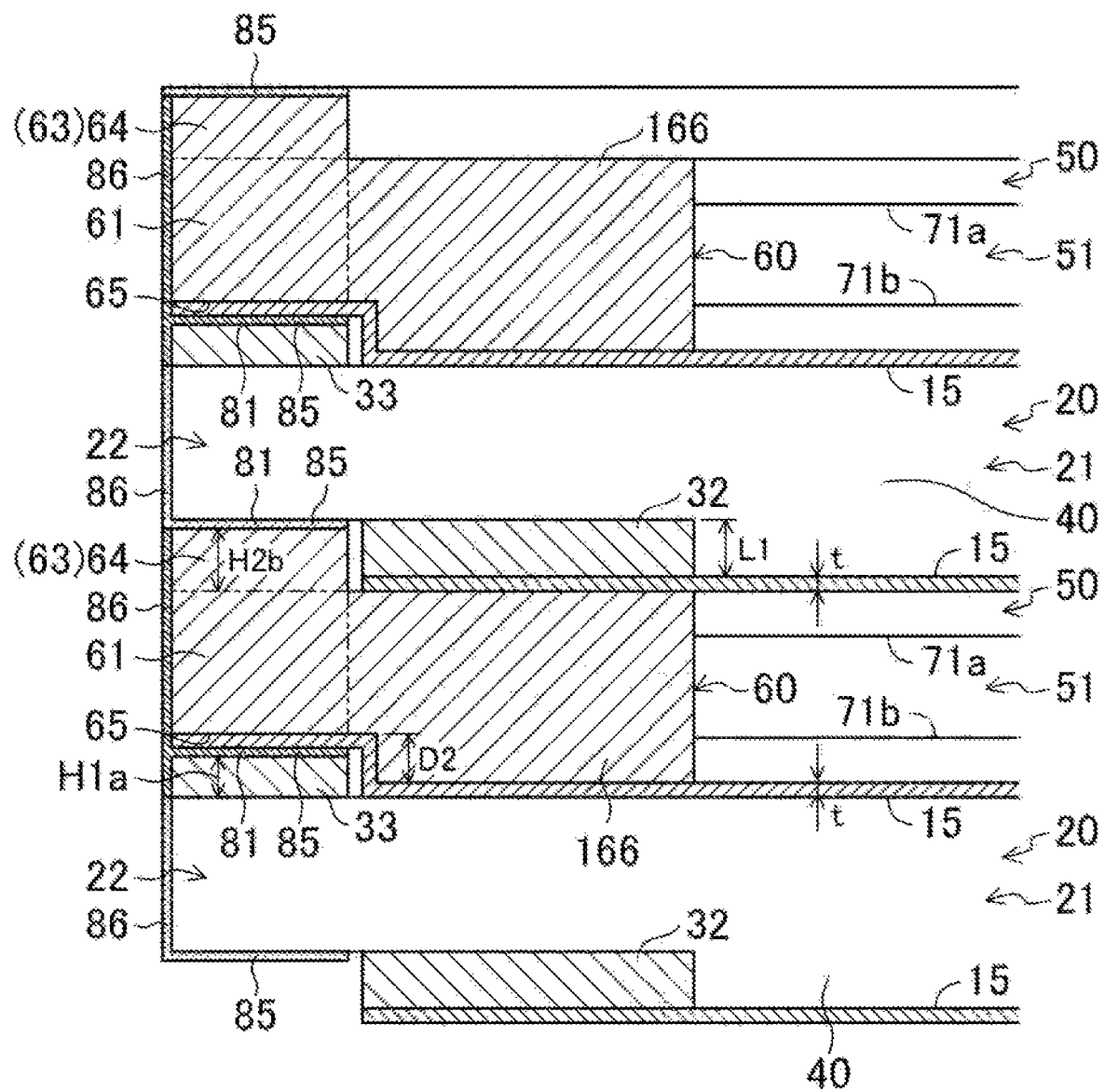
FIG. 36 is a partially enlarged cross-sectional view corresponding to the cross section taken along line XI-XI in FIG. 3, illustrating a heat exchanger according to a sixth embodiment.
Figure 39:
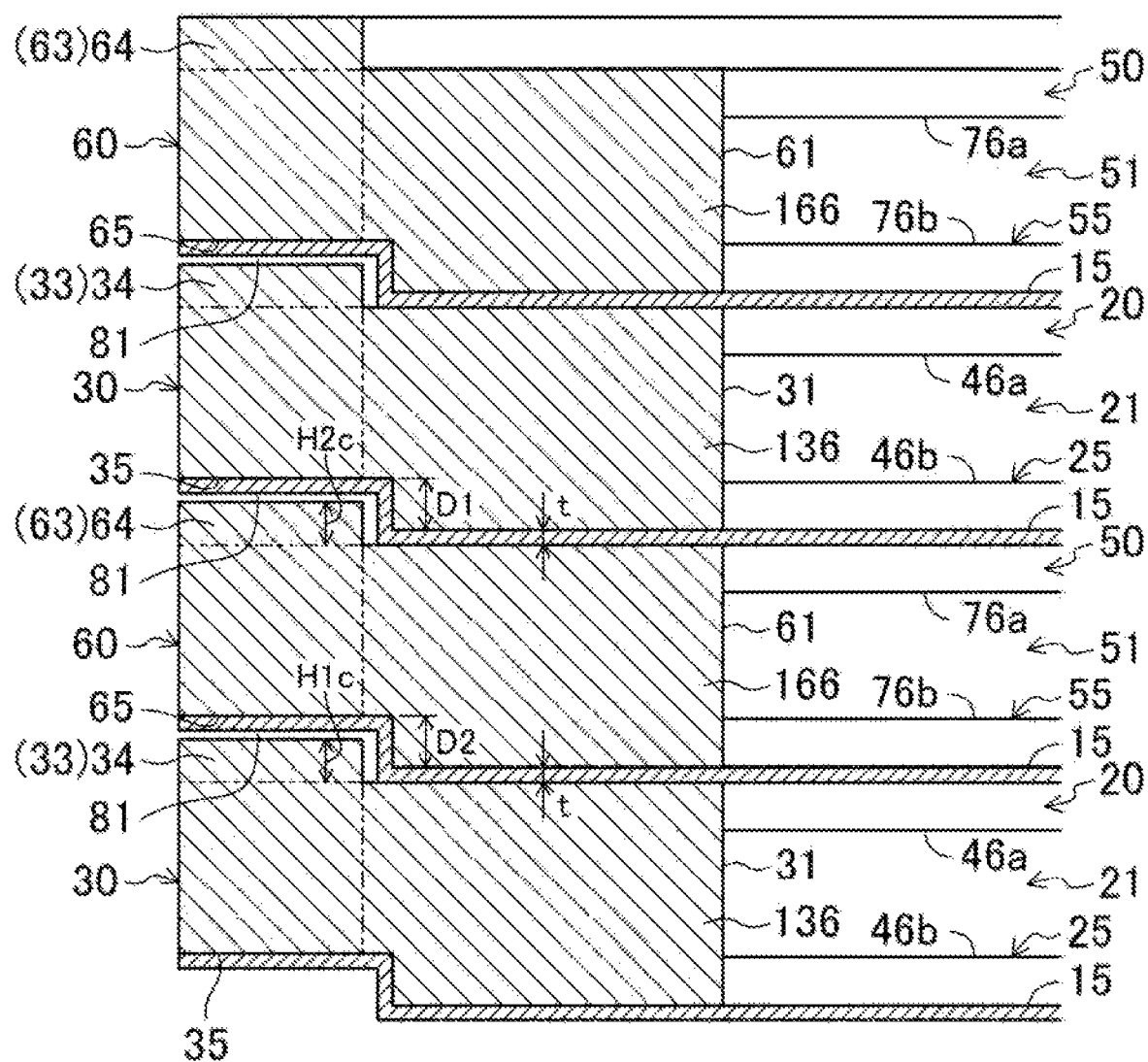
FIG. 39 is a cross-sectional view of portion of the heat exchanger according to the sixth embodiment in the course of manufacture, corresponding to FIG. 38.

As illustrated in FIG. 36, a portion of the outer rib (33) of the first frame (25) facing the first communication opening (22) has a height H1a smaller than the depth D2 of the elongated recess (65) of the second frame (55) (H1a<D2). As illustrated in FIG. 37, the ridge (34), which constitutes part of the outer rib (33) of the first frame (25), has a portion facing the second communication opening (52), and the portion has a height H1b smaller than the sum (L2+t) of the thickness L2 of the auxiliary rib (62) of the second frame (55) and the thickness t of the partition sheet (15) (H1b<L2+t). Further, as illustrated in FIG. 39, the ridge (34), which constitutes part of the outer rib (33) of the first frame (25), has a portion in the main heat exchange section (11), and the portion has a height H1c smaller than the depth D2 of the elongated recess (65) of the second frame (55) (H1c<D2).

Thus, the heat exchanger (10) has an outer clearance (81) formed between the front surface of the outer rib (33) of the first frame (25) and the second element (50) on the front side thereof. The outer clearance (81) has a width W (=D2−H1a=L2+t−H1b=D2−H1c) of about 0.1 mm or more and 0.2 mm or less.

Figure 37:
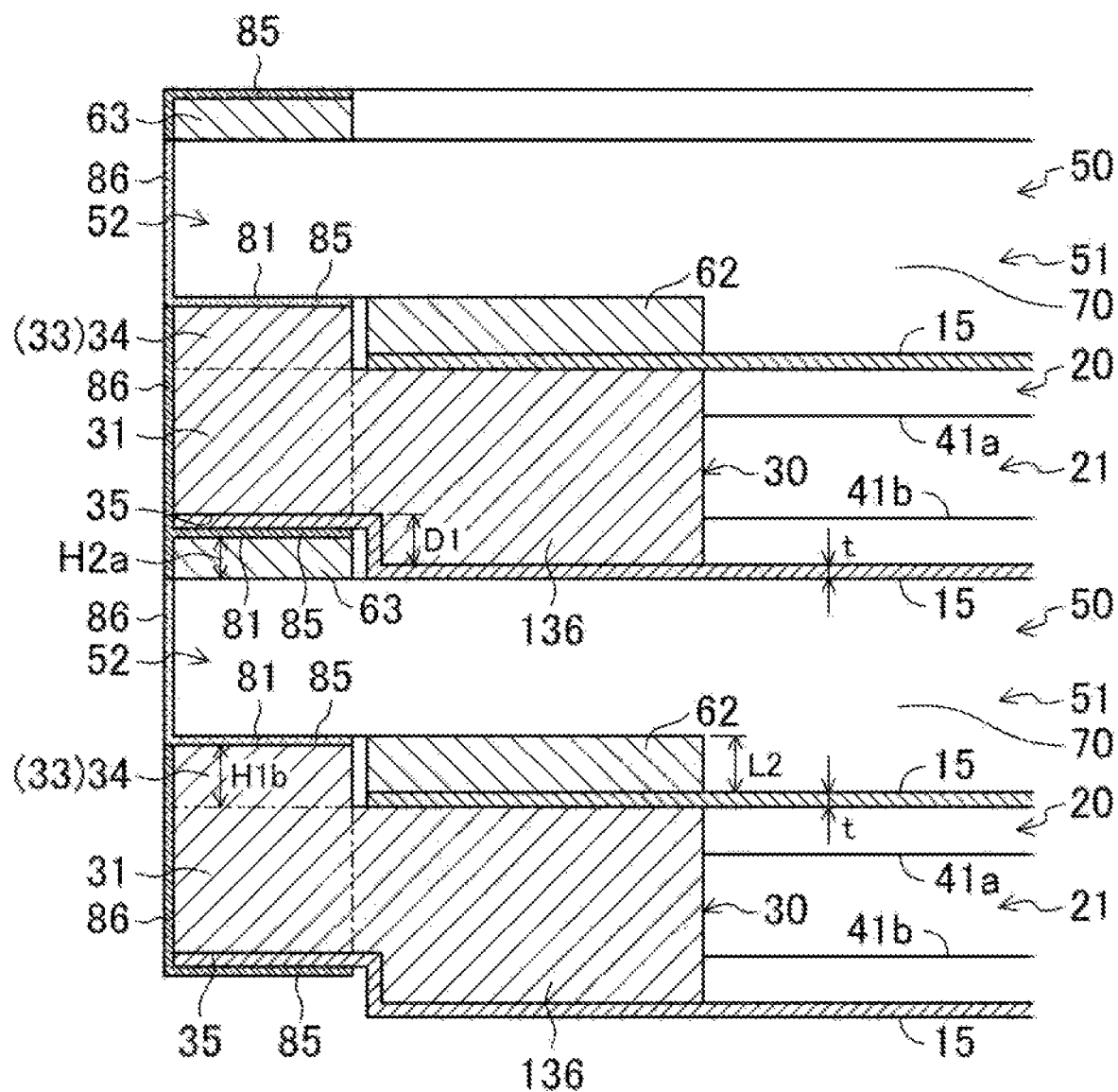
FIG. 37 is a partially enlarged cross-sectional view corresponding to the cross section taken along line XIII-XIII of FIG. 3, illustrating the heat exchanger according to the sixth embodiment.

As illustrated in FIG. 37, a portion of the outer rib (63) of the second frame (55) facing the second communication opening (52) has a height H2a smaller than the depth D1 of the elongated recess (65) of the first frame (25) (H2a<D1). As illustrated in FIG. 36, the ridge (64), which constitutes part of the outer rib (63) of the second frame (55), has a portion facing the first communication opening (22), and the portion has a height H2b smaller than the sum (L1+t) of the thickness L1 of the auxiliary rib (32) of the first frame (25) and the thickness t of the partition sheet (15) (H2b<L1+t). Further, as illustrated in FIG. 39, the ridge (64), which constitutes part of the outer rib (63) of the second frame (55), has a portion in the main heat exchange section (11), and the portion has a height H2c smaller than the depth D1 of the elongated recess (65) of the first frame (25) (H2c<D1).

Thus, the heat exchanger (10) has an outer clearance (81) formed between the front surface of the outer rib (63) of the second frame (55) and the first element (20) on the front side thereof. The outer clearance (81) has a width W (=D1−H2a=L1+t−H2b=D1−H2c) of about 0.1 mm or more and 0.2 mm or less.

Adhesive Layer, Coating Layer

Figure 38:
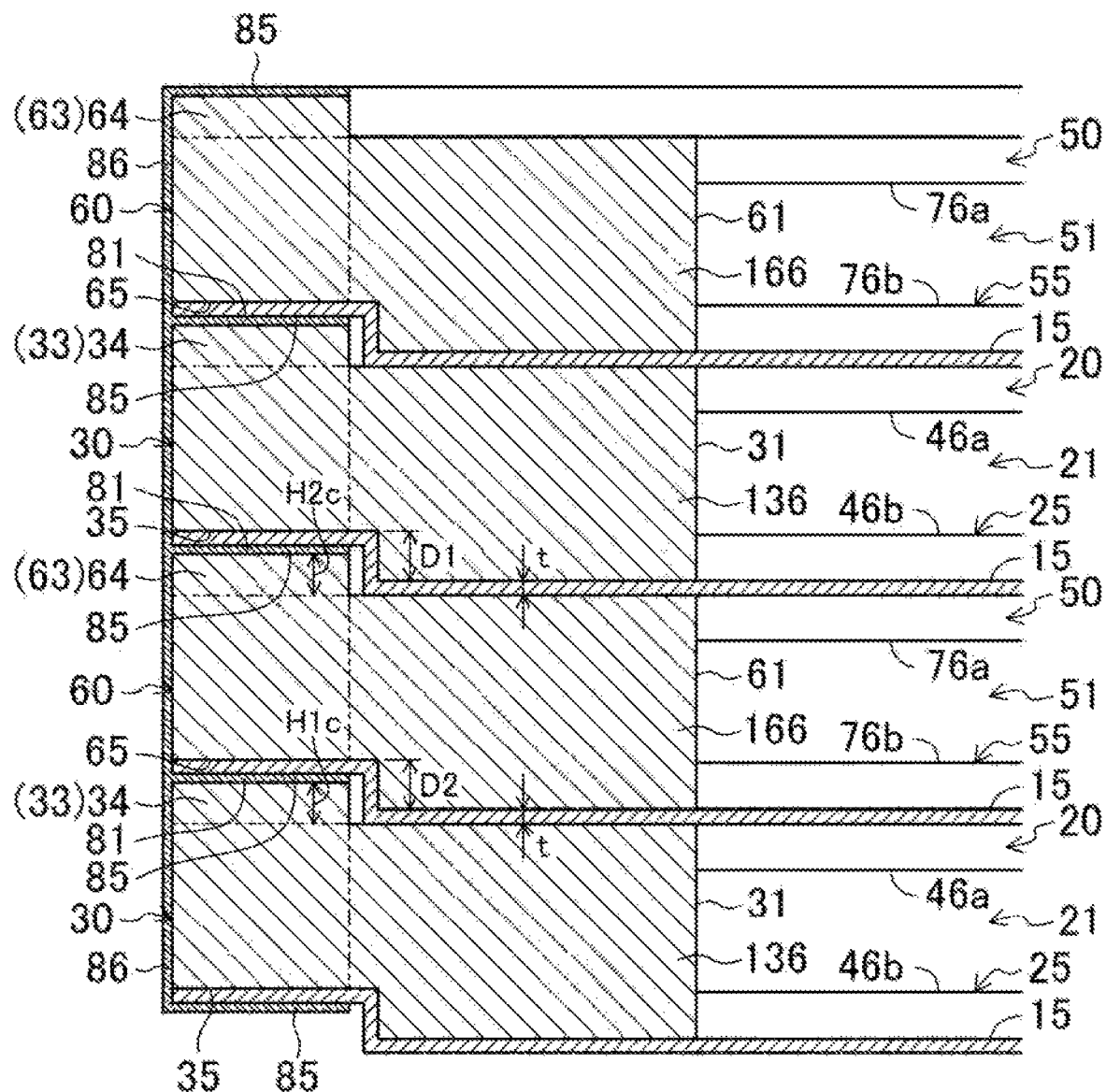
FIG. 38 is a partially enlarged cross-sectional view corresponding to the cross section taken along line XV-XV of FIG. 3, illustrating the heat exchanger according to the sixth embodiment.

As illustrated in FIGS. 36, 37 and 38, the heat exchanger (10) of the present embodiment has an adhesive layer (85) and a coating layer (86). The adhesive layer (85) fills the outer clearance (81) formed in the heat exchanger (10). The coating layer (86) covers the outer surface of the heat exchanger (10).

As will be described later, an adhesive is applied to the outer surface of the stack of the first elements (20) and the second elements (50), and then cured to form the adhesive layer (85) and the coating layer (86). The adhesive layer (85) and the coating layer (86) are an integral coating film made of the same material.

As illustrated in FIG. 36, at the first communication opening (22) of the auxiliary heat exchange section (12a, 12b) of the heat exchanger (10), the front surface of the outer rib (33) of the first frame (25) is joined to the second element (50) located on the front side of the first frame (25) with the adhesive layer (85) filling the outer clearance (81) facing the front surface. At this portion, the tip end face of the ridge (64) of the second frame (55) is joined to the first inner rib (40) of the first frame (25) located on the front side of the second frame (55) with the adhesive layer (85) filling the outer clearance (81) facing the tip end face.

As illustrated in FIG. 37, at the second communication opening (52) of the auxiliary heat exchange section (12a, 12b) of the heat exchanger (10), the tip end face of the ridge (34) of the first frame (25) is joined to the second inner rib (70) of the second frame (55) located on the front side of the first frame (25) with the adhesive layer (85) filling the outer clearance (81) facing the tip end face. At this portion, the front surface of the outer rib (63) of the second frame (55) is joined to the first element (20) located on the front side of the second frame (55) with the adhesive layer (85) filling the outer clearance (81) facing the front surface.

As illustrated in FIG. 38, in the main heat exchange section (11) of the heat exchanger (10), the tip end face of the ridge (34) of the first frame (25) is joined to the second element (50) located on the front side of the first frame (25) with the adhesive layer (85) filling the outer clearance (81) facing the tip end face. At this portion, the tip end face of the ridge (64) of the second frame (55) is joined to the first element (20) located on the front side of the second frame (55) with the adhesive layer (85) filling the outer clearance (81) facing the tip end face.

Step of Forming Adhesive Layer and Coating Layer

The step of forming the adhesive layer and the coating layer will be described below.

The manufacturing process of a heat exchanger (10) includes, first, a step of attaching a partition sheet (15) to a first frame (25) to form a first element (20), and attaching another partition sheet (15) to a second frame (55) to form a second element (50). Then, a stacking step of alternately stacking the first elements (20) and the second elements (50) follows.

As illustrated in FIG. 39, when the stacking step is completed, an outer clearance (81) is formed between an adjacent pair of the first element (20) and the second element (50). As described above, the outer clearance (81) is a narrow clearance facing the front surface of the outer rib (33, 63) of each of the frames (25, 55). The outer clearance (81) opens on the outer surface of the heat exchanger (10).

An application step follows the stacking step. In the application step, an adhesive is applied to the outer surface of the heat exchanger (10) (i.e., an assembly constituted of a stack of the first elements (20) and the second elements (50)). A main component of the adhesive is a resin that cures when exposed to ultraviolet rays. The adhesive has a relatively low viscosity. The viscosity of the adhesive is, for example, about 10 mPa·s to about 2000 mPa·s. Therefore, the adhesive applied to the outer surface of the heat exchanger (10) enters the outer clearance (81) by capillary action.

A curing step follows the application step. In the curing step, the adhesive applied to the heat exchanger (10) is irradiated with ultraviolet rays. Receiving the ultraviolet rays, the adhesive adhering to the outer surface of the heat exchanger (10) is cured to form a coating layer (86) covering the outer surface of the heat exchanger (10). The adhesive that has entered the outer clearance is cured when exposed to the ultraviolet rays to form an adhesive layer (85).

The adhesive used in the application step contains an antibacterial component and an antifungal component. Therefore, the adhesive layer (85) and the coating layer (86) formed through the curing step contain the antibacterial component and the antifungal component.

Structure for Holding Partition Sheet

In the same manner as in the first embodiment described above, the partition sheet (15) is bonded to the back surface of the first frame (25) of the first element (20), and another partition sheet (15) is bonded to the back surface of the second frame (55) of the second element (50).

In the same manner as in the first embodiment described above, the heat exchanger (10) includes a plurality of first elements (20) and a plurality of second elements (50) alternately stacked. The partition sheet (15) of each of the elements (20, 50) is sandwiched between an adjacent pair of the first frame (25) and the second frame (55).

Holding Structure (1) in Auxiliary Heat Exchange Section

As illustrated in FIG. 36, at the first communication opening (22) of the auxiliary heat exchange section (12a, 12b) of the heat exchanger (10), the partition sheet (15) bonded to the back surface of the first frame (25) is sandwiched between the auxiliary rib (32) of the first frame (25) and the inner portion (166) of the blocking portion (61) of the second frame (55). Thus, the partition sheet (15) bonded to the back surface of the first frame (25) is in close contact with the front surface of the inner portion (166) of the blocking portion (61) of the second frame (55) located on the back side thereof.

At the first communication opening (22) of the auxiliary heat exchange section (12a, 12b) of the heat exchanger (10), the partition sheet (15) bonded to the back surface of the second frame (55) is sandwiched between the inner portion (166) of the blocking portion (61) of the second frame (55) and the first inner ribs (40) of the first frame (25). Thus, the partition sheet (15) bonded to the back surface of the second frame (55) is in close contact with the front surfaces of the first inner ribs (40) of the first frame (25) located on the back side thereof.

As described above, the outer clearance (81) is formed between an adjacent pair of the first element (20) and the second element (50). The heat exchanger (10) includes the adhesive layer (85) formed to fill the outer clearance (81). As illustrated in FIG. 36, of the partition sheet (15) bonded to the back surface of the second frame (55), a portion covering the elongated recess (65) is bonded to the outer rib (33) of the first frame (25) with the adhesive layer (85). Further, the ridge (64), which is a portion of the outer rib (63) of the second frame (55), is bonded to the first inner ribs (40) of the first frame (25) with the adhesive layer (85).

Holding Structure (2) in Auxiliary Heat Exchange Section

As illustrated in FIG. 37, at the second communication opening (52) of the auxiliary heat exchange section (12a, 12b) of the heat exchanger (10), the partition sheet (15) bonded to the back surface of the first frame (25) is sandwiched between the inner portion (136) of the blocking portion (31) of the first frame (25) and the second inner ribs (70) of the second frame (55). Therefore, the partition sheet (15) bonded to the back surface of the second frame (25) is in close contact with the front surfaces of the second inner ribs (70) of the second frame (55) located on the back side thereof.

At the second communication opening (52) of the auxiliary heat exchange section (12a, 12b) of the heat exchanger (10), the partition sheet (15) bonded to the back surface of the second frame (55) is sandwiched between the auxiliary rib (62) of the second frame (55) and the inner portion (136) of the blocking portion (31) of the first frame (25). Thus, the partition sheet (15) bonded to the back surface of the second frame (55) is in close contact with the front surface of the inner portion (136) of the blocking portion (31) of the first frame (25) located on the back side thereof.

As described above, the outer clearance (81) is formed between an adjacent pair of the first element (20) and the second element (50). The heat exchanger (10) includes the adhesive layer (85) formed to fill the outer clearance (81). As illustrated in FIG. 37, of the partition sheet (15) bonded to the back surface of the first frame (25), a portion covering the elongated recess (35) is bonded to the outer rib (63) of the second frame (55) with the adhesive layer (85). Further, the ridge (34), which is a portion of the outer rib (33) of the first frame (25), is bonded to the second inner rib (70) of the second frame (55) with the adhesive layer (85).

Holding Structure in Main Heat Exchange Portion

As illustrated in FIG. 38, each of the partition sheets (15) is sandwiched between the inner portion (136) of the blocking portion (31) of the first frame and the inner portion (166) of the blocking portion (61) of the second frame (55). Specifically, the partition sheet (15) bonded to the back surface of the first frame (25) is in close contact with the front surface of the inner portion (166) of the blocking portion (61) of the second frame (55) located on the back side thereof. The partition sheet (15) bonded to the back surface of the second frame (55) is in close contact with the front surface of the inner portion (136) of the blocking portion (31) of the first frame (25) located on the back side thereof.

As described above, the outer clearance (81) is formed between an adjacent pair of the first element (20) and the second element (50).

Specifically, the outer clearance (81) is formed between the tip end face of the ridge (34) of the first frame (25) and the partition sheet (15) of the second element (50) located on the front side of the first frame (25). Thus, a portion of the partition sheet (15) of the second element (50) covering the wall surface of the elongated recess (65) of the second element (50) is not in contact with the ridge (34) of the first frame (25). The adhesive layer (85) is formed in the outer clearance (81). A portion of the partition sheet (15) of the second element (50) covering the wall surface of the elongated recess (65) is bonded to the ridge (34) of the first frame (25) with the adhesive layer (85).

The outer clearance (81) is also formed between the tip end face of the ridge (64) of the second frame (55) and the partition sheet (15) of the first element (20) located on the front side of the second frame (55). Thus, a portion of the partition sheet (15) of the first element (20) covering the wall surface of the elongated recess (35) of the first element (20) is not in contact with the ridge (64) of the second frame (55). The adhesive layer (85) is formed in the outer clearance (81). A portion of the partition sheet (15) of the first element (20) covering the wall surface of the elongated recess (35) is bonded to the ridge (64) of the second frame (55) with the adhesive layer (85).

Feature (1) of Sixth Embodiment

The heat exchanger (10) of the present embodiment includes the plurality of flat sheet-like partition sheets (15) and the frames (25, 55) that are alternately stacked with the partition sheets (15) to keep a space between an adjacent pair of the partition sheets (15). The heat exchanger (10) includes the first passages (21) and the second passages (51) that are alternately formed with the partition sheets (15) interposed therebetween.

Each of the frames (25, 55) has the frame portion (30, 60) formed along the periphery of the partition sheets (15). The frame portion (30, 60) has the outer rib (33, 63) formed along the periphery of the frame portion (30, 60), and an inner portion (136, 166) located inward of the outer rib (33, 63) and extends along the outer rib (33, 63). The inner portion (136, 166) of the frame portion (30, 60) and the frame (25, 55) adjacent to the inner portion (136, 166) sandwich and hold the partition sheet (15). The outer clearance (81) is formed between the outer rib (33, 63) of the frame portion (30, 60) and the frame (25, 55) adjacent to the outer rib (33, 63).

In the heat exchanger (10) of the present embodiment, the frame portion (30, 60) formed along the periphery of the partition sheet (15) is provided with the outer rib (33, 63) and the inner portion (136, 166). The heat exchanger (10) has the outer clearance (81) formed between the outer rib (33, 63) of the frame portion (30, 60) and the frame (25, 55) adjacent to the outer rib (33, 63). In the heat exchanger (10), the inner portion (136, 166) of the frame portion (30, 60) and the frame (25, 55) adjacent to the inner portion (136, 166) sandwich and hold the partition sheet (15). This seals a gap between the frame portion (30, 60) of the frame (25, 55) and the partition sheet (15), and improves hermeticity of the heat exchanger (10).

As described above, the frame (25, 55) is an injection-molded resin member. A flat, injection-molded member tends to have a dimensional accuracy decreasing toward the outer edge thereof. Therefore, the frame (25, 55) of the present embodiment may lower the dimensional accuracy of the frame portion (30, 60).

The low dimensional accuracy of the frame portion (30, 60) makes it difficult to bring the entire frame portion (30, 60) into close contact with the adjacent element (20, 50). This may generate a gap between the adjacent elements (20, 50), and may lower the hermeticity of the heat exchanger (10). A gap formed between the adjacent elements (20, 50) causes the air to leak from the first passage (21) or the second passage (51) through the gap, or the air flows into the first passage (21) or the second passage (51) through the gap.

To deal with this defect, in the frame (25, 55) of the present embodiment, the outer rib (33, 63) closer to the outer periphery of the frame portion (30, 60) having relatively low dimensional accuracy has a height that allows the outer clearance (81) to be formed between the outer rib (33, 63) and the element (20, 50) adjacent to the outer rib (33, 63). Further, in the frame (25, 55) of the present embodiment, the inner portion (136, 166) closer to the inner periphery of the frame portion (30, 60) having relatively high dimensional accuracy has a height that allows the inner portion (136, 166) to be in close contact with the adjacent element (20, 50).

Therefore, the heat exchanger (10) of the present embodiment can improve the sealing between the adjacent elements (20, 50), and can enhance the hermeticity of the heat exchanger (10). This can reduce the amount of the air leaking from the air passage (21, 51) or entering the air passage (21, 51) through a passage other than the regular passages.

Feature (2) of Sixth Embodiment

The heat exchanger (10) of the present embodiment includes the adhesive layer (85). The adhesive layer (85) is provided to fill the outer clearance (81), and bonds the outer rib (33, 63) of the frame portion (30, 60) to the frame (25, 55) adjacent to the outer rib (33, 63).

The heat exchanger (10) of the present embodiment includes the adhesive layer (85) that fills the outer clearance (81) and bonds the adjacent frames (25, 55) to each other. Filling the outer clearance (81) with the adhesive layer (85) improves the hermeticity of the heat exchanger (10). This reduces the amount of the air leaking from the air passage (21, 51) or entering the air passage (21, 51) through a passage other than the regular passages.

Feature (3) of Sixth Embodiment

The heat exchanger (10) of the present embodiment includes the coating layer (86).

The coating layer (86) is made of the same material as the adhesive layer (85) and is formed continuously with the adhesive layer (85) to cover the outer surface of the heat exchanger (10).

The heat exchanger (10) of the present embodiment has the outer surface covered with the adhesive layer (85). Thus, the sealing between the stacked elements (20, 50) improves, and the hermeticity of the heat exchanger (10) improves. This reduces the amount of the air leaking from the air passage (21, 51) or entering the air passage (21, 51) through a passage other than the regular passages.

As described above, the heat exchanger (10) of the present embodiment is provided for a ventilator. For maintenance of the ventilator, the heat exchanger (10) is detached from or attached to the ventilator. When detached or attached, the heat exchanger (10) rubs its outer surface against a guide rail or any other components provided in the ventilator. Thus, repeated attachment and detachment of the heat exchanger (10) to and from the ventilator cause the outer surface of the heat exchanger (10) to be worn. This may deteriorate the sealing between the elements (20, 50).

The heat exchanger (10) of the present embodiment has the outer surface covered with the adhesive layer (85). Thus, the adhesive layer (85) protects the outer surface of the heat exchanger (10), and makes the outer surface of the heat exchanger (10) less worn. Therefore, the present embodiment can improve the durability and reliability of the heat exchanger (10). Further, the present embodiment can reduce the friction coefficient of the outer surface of the heat exchanger (10), and can facilitate the attachment and detachment of the heat exchanger (10) to and from the ventilator.

Feature (4) of Sixth Embodiment

The heat exchanger (10) of the present embodiment includes the adhesive layer (85) made of an adhesive that cures when exposed to ultraviolet rays.

In the heat exchanger (10) of the present embodiment, the adhesive that has entered the outer clearance (81) cures when exposed to the ultraviolet rays to form the adhesive layer (85). Thus, the curing rate of the adhesive can be easily and suitably controlled, and the adhesive layer (85) can be reliably formed.

Feature (5) of Sixth Embodiment

The heat exchanger (10) of the present embodiment includes the adhesive layer (85) containing the antibacterial component and the antifungal component.

The heat exchanger (10) of the present embodiment can reduce propagation of bacteria and mold in the heat exchanger (10). This can keep the heat exchanger (10) clean.

Seventh Embodiment

A seventh embodiment will be described below. A heat exchanger (10) of the present embodiment is a variation of the heat exchanger (10) of the sixth embodiment in which the first frame (25) and the second frame (55) have been changed. Thus, the following description will be focused on the differences between the heat exchanger (10) of this embodiment and the heat exchanger (10) of the sixth embodiment.

Positioning Projection and Positioning Hole

Figure 40:
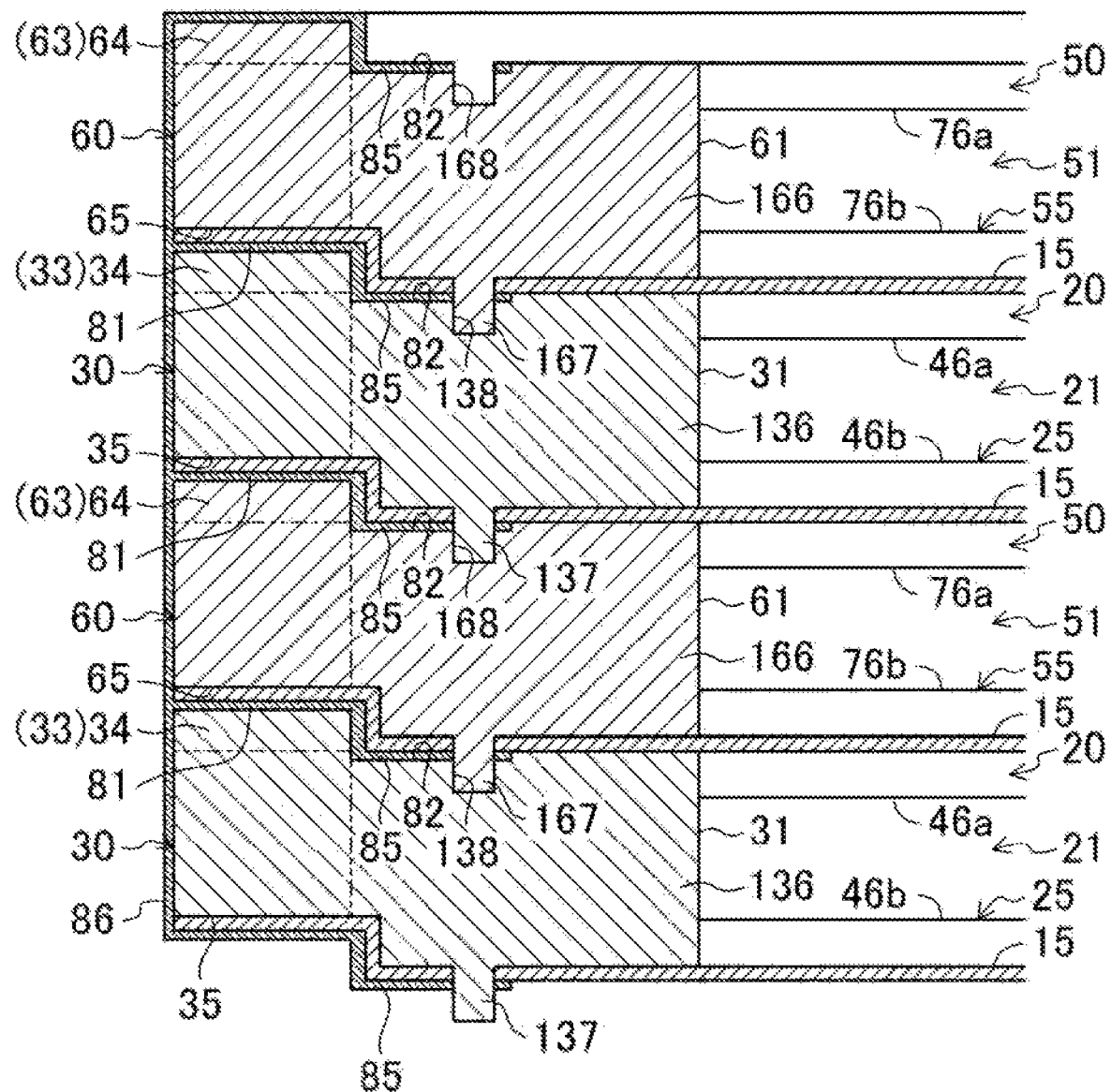
FIG. 40 is a cross-sectional view of portion of a heat exchanger according to a seventh embodiment, corresponding to FIG. 38.

As illustrated in FIG. 40, each of the first frame (25) and the second frame (55) has positioning projections (137, 167) and positioning holes (138, 168). In each of the frames (25, 55), a plurality of positioning projections (137, 167) and a plurality of positioning holes (138, 168) are formed in a portion of the blocking portion (3161) included in the main heat exchange section (11). The positioning projections (137, 167) and the positioning holes (138, 168) are formed in the inner portion (136, 166) of the blocking portion (31, 61).

Each of the positioning projections (137, 167) is a columnar projection projecting from the back surface of the blocking portion (31, 61). Each of the positioning holes (138, 168) is a cylindrical recess that opens on the front surface of the blocking portion (31, 61). Each of the positioning holes (138, 168) has an inner diameter slightly larger than the outer diameter of the positioning projection (137, 167), and a depth greater than the length of the positioning projection (137, 167).

The positioning projections (137, 167) and the positioning holes (138, 168) formed in the blocking portion (31, 61) of each of the frames (25, 55) are paired one by one. The paired positioning projection (137, 167) and positioning hole (138, 168) are arranged one above the other in the vertical direction in FIG. 40 so that their center axes substantially coincide with each other. When the first elements (20) and the second elements (50) are stacked one above the other, the positioning projections (137) of the first frame (25) fit into the positioning holes (168) of the second frame (55), and the positioning projections (167) of the second frame (55) fit into the positioning holes (138) of the first frame (25). Thus, the relative positions of the first elements (20) and the second elements (50) are determined.

Guiding Recess and Adhesive Layer

The blocking portion (31, 61) of each of the frames (25, 55) includes a guiding recess (82) formed in the front surface of the inner portion (136, 166). The guiding recess (82) is a shallow flat recess having a depth of about 0.1 mm to about 0.2 mm. The guiding recess (82) is formed in a region between the ridge (34, 64) and the positioning hole (138, 168).

As described above, in the application step of the manufacturing process of the heat exchanger (10), the adhesive is applied to the outer surface of the stack of the first elements (20) and the second elements (50). The adhesive applied to the heat exchanger (10) enters the outer clearance (81) by capillary action, and also enters the guiding recess (82) by capillary action. Thus, the adhesive substantially fills the outer clearance (81) and the guiding recess (82).

When the heat exchanger (10) is irradiated with ultraviolet rays in the curing step following the application step, the adhesive filling the outer clearance (81) and the guiding recess (82) is cured to form the adhesive layer (85). Thus, the adhesive layer (85) filling the outer clearance (81) and the guiding recess (82) bonds an adjacent pair of the first element (20) and the second element (50) to each other. Surrounding a portion near the base of each of the positioning projections (137, 167), the adhesive layer (85) reliably seals the first element (20) and the second element (50) adjacent to each other.

Features of Seventh Embodiment

The heat exchanger (10) of the present embodiment includes the positioning projections (137, 167) and the positioning holes (138, 168) formed in the frame portion (30, 60) of the frame (25, 55). The positioning projections (137, 167) project from one of the surfaces of the frame portion (30, 60) facing the stacking direction of the partition sheets (15). The positioning holes (138, 168) open on the other surface of the frame portion (30, 60) facing the stacking direction of the partition sheets (15). Each of the positioning holes (138, 168) receives an associated one of the positioning projections (137, 167) of the frame (25, 55) adjacent to the frame portion (30, 60) in which the positioning hole (138, 168) is formed.

In the heat exchanger (10) of the present embodiment, the adhesive layer (85) bonds the positioning projections (137, 167) and the surface of the frame portion (30, 60) of the frame (25, 55) provided with the positioning projections (137, 167) to the frame (25, 55) provided with the positioning holes (138, 168) for receiving the positioning projections (137, 167).

In the heat exchanger (10) of the present embodiment, the positioning projections (137, 167) of each of the frames (25, 55) fit into the positioning holes (138, 168) of the adjacent frame (25, 55). This determines the relative positions of the adjacent frames (25, 55). The adhesive layer (85) bonds the positioning projections (137, 167) of each of the frames (25, 55) to the adjacent frame (25, 55).

Other Embodiments

The following variations may be made on the heat exchanger (10) of each of the embodiments. The following variations may be combined and replaced without deteriorating the functions of the heat exchanger (10).

In the heat exchanger (10) of each of the embodiments, the partition sheets (15) may not be bonded to the frames (25, 55). In this case, each of the partition sheets (15) is sandwiched and held between the first frame (25) and the second frame (55) located on both sides thereof.

The heat exchanger (10) of each of the embodiments may be a sensible heat exchanger that causes the supply air and the exhaust air to exchange sensible heat only. In this case, the partition sheets (15) of the heat exchanger (10) are made of a material having low or no moisture permeability (e.g., a resin film or a thin metal plate).

The shape of the heat exchanger (10) of each of the embodiments is not limited to an octagonal prism. The shape of the heat exchanger (10) may be, for example, a hexagonal prism or a quadrangular prism. When the heat exchanger (10) has a hexagonal prism shape, each of the auxiliary heat exchange sections (12a, 12b) has a triangular shape in plan view (corresponding to FIG. 2) of the heat exchanger (10).

In the heat exchanger (10) of the sixth or seventh embodiment, the adhesive used to form the adhesive layer (85) and the coating layer (86) may be an aqueous emulsion-based adhesive. For example, when the hardness of the coating layer (86) is not required to be very high, the aqueous emulsion-based adhesive may be used to form the adhesive layer (85) and the coating layer (86).

While the embodiments and the variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a heat exchanger.

The invention claimed is:

1. A heat exchanger, comprising:
a plurality of flat sheet shaped partition members; and
a plurality of spacing members alternately stacked with the partition members to keep a space between an adjacent pair of the partition members,
each of the partition members being sandwiched between a first passage and a second passage alternately formed,
each of the spacing members having a frame portion formed along a periphery of the partition members,
each frame portion including
a communication opening allowing the first passage or the second passage surrounded by the frame portion to communicate with an outside of the frame portion,
an auxiliary rib extending along the communication opening and facing the frame portion of an adjacent one of the spacing members, and
an outer rib
protruding from a surface of the frame portion facing the auxiliary rib of the adjacent one of the spacing members,
extending along an outer side of the auxiliary rib of the adjacent one of the spacing members, and
extending along the communication opening and being located entirely closer to an outer peripheral edge of the frame portion than the auxiliary rib of the spacing member, and
a tip end face of the outer rib of each of the spacing members being flush with a surface of the auxiliary rib of one of the spacing members adjacent thereto in a protruding direction of the outer rib, the surface being opposite to the partition member,
each of the partition members being sandwiched between and contacting
the auxiliary rib of the frame portion of one of a pair of the spacing members adjacent to the partition member and
the frame portion of an other spacing member.

2. The heat exchanger according to claim 1, wherein the outer rib of the frame portion of each of the spacing members extends along an outer periphery of the spacing member over an entire perimeter of the spacing member.

3. The heat exchanger according to claim 1, wherein the auxiliary rib of each of the spacing members has a linear protrusion extending along the auxiliary rib and protruding toward a different one of the spacing members than the auxiliary rib faces, and the frame portion of each of the spacing members is provided with a linear recess to receive the linear protrusion of the adjacent one of the spacing members.

4. The heat exchanger according to claim 3, wherein each of the partition members is sandwiched between
the linear protrusion of one of a pair of the spacing members adjacent to the partition member and
the linear recess of another of the pair of the spacing members.

5. The heat exchanger according to claim 1, wherein an outer peripheral surface of a stack of the spacing members forms flat side surfaces of the heat exchanger.

6. The heat exchanger according to claim 1, wherein each of the frame portions has an outer portion formed along a periphery of the frame portion, and an inner portion formed along the outer portion and located inside the outer portion,
each of the partition members are sandwiched and held between the inner portion of each of the frame portions and one of the spacing members adjacent to the inner portion, and
an outer clearance is formed between the outer portion of each of the frame portions and the one of the spacing members adjacent to the outer portion.

7. The heat exchanger according to claim 6, further comprising:
an adhesive layer provided to fill the outer clearance and bond the outer portion of each of the frame portions to the one of the spacing members adjacent to the outer portion.

8. The heat exchanger according to claim 7, further comprising:
a coating layer made of the same material as the adhesive layer and formed continuously with the adhesive layer to cover an outer surface of the heat exchanger.

9. The heat exchanger according to claim 7, wherein the adhesive layer is made of an adhesive cured when exposed to ultraviolet light.

10. The heat exchanger of claim 7, wherein the adhesive layer contains an antibacterial component and an antifungal component.

11. The heat exchanger according to claim 7, wherein the frame portion of each of the spacing members includes
a positioning projection projecting from a surface of the frame portion facing the stacking direction of the partition members, and
a positioning hole opening on an other surface of the frame portion and receiving a positioning projection of one of the spacing members adjacent to the frame portion, and
the adhesive layer bonds the positioning projection and the surface of the frame portion of each of the spacing members provided with the positioning projection to a different one of the spacing members provided with the positioning hole to receive the positioning projection.

12. A heat exchanger, comprising:
a plurality of flat sheet shaped partition members; and
a plurality of spacing members alternately stacked with the partition members to keep a space between an adjacent pair of the partition members,
each of the partition members being sandwiched between a first passage and a second passage alternately formed,
each of the spacing members having a frame portion formed along a periphery of the partition members,
the spacing members including first spacing members, each first spacing member forming the first passage and including
a first communication opening formed in the frame portion of the first spacing member and allowing the first passage surrounded by the frame portion to communicate with an outside of the frame portion, and
at least one first inner rib extending from the first communication opening in a direction intersecting with the first communication opening and being in contact with the partition members on both sides of the first spacing member,
the spacing members including second spacing members, each second spacing member forming the second passage and including
a second communication opening formed in the frame portion of the second spacing member and allowing the second passage surrounded by the frame portion to communicate with the outside of the frame portion, and
at least one second inner rib extending from the second communication opening in a direction intersecting with the second communication opening and being in contact with the partition members on both sides of the second spacing member,
each of the first spacing members further including a plurality of first holding ribs extending in a direction intersecting with the at least one first inner rib along the at least one second inner rib of each of the second spacing members, with one of the partition members being sandwiched between the plurality of first holding ribs and the at least one second inner rib of an adjacent one of the second spacing members, and
each of the second spacing members further including a plurality of second holding ribs extending in a direction intersecting with the at least one second inner rib along the at least one first inner rib of each of the first spacing members, with one of the partition members being sandwiched between the plurality of second holding ribs and the at least one first inner rib of an adjacent one of the first spacing members,
each of the plurality of first holding ribs of each of the first spacing members including one first holding rib and an other first holding rib,
the one first holding rib being in contact with only one of a pair of partition members adjacent to the first spacing member provided with the one first holding rib,
the other first holding rib being in contact with only an other of the pair of partition members adjacent to the first spacing member provided with the other first holding rib,
each of the plurality of second holding ribs of each of the second spacing members including one second holding rib and an other second holding rib,
the one second holding rib being in contact with only one of a pair of partition members adjacent to the second spacing member provided with the one second holding rib,
the other second holding rib being in contact with only an other of the pair of partition members adjacent to the second spacing member provided with the other second holding rib.

13. The heat exchanger according to claim 12, wherein
each of the first spacing members includes a first support connected to the one first holding rib and the other first holding rib, and
each of the second spacing members includes a second support connected to the one second holding rib and the other second holding rib.

14. The heat exchanger according to claim 13, wherein
the at least one first inner rib of each of the first spacing members includes a plurality of first inner ribs arranged parallel to each other, and
between an adjacent pair of the first inner ribs of each of the first spacing members,
the one first holding rib protrudes from one of the adjacent first inner ribs toward the other first inner rib,
the other first holding rib protrudes toward the one of the adjacent first inner ribs from the other first inner rib,
the first support is connected to a tip end of the one first holding rib and a tip end of the other first holding rib,
the at least one second inner rib of each of the second spacing members includes a plurality of second inner ribs arranged parallel to each other, and
between an adjacent pair of the second inner ribs of each of the second spacing members,
the one second holding rib protrudes from one of the adjacent second inner ribs toward the other second inner rib, the other second holding rib protrudes toward the one of the adjacent second inner ribs from the other second inner rib, and
the second support is connected to a tip end of the one second holding rib and a tip end of the other second holding rib.

15. The heat exchanger according to claim 12, wherein
the at least one first inner rib of each of the first spacing members includes a plurality of first inner ribs arranged parallel to each other,
between an adjacent pair of the first inner ribs of each of the first spacing members,
the one first holding rib and the other first holding rib are alternately arranged in an extending direction of one of the adjacent first inner ribs, the one first holding rib and the other first holding rib protruding from the one of the adjacent first inner ribs toward the other first inner rib (40), and
the other first holding rib and the one first holding rib are alternately arranged in an extending direction of the other of the adjacent first inner ribs, the other first holding rib and the one first holding rib protruding toward the one of the adjacent first inner ribs from the other first inner rib,
the at least one second inner rib of each of the second spacing members includes a plurality of second inner ribs arranged parallel to each other, and
between an adjacent pair of the second inner ribs of each of the second spacing members,
the one second holding rib and the other second holding rib are alternately arranged in an extending direction of one of the adjacent second inner ribs, the one second holding rib and the other second holding rib protruding from the one of the adjacent second inner ribs toward the other second inner rib, and
the other second holding rib and the one second holding rib are alternately arranged in an extending direction of the other of the adjacent second inner ribs, the other second holding rib and the one second holding rib protruding toward the one of the adjacent second inner ribs from the other second inner rib.

16. The heat exchanger according to claim 12, wherein
each of the frame portions has an outer portion formed along a periphery of the frame portion, and an inner portion formed along the outer portion and located inside the outer portion,
each of the partition members are sandwiched and held between the inner portion of the frame portion and one of the spacing members adjacent to the inner portion, and
an outer clearance is formed between the outer portion of the frame portion and the one of the spacing members adjacent to the outer portion.

17. A heat exchanger, comprising:
a plurality of flat sheet shaped partition members; and
a plurality of spacing members alternately stacked with the partition members to keep a space between an adjacent pair of the partition members,
each of the partition members being sandwiched between a first passage and a second passage alternately formed,
each of the spacing members having a frame portion formed along a periphery of the partition members,
the spacing members including first spacing members, each first spacing member forming the first passage and including
a first communication opening formed in the frame portion of the first spacing member and allowing the first passage surrounded by the frame portion to communicate with an outside of the frame portion, and
at least one first inner rib extending from the first communication opening in a direction intersecting with the first communication opening and being in contact with the partition members on both sides of the first spacing member,
the spacing members including second spacing members, each second spacing member forming the second passage and including
a second communication opening formed in the frame portion of the second spacing member and allowing the second passage surrounded by the frame portion to communicate with the outside of the frame portion, and
at least one second inner rib extending from the second communication opening in a direction intersecting with the second communication opening and being in contact with the partition members on both sides of the second spacing member,
each of the first spacing members further including at least one first holding rib extending in a direction intersecting with the at least one first inner rib along the at least one second inner rib of each of the second spacing members, with one of the partition members being sandwiched between the at least one first holding rib and the at least one second inner rib of an adjacent one of the second spacing members, and
each of the second spacing members further including at least one second holding rib extending in a direction intersecting with the at least one second inner rib along the at least one first inner rib of each of the first spacing members, with one of the partition members being sandwiched between the at least one second holding rib and the at least one first inner rib of an adjacent one of the first spacing members,
the at least one first holding rib of each of the first spacing members including one first holding rib and an other first holding rib,
the one first holding rib being in contact with only one of a pair of partition members adjacent to the first spacing member provided with the one first holding rib,
the other first holding rib being in contact with only an other of the pair of partition members adjacent to the first spacing member provided with the other first holding rib,
the at least one second holding rib of each of the second spacing members including one second holding rib and an other second holding rib,
the one second holding rib being in contact with only one of a pair of partition members adjacent to the second spacing member provided with the one second holding rib,
the other second holding rib being in contact with only an other of the pair of partition members adjacent to the second spacing member provided with the other second holding rib,
the one first holding rib and the other first holding rib intersecting with the one second holding rib and the other second holding rib in a plan view.

* * * * *